(12) United States Patent
Machida

(10) Patent No.: US 7,593,983 B2
(45) Date of Patent: Sep. 22, 2009

(54) DATA PROCESSING APPARATUS, DATA PROCESSING METHOD, AND STORAGE MEDIUM STORING COMPUTER-READABLE PROGRAM

(75) Inventor: Haruo Machida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 10/748,227

(22) Filed: Dec. 31, 2003

(65) Prior Publication Data

US 2004/0153530 A1    Aug. 5, 2004

Related U.S. Application Data

(63) Continuation of application No. 09/560,184, filed on Apr. 28, 2000, now abandoned.

(30) Foreign Application Priority Data

Apr. 30, 1999    (JP) .................. 11-124822
Apr. 30, 1999    (JP) .................. 11-124823

(51) Int. Cl.
*G06F 15/16* (2006.01)
*H04N 5/222* (2006.01)

(52) U.S. Cl. .................. 709/203; 709/224; 709/226; 707/203; 715/701

(58) Field of Classification Search ............. 709/203, 709/224, 228, 220, 225, 229, 226; 707/203; 715/701, 236

See application file for complete search history.

(56) References Cited

U.S. PATENT DOCUMENTS

| | | | |
|---|---|---|---|
| 5,247,651 A * | 9/1993 | Clarisse .................. 703/13 |
| 5,452,415 A * | 9/1995 | Hotka .................. 715/735 |
| 5,517,622 A | 5/1996 | Ivanoff et al. ............. 709/206 |
| 5,650,800 A * | 7/1997 | Benson .................. 345/173 |
| 5,809,282 A * | 9/1998 | Cooper et al. ............. 709/226 |
| 5,867,164 A * | 2/1999 | Bornstein et al. .......... 715/236 |
| 5,870,768 A * | 2/1999 | Hekmatpour ............. 715/207 |
| 5,946,471 A | 8/1999 | Voohees et al. ........... 709/228 |
| 6,067,093 A * | 5/2000 | Grau et al. .............. 345/440 |
| 6,078,308 A * | 6/2000 | Rosenberg et al. ......... 715/856 |
| 6,088,804 A | 7/2000 | Hill et al. ............... 713/201 |
| 6,219,053 B1 * | 4/2001 | Tachibana et al. ......... 715/835 |
| 6,317,116 B1 * | 11/2001 | Rosenberg et al. ......... 715/701 |

(Continued)

FOREIGN PATENT DOCUMENTS

JP    04-058673    2/1992

(Continued)

*Primary Examiner*—Khanh Q Dinh
(74) *Attorney, Agent, or Firm*—Fitzpatrick, Cella, Harper & Scinto

(57) ABSTRACT

To flexibly configure an operation environment capable of easily and efficiently setting data processing in accordance with settings of expansion functions for a composite function while visually confirming the expansion functions of devices, a system configuration is displayed on a CRT in accordance with function information, connection information and status information of each device acquired via a network. When a user designates a set of icons of devices for realizing desired composite function processing, a CPU operates to display a combination function setting screen for the composite function processing, and displays on this setting screen a configuration image including the designated expansion functions of devices. A combination operation of corresponding devices is controlled in accordance with the settings on the setting screen.

23 Claims, 42 Drawing Sheets

U.S. PATENT DOCUMENTS

| | | | |
|---|---|---|---|
| 6,642,943 B1 | 11/2003 | Machida | 345/763 |
| 6,751,648 B2 * | 6/2004 | Kakimoto et al. | 709/203 |
| 6,782,402 B1 * | 8/2004 | Hidaka et al. | 707/203 |
| 6,819,441 B2 * | 11/2004 | Umebayashi | 358/1.15 |
| 6,825,941 B1 * | 11/2004 | Nguyen et al. | 358/1.15 |

FOREIGN PATENT DOCUMENTS

| | | |
|---|---|---|
| JP | 07-044477 | 2/1995 |
| JP | 09-024661 | 1/1997 |
| JP | 10-154122 | 6/1998 |
| JP | 10-224875 | 8/1998 |
| JP | 11-003314 | 1/1999 |

* cited by examiner

| | THE NUMBER OF REGISTERED FUNCTIONS | 601 |
| --- | --- | --- |
| | COMMENT | 602 |
| 1 | SCANNER | 603a |
| | PRINTER | 603b |
| | COPYING MACHINE | 603c |
| | COMMENT | 603d |
| ⋮ | | |
| N | SCANNER | 604a |
| | FAX MODEM | 604b |
| | FAX | 604c |
| | COMMENT | 604d |

| | | |
|---|---|---|
| PRINTER DRIVER NAME | | } 801 |
| VERSION INFORMATION | | |
| COMMENT | | |
| PAGE SETTING | ORIGINAL SIZE | } 802 |
| | OUTPUT SHEET SIZE | |
| | PRINTING DIRECTION | |
| | PAGE LAYOUT | |
| | MAGNIFICATION | |
| | STAMP | |
| FINISH | PRINTING METHOD | } 803 |
| | BINDING DIRECTION | |
| | SHEET DISCHARGE METHOD | |
| SHEET FEED | SHEET FEED METHOD | } 804 |
| | OHP PRINTING DETAIL SETTING | |
| DEVICE SETTING | SHEET FEED OPTION | } 805 |
| | SHEET DISCHARGE OPTION | |

FIG. 18

| | | |
|---|---|---|
| | PRINTER DRIVER NAME | } 801 |
| | VERSION INFORMATION | |
| | COMMENT | |
| PAGE SETTING | RESOURCE OFFSET | } 802 |
| | ORIGINAL SIZE | |
| | RESOURCE OFFSET | |
| | OUTPUT SHEET SIZE | |
| | RESOURCE OFFSET | |
| | PRINTING DIRECTION | |
| | RESOURCE OFFSET | |
| | PAGE LAYOUT | |
| | RESOURCE OFFSET | |
| | MAGNIFICATION | |
| | RESOURCE OFFSET | |
| | STAMP | |
| | RESOURCE OFFSET | |
| FINISH | RESOURCE OFFSET | } 803 |
| | PRINTING METHOD | |
| | RESOURCE OFFSET | |
| | BINDING DIRECTION | |
| | RESOURCE OFFSET | |
| | SHEET DISCHARGE METHOD | |
| | RESOURCE OFFSET | |
| SHEET FEED | RESOURCE OFFSET | } 804 |
| | SHEET FEED METHOD | |
| | RESOURCE OFFSET | |
| | OHP PRINTING DETAIL SETTING | |
| | RESOURCE OFFSET | |
| DEVICE SETTING | RESOURCE OFFSET | } 805 |
| | SHEET FEED OPTION | |
| | RESOURCE OFFSET | |
| | SHEET DISCHARGE OPTION | |
| | RESOURCE OFFSET | |
| | RESOURCE DATA SEGMENT | } 806 |

| MANAGEMENT DOMAIN NAME | 871 |
| THE NUMBER OF MANAGEMENT PRINTERS (=M) | |
| COMMENT | |

872-1:
- 873 → PRINTER NAME
- 874 → THE NUMBER OF LOGS (=N1)
- 875 → COMMENT 876-1 → 1:
- INPUT INFORMATION APPLICATION NAME OR SCANNER ATTRIBUTE INFORMATION
- THE NUMBER OF TOTAL PRINTING PAGES
- SHEET SIZE
- SHEET LONGITUDE
- SHEET LATITUDE
- COLOR OR BLACK/WHITE
- ONE FACE/TWO FACES
- TONER USE QUANTITY (Y, M, C, K)

⋮

876-N → N1

⋮

872-M:
- PRINTER NAME
- THE NUMBER OF LOGS (=N2)
- COMMENT

M, 1:
- INPUT INFORMATION APPLICATION NAME OR SCANNER ATTRIBUTE INFORMATION
- THE NUMBER OF TOTAL PRINTING PAGES
- SHEET SIZE
- SHEET LONGITUDE
- SHEET LATITUDE
- COLOR OR BLACK/WHITE
- ONE FACE/TWO FACES
- TONER USE QUANTITY (Y, M, C, K)

| ITEM | CONTENTS | DATA RECORDING FORMAT |
|---|---|---|
| SENDER | FAX SENDER | ONLY WHEN FAX DATA CONTAINS VALID INFORMATION OF SENDER |
| FAX NUMBER | SENDER FAX NUMBER | ONLY WHEN FAX DATA CONTAINS VALID FAX NUMBER DATA IN CSI BLOCK |
| DATE | FAX RECEPTION DATE | THE FORMAT IS "YY/MM/DD HH:MM" ("HH" IS 24-HOUR FORMAT) |
| RECEPTION RESULT | FAX RECEPTION RESULT STATUS | NORMAL END → RECEPTION SUCCESS RECEPTION FAILURE |
| RECEPTION TIME | TIME TO COST RECEIVING FAX | THE FORMAT IS "HH:MM:SS". IN CASE OF LESS THAN 1 HOUR, THE FORMAT IS "MM:SS" |
| RECEPTION PAGE | TOTAL FAX RECEPTION PAGES | |
| ERROR INFORMATION | RECEIVE ERROR INF. | |
| RESOLUTION | RECEPTION FAX RESOLUTION | 100, 200dpi |
| COMPRESSION SYSTEM | RECEPTION FAX COMPRESSION SYSTEM | MH, MR, MMR |

FIG. 23

| ITEM | CONTENTS | DATA RECORDING FORMAT |
|---|---|---|
| RECEIVER | FAX RECEIVER | RECEIVER'S NAME THAT IS INDICATED IN FAX SENDING DIALOG |
| FAX NUMBER | RECEIVER FAX NUMBER | |
| DATE | FAX TRANSMISSION DATE | THE FORMAT IS "YY/MM/DD HH:MM" ("HH" IS 24-HOUR FORMAT) |
| TRANSMISSION RESULT | FAX TRANSMISSION RESULT | NORMAL END→TRANSMISSION SUCCESS TRANSMISSION FAILURE PARTIALLY FAILED (SOME SENDING FAILED IN CASE OF MULTIPLE RECEIVERS) |
| TRANSMISSION TIME | TIME TO COST TRANSMITTING FAX | FORMAT IS "HH:MM:SS". IF LESS THAN 1 HOUR, FORMAT IS "MM:SS" |
| THE NUMBER OF TRIALS | THE NUMBER OF TRANSMISSION TRIALS | |
| DOCUMENT NAME | DOCUMENT NAME THAT IS SENT | · IN VFAX PRINTER THE NAME OF PRINTED DOCUMENT · IN CASE OF VOC'S FUNCTION, (SCAN IMAGE AND SEND FAX) THIS NAME IS "PCNAME-YYMMDDHHMM. TIX" |
| THE NUMBER OF RECEIVERS | | |
| TRANSMISSION PAGE | THE NUMBER OF TRANSMISSION FAX PAGES | (TRANSMISSION PAGE)/(TOTAL PAGE) EX.: TOTAL PAGE:100PAGES TRANSMISSION PAGE:25PAGES DISPLAY→25/100 |
| ERROR INFORMATION | TRANSMISSION ERROR INFORMATION OF THE JOB | ERROR INFORMATION LIKE "RECEIVER FAX IS BUSY" |
| BELONGING OF RECEIVER | BELONGING OF FAX RECEIVER | DESTINATION COMPANY NAME+ BELONGING POST |
| COMMENT | COVER PAGE COMMENT | |
| RESOLUTION | TRANSMISSION FAX RESOLUTION | 100, 200dpi |
| COMPRESSION SYSTEM | TRANSMISSION FAX COMPRESSION SYSTEM | MH, MR, MMR |
| RECEPTION TIME (FOR SERVER) | THE TIME FAX DATA IS RECEIVED TO SERVER'S WAITING TRAY | YY/MM/DD HH:MM |
| SENDER | USER NAME WHO SENDS THIS FAX | |
| SENDER'S PC | DATA SENDER'S PC NAME | |

FIG. 24

| ITEM | CONTENTS |
|---|---|
| USER NAME | NAME OF USER WHO PERFORMS SCAN (USER NAME IS JUDGED BY USING INFORMATION IN HTTP HEADER) |
| SCAN START TIME | TWAIN SESSION START TIME (SNT BEGIN SESSION CALL TIME) |
| SCAN END TIME | TWAIN SESSION END TIME (SNT END SESSION CALL TIME) |
| THE NUMBER OF TOTAL SCAN PAGES | THE TOTAL NUMBER OF PAGES OF SCAN DOCUMENT (MAX 10 DIGITS) |
| MACHINE NAME | NAME OF MACHINE WHICH PERFORMS SCAN (MAX 15 DIGITS) |
| TWAIN DRIVER NAME | NAME OF TWAIN DRIVER WHICH IS USED FOR SCAN (MAX 32 DIGITS) |
|  |  |
| SHEET SIZE |  |
| SHEET LONGITUDE | SHEET HEIGHT REPRESENTED BY UNIT OF 1/10mm (MAX 4 DIGITS) |
| SHEET LATITUDE | SHEET WIDTH REPRESENTED BY UNIT OF 1/10mm (MAX 4 DIGITS) |
| COLOR OR BLACK/WHITE | 1 : MONOCHROME<br>2 : COLOR |
|  |  |
|  |  |

FIG. 25

| ITEM | CONTENTS |
|---|---|
| USER NAME | NAME OF USER WHO PERFORMS PRINTING |
| PRINTING START TIME | PRINTING JOB START TIME |
| PRINTING END TIME | PRINTING JOB END TIME |
| THE NUMBER OF TOTAL PRINTING PAGES | THE TOTAL NUMBER OF PAGES OF PRINTING DOCUMENT (MAX 10 DIGITS) |
| MACHINE NAME | NAME OF MACHINE TO WHICH PRINTING IS INSTRUCTED (MAX 15 DIGITS) |
| PRINTER DRIVER NAME | NAME OF PRINTER DRIVER WHICH IS USED FOR PRINTING (MAX 32 DIGITS) |
| APPLICATION NAME | NAME OF APPLICATION WHICH PERFORMS PRINTING ATTRIBUTE INFORMATION OF SCANNER MACHINE NAME, RESOLUTION, COLOR/ MONOCHROME IN CASE OF SCANNER |
| THE NUMBER OF DESIGNATED PRINTS | THE NUMBER OF PRINTS DESIGNATED IN PRINTING (MAX 6 DIGITS) |
|  |  |
| SHEET SIZE |  |
| SHEET LONGITUDE | SHEET HEIGHT REPRESENTED BY UNIT OF 1/10mm (MAX 4 DIGITS) |
| SHEET LATITUDE | SHEET WIDTH REPRESENTED BY UNIT OF 1/10mm (MAX 4 DIGITS) |
| COLOR OR BLACK/ WHITE | 1 : MONOCHROME<br>2 : COLOR |
| ONE FACE/TWO FACES | 1 : ONE FACE<br>2 : TWO FACES |
| TONER USE QUANTITY (Y, M, C, K) | TONER USE QUANTITY |
|  |  |

FIG. 27

| | | | 1505 |
|---|---|---|---|
| 1601 — HEADER INFORMATION | | VERSION | |
| | | INDEX TABLE NUMBER → N | |
| | | INDEX TABLE OFFSET | |
| 1602 — INDEX TABLE | ELEMENT [0] | DATA OFFSET | |
| | | DATA SIZE | |
| | | FLAG | |
| | ⋮ | | |
| | ELEMENT [N-1] | DATA OFFSET | |
| | | DATA SIZE | |
| | | FLAG | |
| 1603-1 — CLIENT PC DEVICE INFORMATION DATA [0] | 1604 — PC INFORMATION | PC NAME | |
| | | LOGON USER | |
| | | LICENSE INFORMATION | |
| | | OS INFORMATION | |
| | | PRINTER INFORMATION NUMBER → N0 | |
| | | SCANNER INFORMATION NUMBER → N1 | |
| | | FAX BOARD INFORMATION NUMBER → N2 | |
| | 1605 — PRINTER INFORMATION [0] | | |
| | ⋮ | | |
| | PRINTER INFORMATION [N0-1] | | |
| | 1606 — SCANNER INFORMATION [0] | | |
| | ⋮ | | |
| | SCANNER INFORMATION [N1-1] | | |
| | 1607 — FAX BOARD INFORMATION [0] | | |
| | ⋮ | | |
| | FAX BOARD INFORMATION [N2-1] | | |
| 1603-N | ⋮ | | |
| CLIENT PC DEVICE INFORMATION DATA [N-1] | PC INFORMATION | | |
| | PRINTER INFORMATION | | |
| | SCANNER INFORMATION | | |
| | FAX BOARD INFORMATION | | |

| INFORMATION | CONTENTS |
|---|---|
| PC NAME | PC'S NET BIOS NAME |
| LOGON USER | PC'S LOGON USER |
| LICENSE INFORMATION | LICENSE NUMBER |
| OS INFORMATION | 95/98 OR NT |
| NUMBER OF PRINTER INFORMATION | |
| NUMBER OF SCANNER INFORMATION | |
| NUMBER OF FAX BOARD INFORMATION | |

| INFORMATION | CONTENTS | ACQUIREMENT METHOD |
|---|---|---|
| PRINTER NAME | (C) PRINTER NAME | PPRINTERNAME IN PRINTER_INFO_2 |
| DRIVER NAME | (C) DRIVER NAME | PDRIVERNAME IN PRINTER_INFO_2 |
| SHARED NAME | (C) SHARED NAME IN THE NETWORK | PSHARENAME IN PRINTER_INFO_2 |
| PORT NAME | (C) PRINTER PORT INFORMATION | PPORTNAME IN PRINTER_INFO_2 |
| SHARED INFORMATION | (C) THE INFORMATION TO SHARE AS NETWORK PRINTER | PATTRIBUTENAME IN PRINTER_INFO_2 |
| SERVER NAME | (C) SERVER PC OF SHARED PRINTER | PSERVERNAME IN PRINTER_INFO_2 |
| COLOR INFORMATION | (A) | DMCOLOR OF PDEVMODE IN PRINTER_INFO_2 |

(C) → CONNECTION INFORMATION, (A) → DEVICE ATTRIBUTE INFORMATION

| INFORMATION | CONTENTS | ACQUIREMENT METHOD |
|---|---|---|
| TWAIN SOURCE NAME | (C) TWAIN SOURCE NAME | OBTAINED BY TWAIN MANAGER TW_IDENTITY. PRODUCTNAME |
| SHARED NAME | (C) SHARED NAME IN THE NETWORK | UNDER VOS MANAGEMENT |
| SHARED INFORMATION | (C) SHARED INFORMATION LIKE PASSWORD IS SET OR NOT | UNDER VOS MANAGEMENT |
| MANUFACTURER NAME | (A) TWAIN MANUFACTURER NAME | STUB'S SNTGETSCANNER ATTRIBUTE ( ) CAN GET THIS INFORMATION |
| ADF INFORMATION | (A) ADF CONNECTION INFORMATION | STUB'S SNTGETSCANNER ATTRIBUTE ( ) CAN GET THIS INFORMATION |
| COLOR INFORMATION | (A) TWAIN DEVICE'S COLOR INFORMATION | STUB'S SNTGETSCANNER ATTRIBUTE ( ) CAN GET THIS INFORMATION |
| UI INFORMATION | (A) SILENT UI OR NOT | STUB'S SNTGETSCANNER ATTRIBUTE ( ) CAN GET THIS INFORMATION |
| THE FOLLOWING INFORMATION DOES NOT BE NEEDED FOR THE PURPOSE OF SHOWING THE SCANNER ICON. BUT VTD MUST CHECK THE TWAIN DRIVER VERSION WHEN IT IS CONNECTED TO REMOTE SCANNER, BECAUSE VTD SAVES THE INFORMATION OF CAPABILITIES AND MUST JUDGE IF THIS INFORMATION IS RIGHT OR NOT. THEREFORE IT MAY BE GOOD WAY TO SAVE THE FOLLOWING INFORMATION IN THIS SCANNER INFORMATION TABLE. THIS TOPICS IS NECESSARY TO DISCUSS WITH PECAN. IF YOU JUDGE THAT THE FOLLOWING ITEMS ARE NOT NEEDED, PLEASE TELL US | | |
| THE ELSE OF TW_IDENTITY | OTHER TW_IDENTITY INFORMATION (EX : TWAIN PROTOCOL VERSION, TWAIN DRIVER VERSION) | THE ELSE OF TW_IDENTITY INFORMATION (EX: TW_IDENTITY. PROTOCOLMAJOR, TW_IDENTITY. PROTOCOLMINOR, TW_IDENTITY. VERSION. MAJOR NUM, TW_IDENTITY. VERSION. MINOR NUM) |

| INFORMATION | CONTENTS | ACQUIREMENT METHOD |
|---|---|---|
| SHARED NAME | (C) SHARED NAME IN THE NETWORK | UNDER VOS MANAGEMENT |

FIG. 30

| | | | 1502 (1511, 1514) |
|---|---|---|---|
| 1601 — HEADER INFORMATION | VERSION | | |
| | INDEX TABLE NUMBER → 1 | | |
| | INDEX TABLE OFFSET | | |
| 1602 — INDEX TABLE | ELEMENT [0] | DATA OFFSET | |
| | | DATA SIZE | |
| | | FLAG | |
| 1701 — LOCAL DEVICE INFORMATION DATA [0] | PC INFORMATION | PC NAME | |
| | | LOGON USER | |
| | | LICENSE INFORMATION | |
| | | OS INFORMATION | |
| | | PRINTER INFORMATION NUMBER → N0 | |
| | | SCANNER INFORMATION NUMBER → N1 | |
| | | FAX BOARD INFORMATION NUMBER → N2 | |
| | PRINTER INFORMATION [0] | | |
| | ⋮ | | |
| | PRINTER INFORMATION [N0-1] | | |
| | SCANNER INFORMATION [0] | | |
| | ⋮ | | |
| | SCANNER INFORMATION [N1-1] | | |
| | FAX BOARD INFORMATION [0] | | |
| | ⋮ | | |
| | FAX BOARD INFORMATION [N2-1] | | |

| | | |
|---|---|---|
| 1601 HEADER INFORMATION | VERSION | |
| | INDEX TABLE NUMBER → N | |
| | INDEX TABLE OFFSET | |
| 1602 INDEX TABLE | ELEMENT [0] | DATA OFFSET |
| | | DATA SIZE |
| | | FLAG |
| | ⋮ | |
| | ELEMENT [N-1] | DATA OFFSET |
| | | DATA SIZE |
| | | FLAG |
| 1701 LOCAL DEVICE INFORMATION DATA | PC INFORMATION | |
| | PRINTER INFORMATION | |
| | SCANNER INFORMATION | |
| 1603-1 CLIENT PC DEVICE INFORMATION DATA | PC INFORMATION | |
| | PRINTER INFORMATION | |
| | SCANNER INFORMATION | |
| | ⋮ | |
| 1603-N CLIENT PC DEVICE INFORMATION DATA | PC INFORMATION | |
| | PRINTER INFORMATION | |
| | SCANNER INFORMATION | |
| 1507 NON-CLIENT PC DEVICE INFORMATION DATA | PC INFORMATION | |
| | PRINTER INFORMATION | |
| | ⋮ | |
| 1509 NON-CLIENT PC DEVICE INFORMATION DATA | PC INFORMATION | |
| | PRINTER INFORMATION | |

FIG. 46

STORAGE MEDIUM SUCH AS
FD, CD-ROM OR THE LIKE

| DIRECTORY INFORMATION |
|---|
| 1ST DATA PROC PROGRAM<br>PROGRAM CODE GROUP CORRESPONDING<br>TO STEPS OF CHART SHOWN IN FIG. 9 |
| 2ND DATA PROC PROGRAM<br>PROGRAM CODE GROUP CORRESPONDING<br>TO STEPS OF FLOW CHART SHOWN IN FIG. 32 |
| 3RD DATA PROC PROGRAM<br>PROGRAM CODE GROUP CORRESPONDING<br>TO STEPS OF FLOW CHART SHOWN IN FIG. 34 |
| 4TH DATA PROC PROGRAM<br>PROGRAM CODE GROUP CORRESPONDING<br>TO STEPS OF FLOW CHART SHOWN IN FIG. 35 |
| 5TH DATA PROC PROGRAM<br>PROGRAM CODE GROUP CORRESPONDING<br>TO STEPS OF FLOW CHART SHOWN IN FIG. 38 |
| 6TH DATA PROC PROGRAM<br>PROGRAM CODE GROUP CORRESPONDING<br>TO STEPS OF FLOW CHART SHOWN IN FIG. 40 |
| 7TH DATA PROC PROGRAM<br>PROGRAM CODE GROUP CORRESPONDING<br>TO STEPS OF FLOW CHART SHOWN IN FIG. 41 |
| 8TH DATA PROC PROGRAM<br>PROGRAM CODE GROUP CORRESPONDING<br>TO STEPS OF FLOW CHART SHOWN IN FIG. 45 |

DATA PROCESSING APPARATUS, DATA PROCESSING METHOD, AND STORAGE MEDIUM STORING COMPUTER-READABLE PROGRAM

This application is a continuation of application Ser. No. 09/560,184, filed Apr. 28, 2000.

BACKGROUND OF THE INVENTION

1. Field of the Invention

The present invention relates to a data processing apparatus capable of data communication with various apparatuses, a data processing method, a storage medium storing computer-readable programs, and the like.

2. Related Background Art

Devices such as personal computers (PC), printers, scanners, digital copying machines and digital cameras are now widely used and networks such as LAN's are prevailing. Under such circumstances, needs of sharing a printer, a modem or an image reader on a network are increasing. By sharing devices such as printers and scanners on the network, the environment that various devices can be used on the network has been established.

However, a method of combining devices to realize a particular function such as a copy function to be realized by a combination of a scanner and a printer or a combination of a digital copying machine and a scanner, is not available in some cases. Even if such a method is made available, specific devices are required or only devices of a particular kind can be used. Devices capable of being applied to general use are not known.

When a user sets a combination of devices to realize a particular function, if the user cannot grasp all option units and expansion functions of each device, there is a possibility that the performance of each device cannot be demonstrated most effectively, the user cannot set each device as desired, or the user may abandon to set each device as desired. For example, in the case of a digital copying machine, such option units include an automatic document feeder (ADF), a sorter, a sheet cassette, a sheet deck and the like, and such expansion functions include a page layout function, a two-face printing function, a bookbinding function, an OHP printing function, a staple function, a stamp function and the like. Each device shared by users is installed in many cases at a remote site in a network environment. Even if devices have the same fundamental function, in many cases some devices have some expansion functions whereas other devices don't have such expansion functions. It is therefore difficult for a remote side user to grasp information of these devices in the network environment by using a list display form. Even if the network environment can meet various needs of users, the system may not be utilized most effectively because users cannot grasp the system. In order to solve these possible problems, a user interface easy to use has been desired to date.

It has also been desired not only to realize a particular function by a combination of devices, but also to meet various complicated and sophisticated needs of users under advancement of techniques. For example, a function together with composite image processing provided by a user computer is desired. Therefore, an excellent user interface easy to use in dealing with an image processing request from users has also been desired.

SUMMARY OF THE INVENTION

It is an object of the invention to solve the above-described problems and provide a data processing apparatus and method, and a storage medium storing computer-readable programs.

It is another object of the invention to provide a data processing apparatus capable of allowing a user to visually confirm the configuration of various devices of a network system together with expansion functions and flexibly meeting various complicated and sophisticated needs of users under advancement of techniques, a data processing method and a storage medium storing computer-readable programs.

The other objects and features of the present invention will become apparent from the following detailed description of embodiments when read in conjunction with the accompanying drawings.

BRIEF DESCRIPTION OF THE DRAWINGS

FIG. 10 is a view showing an example of device driver information managed by a data processing apparatus according to the second embodiment of the present invention;

FIG. 18 is a view showing an example of a resource file of device driver information managed by the data processing apparatus according to the second embodiment of the present invention;

FIG. 21 is a view showing an example of the log information managed by the data processing apparatus according to the third embodiment of the present invention;

FIG. 22 is a view showing an example of the log information managed by the data processing apparatus according to the third embodiment of the present invention;

FIG. 23 is a view showing an example of the log information managed by the data processing apparatus according to the third embodiment of the present invention;

FIG. 24 is a view showing an example of the log information managed by the data processing apparatus according to the third embodiment of the present invention;

FIG. 25 is a view showing an example of the log information managed by the data processing apparatus according to the third embodiment of the present invention;

FIG. 27 is a view for explaining management server device information shown in FIG. 26;

FIG. 28A is a view for explaining in detail PC (personal computer) information shown in FIG. 27;

FIG. 28B is a view for explaining in detail printer information shown in FIG. 27;

FIG. 29A is a view for explaining in detail scanner information shown in FIG. 27;

FIG. 29B is a view for explaining in detail FAX (facsimile) board information shown in FIG. 27;

FIG. 30 is a view for explaining server device information shown in FIG. 26;

FIG. 31 is a view for explaining client device information shown in FIG. 26;

FIG. 46 is a view for explaining a memory map of a storage medium in which various data processing programs readable by the data processing apparatus according to the present invention are stored.

DETAILED DESCRIPTION OF THE PREFERRED EMBODIMENTS

First Embodiment

<Explanation of Apparatus>

Figure 1:
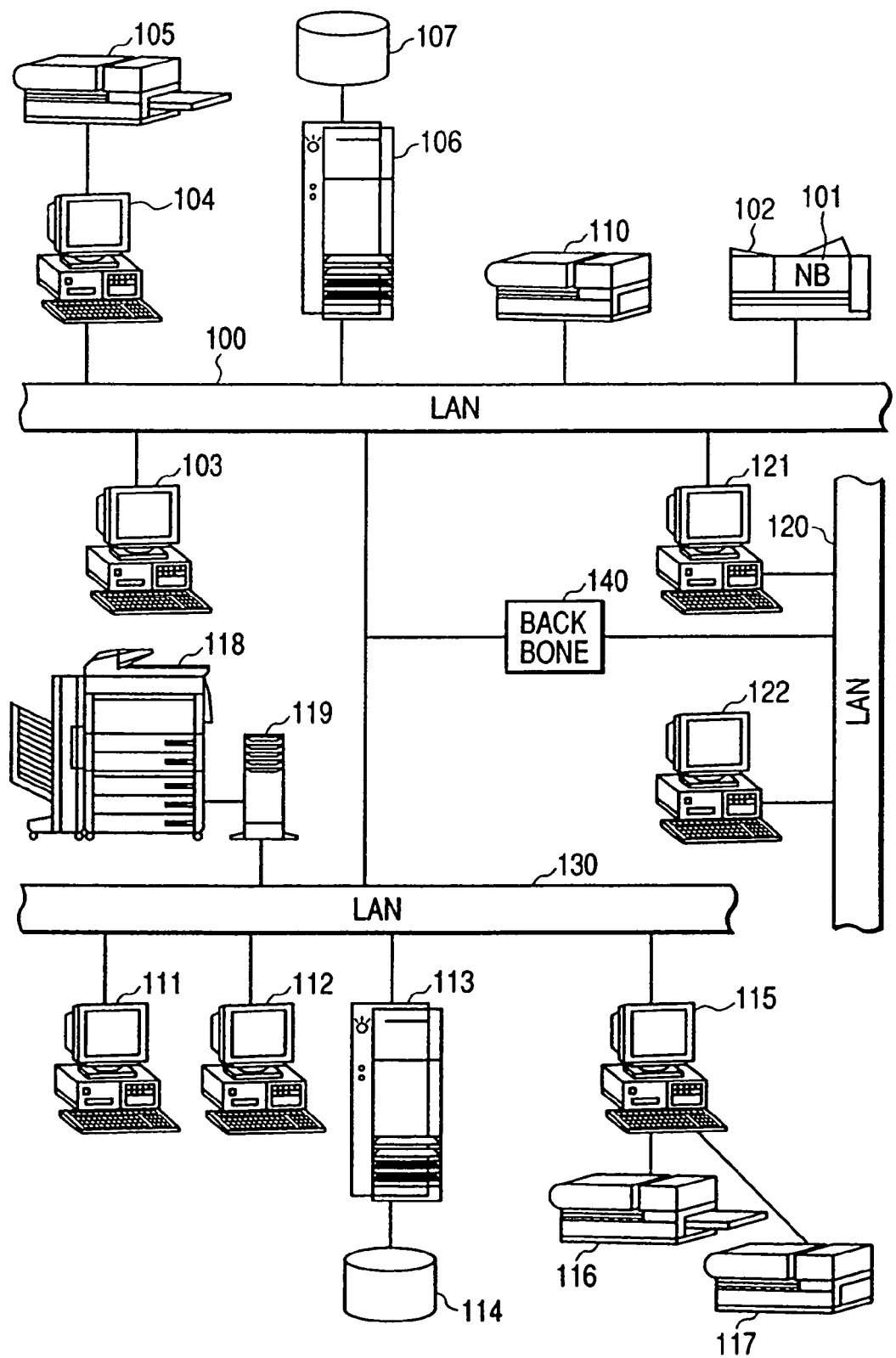
FIG. 1 is a block diagram showing a structure of a system of network devices including a data processing apparatus according to the present invention.

FIG. 1 is a block diagram showing a structure of a system of network devices including a data processing apparatus according to the present invention.

In FIG. 1, a printer 102 which has open-system architecture is connected with a network through an NB (network board) 101. The NB 101 is connected with LAN's 100, 120 and 130 through a local area network interface such as an Ethernet interface 10BASE2 having a coaxial connector, an Ethernet interface 10BASE-T having an RJ-45, or the like.

Plural PC's (personal computers) 103, 104, 111 and 112 are also connected with the LAN's 100 and 130, whereby these PC's can communicate with the NB 101 under the control of a network operating system.

Therefore, one of the PC's (e.g., the PC 103) can be used as the PC for network device management. Further, a printer 105 may be locally connected with the PC 104 as a local printer.

Further, since a PC 106 which functions as a file server is connected with the LAN 100, the PC 106 manages accessing to files stored in a large-capacity (e.g., 10,000,000,000 bytes) network disk 107.

The PC 104 which functions as a printer server manages printing of the printer such as the locally connected printer 105, the remotely located printer 102 or the like.

Similarly, a PC 115 which functions as a printer server manages printing of the printer such as a locally connected printer 116, the remotely located printer 102 or the like.

Further, the PC 115 can be functioned as a scanner server to manage the scanner such as a remotely located scanner 110 or the like. The scanner 110 is connected with the LAN 100 through the network board or the like. Further, a digital copying machine 118 provides printer and scanner functions under the management and control of an image processing unit 119.

In order to effectively perform communication among various network members, Network software such as Novell, UNIX or the like can be used for the network shown in FIG. 1. For example, software such as commercially available NetWare (trademark of Novell) can be used. Since the details of this software package are described in the on-line documentation included in the NetWare package, the explanation thereof will be omitted.

Each of the PC's 103 and 104 is a general PC which can generate a data file, transmit the generated data file to the LAN 100, receive a file from the LAN 100, display these files, and/or process these files.

In FIG. 1, although the personal computer devices (PC's) are illustrated, other computer devices suitable for executing the network software may be used. For example, when UNIX software is used, a UNIX workstation may be connected with the network. In this case, the connected UNIX workstation is used together with the illustrated PC's.

Ordinarily, the LAN 100 provides services to a relatively local user group, e.g., a user group in one floor or plural consecutive floors in one building.

On the other hand, when plural users are located at positions away from others (e.g., different buildings, different prefectures or the like), a WAN (wide area network) may be constructed.

Basically, the WAN is composed of the plural LAN's which are connected together through a high-speed digital line such as ISDN (Integrated Services Digital Network). For example, as shown in FIG. 1, when the LAN 100 and the LAN 120 are connected with each other through a backbone 140, the WAN is established. In this case, the devices connected with the LAN's 100, 120 and 130 can access functions of devices connected with other LAN's through the WAN.

Figure 2:
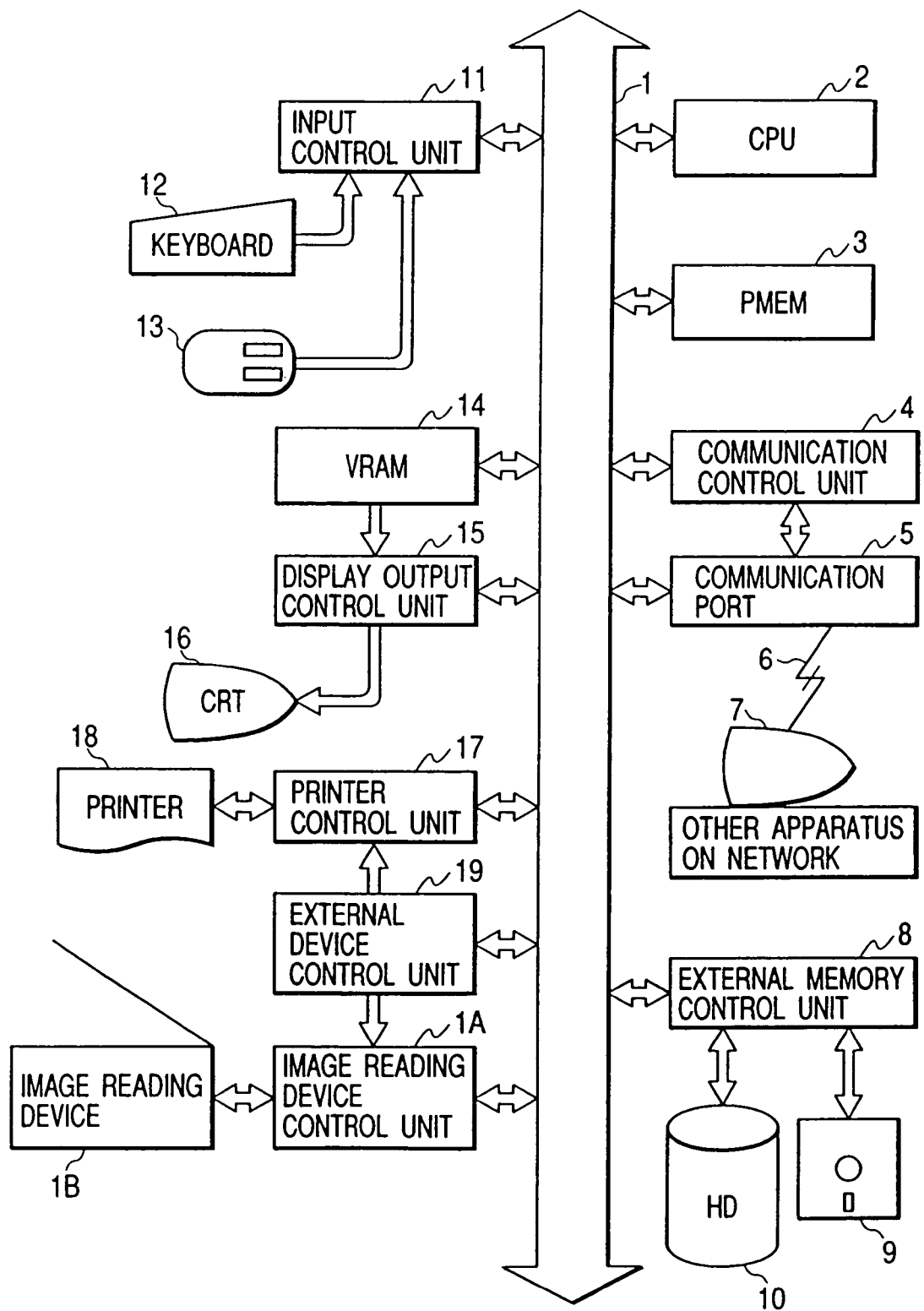
FIG. 2 is a block diagram for explaining a client structure in the first embodiment of the present invention.

FIG. 2 is a block diagram for explaining a client structure acting as a data processing apparatus according to the first embodiment of the present invention. It is assumed that, in the client structure, predetermined devices (including the printer, the scanner, the modem, a multifunctional image processing apparatus, etc.) can communicate with locally connected other data processing apparatus based on a predetermined protocol through a not-shown communication medium (e.g., a LAN according to Ethernet or the like).

In FIG. 2, numeral 1 denotes a system bus to which later-explained units are connected, and numeral 2 denotes a CPU (central processing unit).

Numeral 3 denotes a PMEM (program memory) which appropriately selects and reads a program for the processing, from an HD (hard disk) 10. The read program is executed by the CPU 2. Further, data input from a keyboard 12 is stored as code information in the PMEM 3 also acting as a text memory.

Numeral 4 denotes a communication control unit which controls input and output data of a communication port 5. A signal output from the communication port 5 is transmitted to a communication port 7 of other apparatus on the network through a communication line 6.

A printer and an image reading apparatus (e.g., the scanner) which are shared on the network are controlled through the communication control unit 4. Although the network such as the LAN is used in the present embodiment, it is needless to say that the present invention is applicable to a case where the communication port or the communication line connected with the communication control unit 4 is a general public line.

Numeral 8 denotes an external memory control unit which controls access to a data file disk such as an FD (floppy disk) 9, the HD 10 or the like.

Numeral 11 denotes an input control unit to which input devices such as the keyboard 12, a mouse 13 and the like are connected. A user issues an operation instruction to the system by operating the keyboard 12. Numeral 16 denotes a CRT (cathode-ray tube) on which a PD (pointing device) is used to instruct editing of image information. In the present embodiment, the mouse 13 is used as the PD.

Thus, the user arbitrarily shifts a cursor on the CRT 16 in X and Y directions and selects a command icon on a command menu to instruct the processing. Besides, the user shifts the cursor to indicate an editing target, a drawing position and the like.

Numeral 14 denotes a VRAM (video random-access memory) which acts as a video image memory. Drawing data (bit map data) which is to be displayed on the CRT 16 is expanded in the VRAM 14, the expanded data is appropriately read by a display output control unit 15, and the content of the read data is displayed on the CRT 16. Numeral 17 denotes a printer control unit which controls data outputting to a connected printer 18.

Symbol 1A denotes an image reading device control unit which controls image reading of a connected image reading device 1B. An external device control unit 19 controls the operation of the external device through the printer control unit 17 or the image reading device control unit 1A.

In an image reading server of the present invention necessarily includes the image reading device control unit 1A and the image reading device 1B. Incidentally, as described above, a client-side apparatus can share these units with the server, through the communication control unit 4 and the communication port 5.

Further, in the structure of FIG. 2, even if the image reading device is physically independent of the image reading apparatus, it is assumed that the image reading apparatus has the function of one component including the image reading device.

In the present embodiment, the program which is stored in a ROM (read-only memory) may be stored in the HD 10 or the FD 9 directly connected with the apparatus, or in other apparatus connected with the apparatus through the network. Further, the program according to the present invention can be supplied to the system or the apparatus through the storage medium such as the HD 10, the FD 9 or the like, or through the network.

Figure 3:
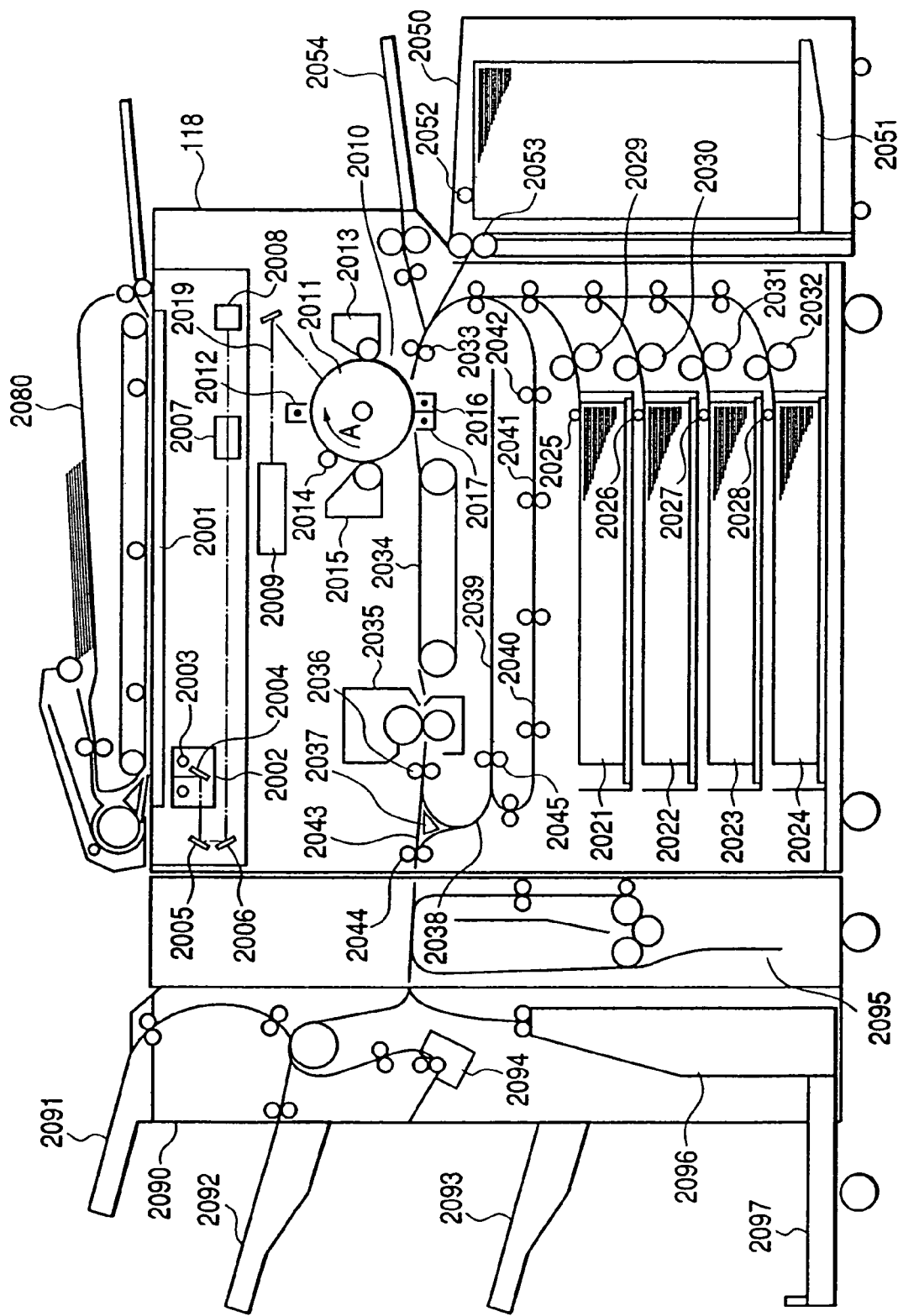
FIG. 3 is a sectional view for explaining a structure of a digital copying machine shown in FIG. 1.

FIG. 3 is a sectional view for explaining the structure of the digital copying machine 118 shown in FIG. 1.

In FIG. 3, numeral 2080 denotes an ADF (automatic document feeder) which is installed as an option. The ADF 2080 feds an original one by one from a sheaf of originals put on an original feeding board to an original mounting board (platen glass) 200 of the copying machine 118. Numeral 2002 denotes a scanner which is composed of an original illumination lamp 2003, a scanning mirror 2004 and the like. The scanner 2002 is reciprocated by a not-shown motor along a predetermined direction to scan the original. Thus, reflection light from the original is imaged on a CCD (charge-coupled device) in an image sensor unit 2008 through scanning mirrors 2004, 2005 and 2006 and a lens 2007.

The image sensor unit 2008 performs predetermined image processing to an electrical signal obtained by converting the reflection light from the original, to generate an image signal. Numeral 2009 denotes an exposure control unit which is composed of a laser beam generation unit, a polygonal scanner and the like. The exposure control unit 2009 generates a laser beam 2019 which is modulated based on the image signal generated by the image sensor unit 2008, and irradiates a photosensitive drum 2011 with the generated beam 2019.

Numeral 2010 denotes an image formation unit which is composed of the photosensitive drum 2011, a primary charger 2012, a development unit 2013, a transfer charger 2016, a separation charger 2017, a preexposure lamp 2014, a cleaner 2015 and the like. The primary charger 2012, the development unit 2013, the transfer charger 2016, the separation charger 2017, the preexposure lamp 2014 and the cleaner 2015 are disposed around the photosensitive drum 2011.

In the image formation unit 2010, the photosensitive drum 2011 is driven by a not-shown motor and thus rotated in the direction indicated by an arrow A. The primary charger 2012 charges the photosensitive drum 2011 to a predetermined potential. The later beam 2019 generated by the exposure control unit 2009 is irradiated on the photosensitive drum 2011 charged by the primary charger 2012, whereby an electrostatic latent image is formed. The development unit 2013 develops the electrostatic latent image formed on the photosensitive drum 2011 to visualize the image on the drum 2011 as a toner image.

Numerals 2021, 2022, 2023 and 2024 respectively denote first, second, third and fourth cassettes which hold transfer sheets as recording media. The transfer sheet held in the cassette is picked up by a pickup roller 2025, 2026, 2027 or 2028, fed to the copying machine 118 by a pair of sheet feed rollers (simply referred as a sheet feed roller hereinafter) 2029, 2030, 2031 or 2032, and then carried to the image formation unit 2010 by a pair of registration rollers (simply referred as a registration roller hereinafter) 2033.

The transfer charger 2016 transfers the visualized toner image on the photosensitive drum 2011 to the carried transfer sheet. After the toner image is transferred to the transfer sheet, the cleaner 2015 cleans residual toner on the photosensitive drum 2011. After the residual toner is cleaned by the cleaner 2015, the preexposure lamp 2014 eliminates the residual charges on the photosensitive drum.

The separation charger 2017 separates the transfer sheet on which the toner image was transferred, from the photosensitive drum 2011. Numeral 2034 denotes a carrying belt which carries the transfer sheet separated by the separation charger 2017, to a fixing unit 2035. The fixing unit 2035 presses and heats the transfer sheet to fix the toner image on the transfer sheet. Numeral 2036 denotes a pair of sheet discharge rollers (simply referred as a discharge roller hereinafter) which discharges the transfer sheet on which the toner image was fixed by the fixing unit 2035, outside the copying machine (body) 118.

Numeral 2037 denotes a sheet discharge flapper which changes the sheet transfer path between a carrying path 2038 and a discharge path 2043. Numeral 2040 denotes a lower carrying path which guides, to a sheet refeed path 2041, the transfer sheet carried by the sheet discharge roller 2036 and a pair of reversal rollers (simply referred as a reversal roller hereinafter) 2045 and then reversed through a reversal path 2039.

Numeral 2042 denotes a pair of sheet refeed rollers (simply referred as a sheet refeed roller hereinafter) which refeeds the transfer sheet guided to the sheet refeed path 2041 to the image formation unit 2010. Numeral 2044 denotes a pair of sheet discharge rollers (simply referred as a sheet discharge roller hereinafter) which is disposed in the vicinity of the sheet discharge flapper 2037 and discharges the transfer sheet outside the copying machine 118 when the sheet transfer path is changed to the sheet discharge path 2043 by the flapper 2037.

When the copying machine 118 performs two-face recording (two-face copying), the sheet discharge flapper 2037 is moved upward to guide the transfer sheet to which the copying was performed to the sheet refeed path 2041 through the carrying path 2038, the reversal path 2039 and the lower carrying path 2040. At this time, the reversal roller 2045 completely passes the trailing edge of the transfer sheet through the carrying path 2038 and then carries the sheet to the reversal path 2039 up to the position where the sheet is nipped by the reversal roller 2045. Then the reversal roller 2045 is reversed to carry the sheet to the lower carrying path 2040.

When the transfer sheet is reversed and discharged outside the copying machine (body) 118, the sheet discharge flapper 2037 is moved upward, and the transfer sheet is carried to the reversal path 2039 by the reversal roller 2045 up to the position where the trailing edge of the sheet remains in the carrying path 2038. Then the reversal roller 2045 is reversed to reverse and carry the sheet to the sheet discharge roller 2044.

Numeral 2090 denotes a sheet discharge unit (sorter) which is installed as an option, and flushes and staples the transfer sheets discharged from the copying machine 118. Concretely, the transfer sheets discharged one by one are stacked and flushed on a processing tray 2094 until the discharge of the sheets to which image formation of one copy (one sheaf) ends. Then the sheaf of transfer sheets is stapled by a not-shown stapler of the processing tray 2094, and the stapled sheaf is discharged to a sheet discharge tray 2092 or 2093. Each of the sheet discharge trays 2092 and 2093 is moved upward and downward by a not-shown motor and controlled to reach the position of the processing tray 2094 before an image processing operation is started.

Numeral 2091 denotes a sheet tray on which slipsheets each of which is to be inserted between the two continuous transfer sheets discharged are stacked. Numeral 2095 denotes a Z folder which is installed as an option and folds the discharged transfer sheets into Z shape. Numeral 2096 denotes a bookbinding unit which is installed as an option and performs bookbinding by folding the center of the discharged transfer sheets of one copy and then stapling them. The obtained sheaf of transfer sheets is discharged to a sheet discharge tray 2097.

Further, a paper deck (or a sheet deck) 2050 which can hold, e.g., 4000 transfer sheets is installed as an option in the copying machine (body) 118. A lifter 2051 of the paper deck 2050 ascends according to a quantity of the stacked transfer sheets such that the uppermost sheet is always in contact with a pickup roller 2052, whereby the transfer sheet is fed to the body 118 by a pair of sheet feed rollers (simply referred as a sheet feed roller hereinafter) 2053. Further, a multipurpose manual feeder 2054 which can hold 100 transfer sheets is installed.

The development unit 2013 may be a type in which toner is refilled by changing a toner cassette, or may be a type in which toner is directly refilled. Further, the development unit 2013 can detect a residual toner quantity in the unit 2013 itself.

Here, although a structure of a monochromatic copying machine is explained by way of example of the image output apparatus of the present invention, the present invention is applicable to a color copying machine.

In this case, the development unit 2013 is composed of four, i.e., Y (yellow), M (magenta), C (cyan) and Bk (black), development parts. Further, the development unit 2013 can independently detect each of residual Y, M, C and Bk toner quantities.

Further, the copying machine 118 can detect a residual transfer sheet quantity in each of the first to fourth cassettes 2021, 2022, 2023 and 2024, and the paper deck 2050. The sheet discharge unit (sorter) 2090 can detect a residual staple quantity in the processing tray 2094. Since the sheet discharge unit (sorter) 2090, the Z folder 2095 and the paper deck 2050 are the options, they are detachably installed in the copying machine (body) 118.

Figure 4:
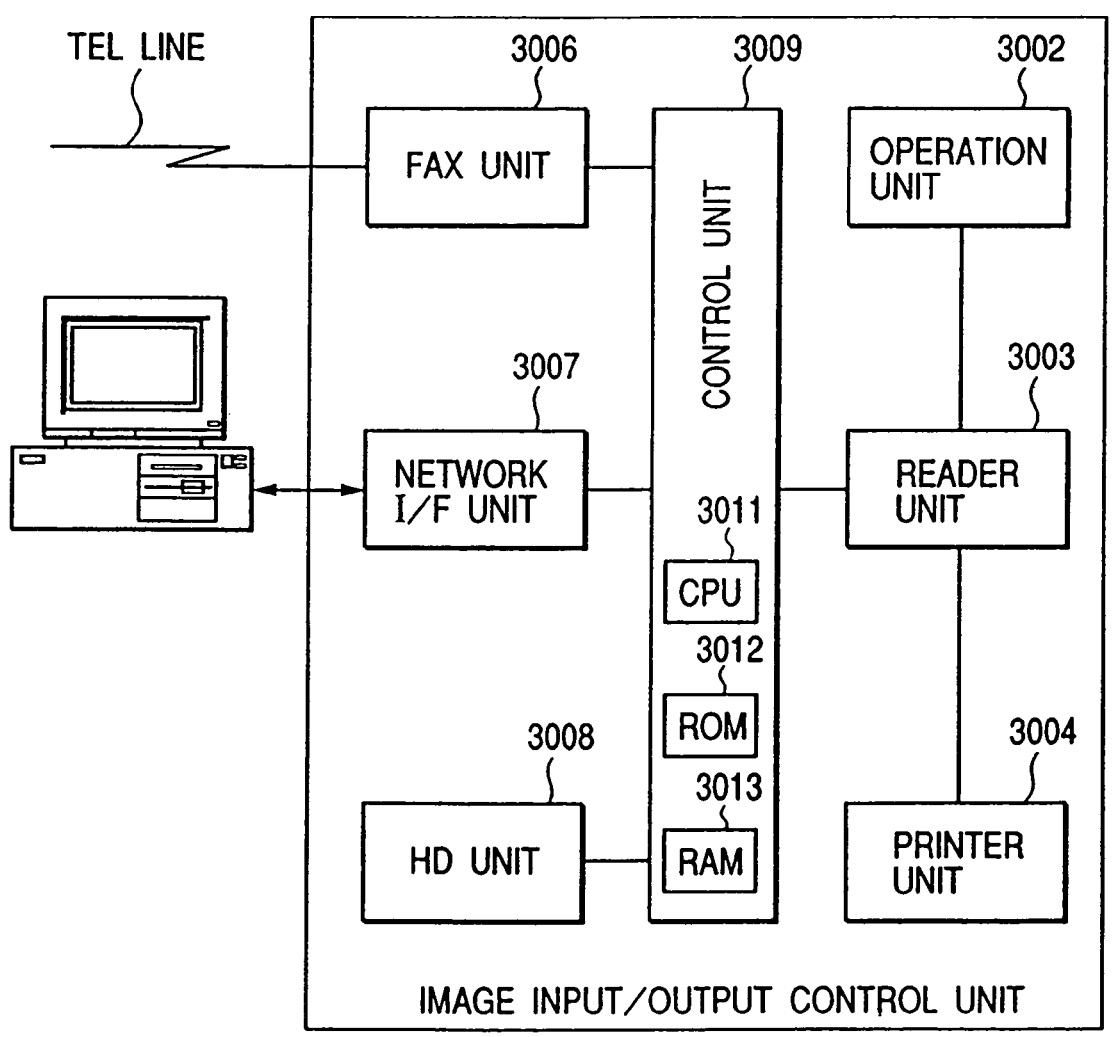
FIG. 4 is a block diagram for explaining a control structure of the copying machine shown in FIG. 3.

FIG. 4 is a block diagram for explaining a control structure of the copying machine 118 shown in FIG. 3. In FIG. 4, the same parts as those in FIG. 3 are added with the same reference numerals.

In FIG. 4, numeral 3002 denotes an operation unit which is used to perform various setting and instruct various operations for the digital copying machine (body) 118. Numeral 3003 denotes a reader unit which is composed of the elements 2001 to 2009 shown in FIG. 3, reads the original image, and outputs the image data corresponding to the original image to a printer unit 3004 and a control unit 3009. The printer unit 3004 which is composed of the elements 2009 to 2045 shown in FIG. 3 outputs the image according to the image data from the reader unit 3003 and the control unit 3009 onto a recording medium.

The control unit 3009 is connected with the reader unit 3003, a FAX (facsimile) unit 3006, a network I/F (interface) unit 3007 and an HD (hard disk) unit 3008, and entirely controls the copying machine 118.

The FAX unit 3006 decompresses compressed image data received through a telephone line, and transfers the decompressed image data to the control unit 3009. Further, the FAX unit 3006 compresses the image data transferred from the control unit 3009, and transmits the compressed image data through the telephone line. It should be noted that the compressed image data received by the FAX unit 3006 can be temporarily stored in the HD unit 3008.

The network interface unit 3007 is an interface between LAN 130 and the control unit 3009. The network interface unit 3007 develops code data (PDL: Page Description Language) representative of an image transferred from LAN 130 into image data which is sent to the control unit 3009 to be printed by the printer unit 3004.

The control unit 3009 is constituted of a CPU 3011, a ROM 3012, a RAM 3013 and the like. In accordance with data stored in ROM 3012 and data supplied from other portions, the control unit 3009 controls the data flow to and from the reader unit 3003, FAX (facsimile) unit 3006, network interface unit 3007 and HD (hard disk) unit 3008.

The HD unit 3008 including an unrepresented HD, a page memory and the like can store plural sets of image data. Plural sets of image data stored in the HD unit 3008 can be output in the order corresponding to the editing mode designated by the operation unit 3002 of the digital copying machine (main body) 118.

In the present embodiment, an unrepresented optional controller and the control unit 3009 as a main controller for the main body of the digital copying machine 118 can perform data communications with each other via signal lines on the apparatus. The option controller controls various option units such as ADF 2080, sheet deck 2050, sorter 2090, Z folder 2095, bookbinding unit 2096 and inserter 2091. The optional controller can access each option unit via a signal line. In accordance with an instruction from the control unit 3009, the optional controller supplies each option unit with a predetermined command to operate the option unit, issues a predetermined inquiry to receive a response to the inquiry and supplies it to the control unit 3009. In accordance with the contents of the response from the option unit and in accordance with whether the response is received or not, the optional controller checks the connection state of the option unit, and supplies the check result to the control unit 3009. The check result includes at least data representative of whether each option unit is not mounted or not, whether the option unit is mechanically and electrically connected, whether the option unit is not electrically connected although it is mechanically connected, whether the option unit is neither electrically nor mechanically connected, and the like. In this example, although the digital copying machine shown in FIG. 3 has been described mainly, the above-described processes can also be executed for other devices on the network and checked information can be transferred to other devices such as management server and PC via the network.

The control unit 3009 can supply information to each device (PC, management server and the like) connected with LAN 130 or WAN constituted of LAN's 130 and 100 shown in FIG. 1 via the network interface unit 3007. Such information includes a residual tone amount, residual transfer sheets of each size, a residual amount of staples, a copying state (open door, sheet jam and the like), a mount/dismount state of each option unit (sorter 2090, Z folder 2095, sheet deck 2050 and the like shown in FIG. 3).

Figure 5:
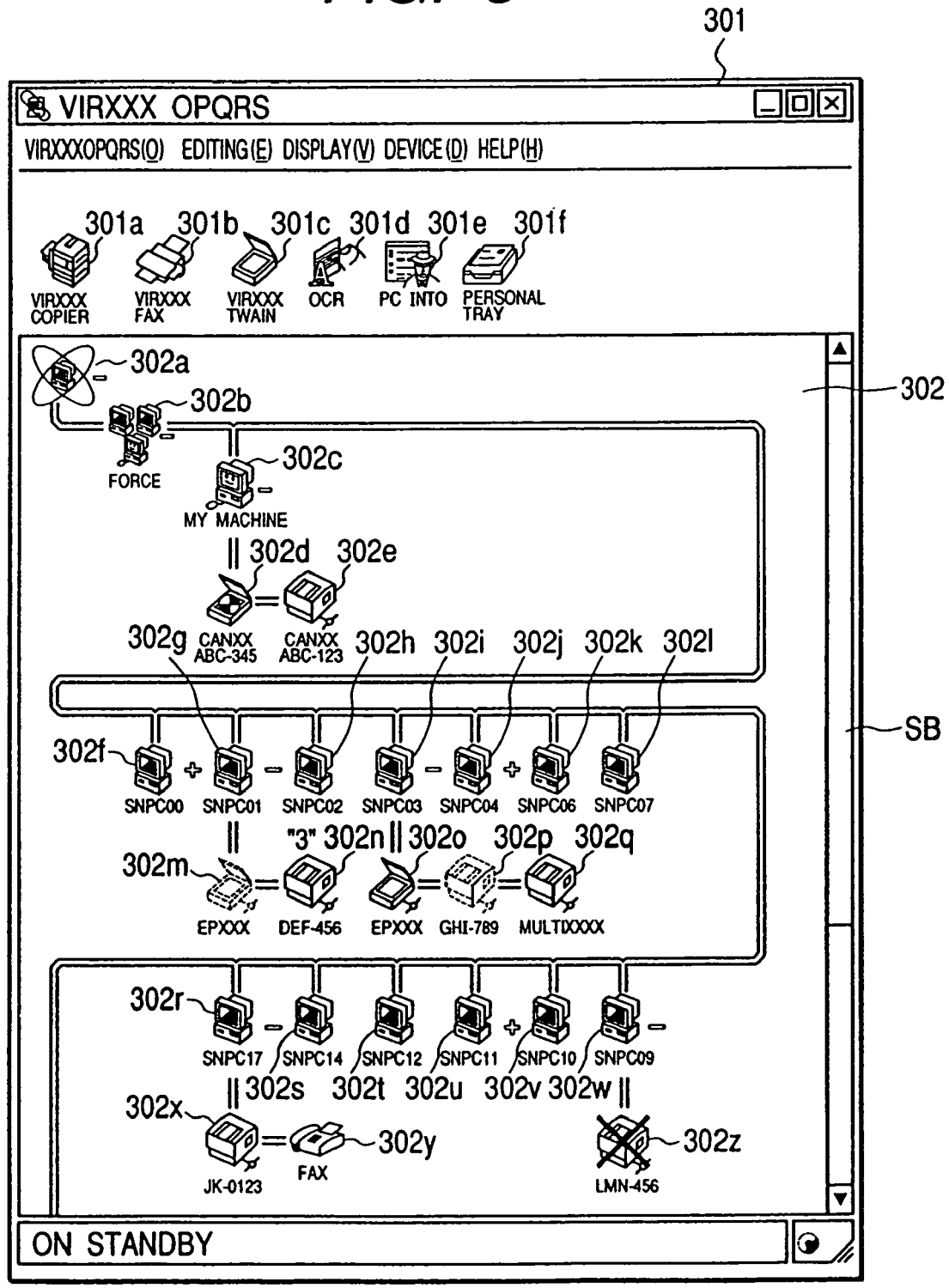
FIG. 5 is a view for explaining a first network connection structure displayed on a CRT (cathode-ray tube) shown in FIG. 2.

FIG. 5 is a display screen on a data processing apparatus shown in FIG. 2, e.g., of CRT 16 of PC, and illustrates a first network connection.

In FIG. 5, numeral 301 denotes a main window in which a menu and a tool bar are displayed, icons 301a to 301f representative of PC's (including a subject PC and other PC's) and devices (scanner, printer, fax machine and the like) and representative of functions to be executed by PC's and devices being displayed on the tool bar.

For example, the icon 301a is used for executing a copy function of reading image data from the selected scanner and outputting the image data to a selected printer. The icon 301b is used for executing a FAX function.

The icon 301c is used for executing an image data read function. The icon 301d is used for executing an OCR processing function by reading image data.

The icon 301e is used for executing a PC information display function. The icon 301f is used for executing a personal tray data display function. Numeral 302 denotes a system display window.

In the system display window 302, icons 302a to 302z represent PC's and devices shared by the network shown in FIG. 1. These icons represent a device type such as PC, printer, scanner, and FAX modem and a status such as "under processing" and "error".

Symbol 302a denotes a root icon, symbol 302b denotes a domain the subject apparatus logs in, and symbol 302c denotes the subject apparatus. Since the subject apparatus is a specific apparatus, its icon is different from the icons of other PC's.

Those PC's and devices, which although shared in the network, they are not installed with drivers, have icons such as 302m and 302p displayed in grey.

The icon 302d indicates that this scanner is under operation, and the icon 302n is added with, e.g., a numeral "3" indicating three jobs are spooled in this printer.

The icon 302z indicates that although a driver is being installed, the device cannot be used from some reason (such as failure, no toner and not sheet). As above, the connection state and status of all PC's and devices on the network can be graphically confirmed on the display screen. In this example, although all icons are not shown from the reason of the screen size, the connection state of all PC's and devices can be confirmed by using a scroll bar SB disposed laterally on the display screen.

Figures 6, 8:
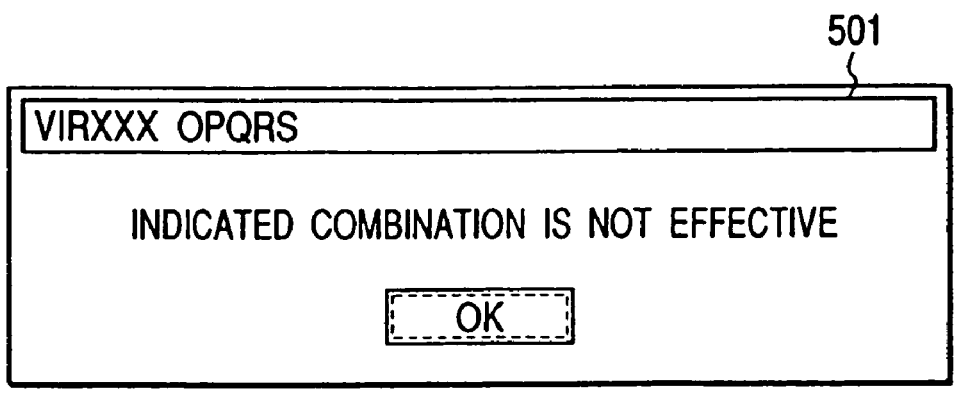
FIG. 6 is a view showing an example of a combination judgment data structure stored in a data processing apparatus shown in FIG. 2.
FIG. 8 is a view showing an example of an error message displayed on the CRT shown in FIG. 2.

FIG. 6 is a view showing an example of the structure of combination judgement data stored in the data processing apparatus shown in FIG. 2, the data being stored, for example, in the HD 10.

In FIG. 6, numeral 601 and 602 denote header segments. The header segment 601 stores the number of registered combination functions, and the header segment 602 stores a comment.

Symbol 603a to 603d denote data of one function. The data 603a is first device data, and the data 603b is second device data. In this example, the first device data corresponds to a scanner and the second device data corresponds to a printer. This combination may be reversed. The function data 603c corresponds to a function (in this example, copy function) which becomes executable when plural devices (in this example, scanner and printer) are virtually combined. The data 603d corresponds to a comment. In the present embodiment, the data segments 604a to 604d correspond to N-th data.

Figure 7:
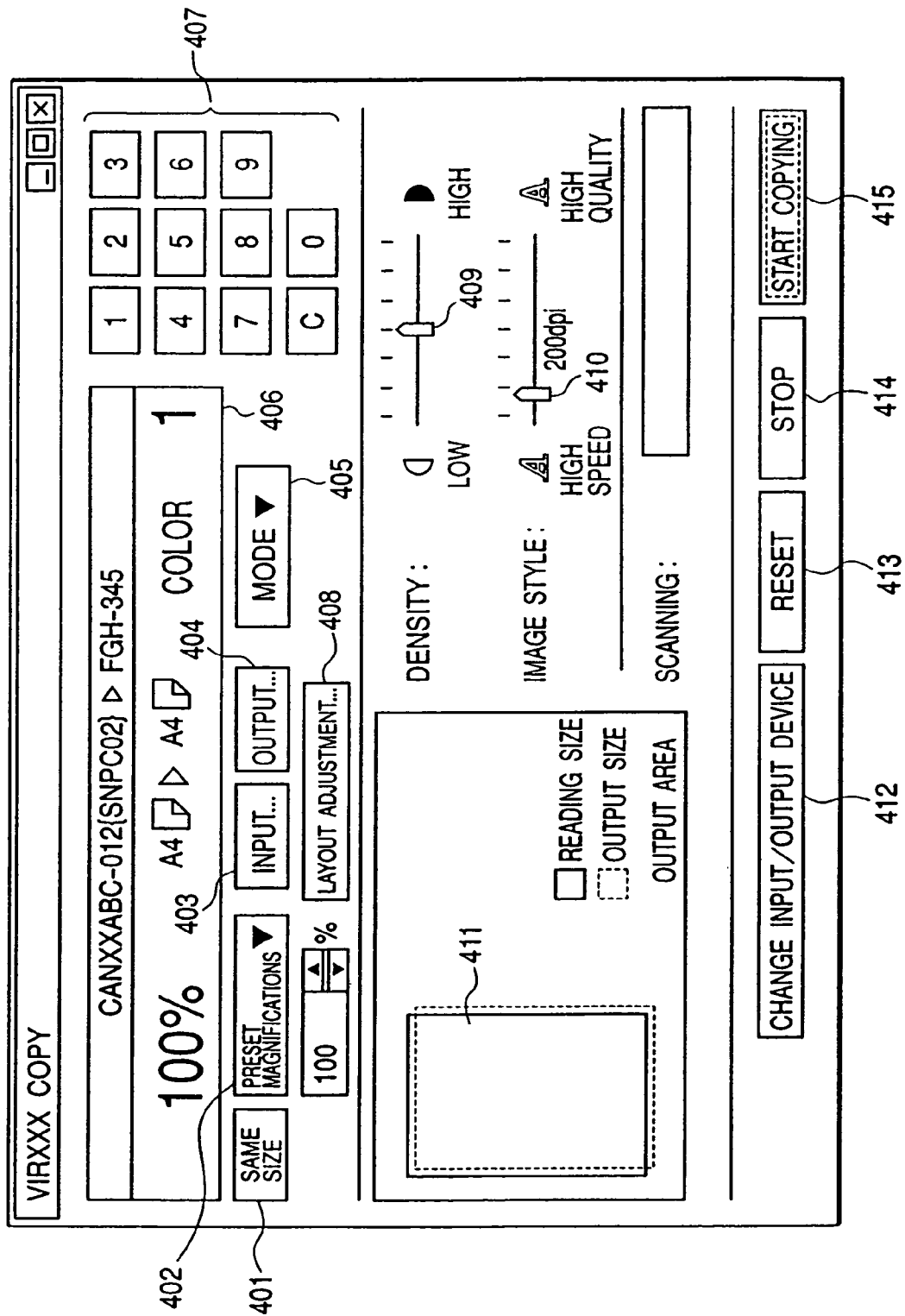
FIG. 7 is a view showing an example of a copying function setting screen displayed on the CRT shown in FIG. 2.

FIG. 7 is a view showing an example of a copy function setting screen displayed on CRT 16 of the data processing apparatus shown in FIG. 2. This screen is displayed on CRT 16 when the scanner icon is dragged and dropped upon the printer icon shown in FIG. 5 and this combination function is judged as effective.

The reason why such a setting screen is displayed will be described. The devices corresponding to a drag and drop operation on the screen shown in FIG. 5, in this example, the scanner and printer, are installed physically remotely and electrically connected by a communication path for data communications. The scanner has as an executable function at least an image input function, whereas the printer has as an executable function at least an image output function. Although these devices are installed physically remotely, the copy function can be executed if the functions of these devices are combined. Namely, by using these devices in combination; the copy function can be executed. For example, an original set by a user on the scanner is read and this read image is transferred via the communication path to the printer to print it out.

The setting screen shown in FIG. 7 is displayed to the operator of the data processing apparatus so that the operator can use the two devices as if they are one integral device. The different contents from those of the setting screen shown in FIG. 7 are given for a different combination of devices designated through a drag and drop operation. The above-described reason is also applicable to the screens shown in FIGS. 12 to 14, FIG. 42 and the like to be later described.

In FIG. 7, numerals 401 and 402 denote magnification factor setting buttons. The button 401 is depressed for an equal magnification, and the button 402 is depressed for a reduction/enlargement, to thereby set a desired magnification factor.

Buttons 403 and 404 are used for input/output sheet setting buttons. In response to a depression of the buttons 403 and 404, a dialog for setting the sheet size and direction is displayed to set the sheet size and direction. A button 405 is used for setting a color mode of an input image td set color, monochrome, grey scale and the like.

Numeral 406 denotes a setting content confirmation display segment for displaying the setting contents corresponding to the function designated by a combination of icons, in this example of the copy function, an equal magnification "100%", a vertical input sheet "A4", a vertical output sheet "A4", a color copy and the like being displayed.

Ten key buttons 407 set the number of output sheets. As a layout adjusting button 408 is depressed, a dialog for setting a sheet output position, a 2-in-1 output and the like is displayed.

A slider 409 is used for setting a desired image density with the mouse 13. A slider 410 is used for setting a desired image quality with the mouse 13.

A preview segment 411 displays an input size, an output size, and an output enabled area. A button 412 is used for changing input/output devices. When this button 412 is depressed, a dialog box is displayed to set input/output devices desired by a user different from those designated by a drag and drop operation. When a button 413 is depressed, the present copy function is reset and a predetermined standard copy function is set. Numerals 414 and 415 denote a stop button and a copy execution button.

FIG. 8 is a view showing an example of an error message displayed on CRT 16 shown in FIG. 2. This error message is displayed if the CPU 2 judges from stored judgement information that a combination of icons designated by a user with the mouse on the display screen shown in FIG. 5 is not effective.

In FIG. 8, numeral 501 denotes an error message dialog which is displayed when the designated combination is not effective.

In the present embodiment, the error message is displayed by judging whether the combination designated by a drag and drop operation is effective or not. Instead, the combination may be judged when the drag operation is performed to inhibit the drop operation.

Figure 9:
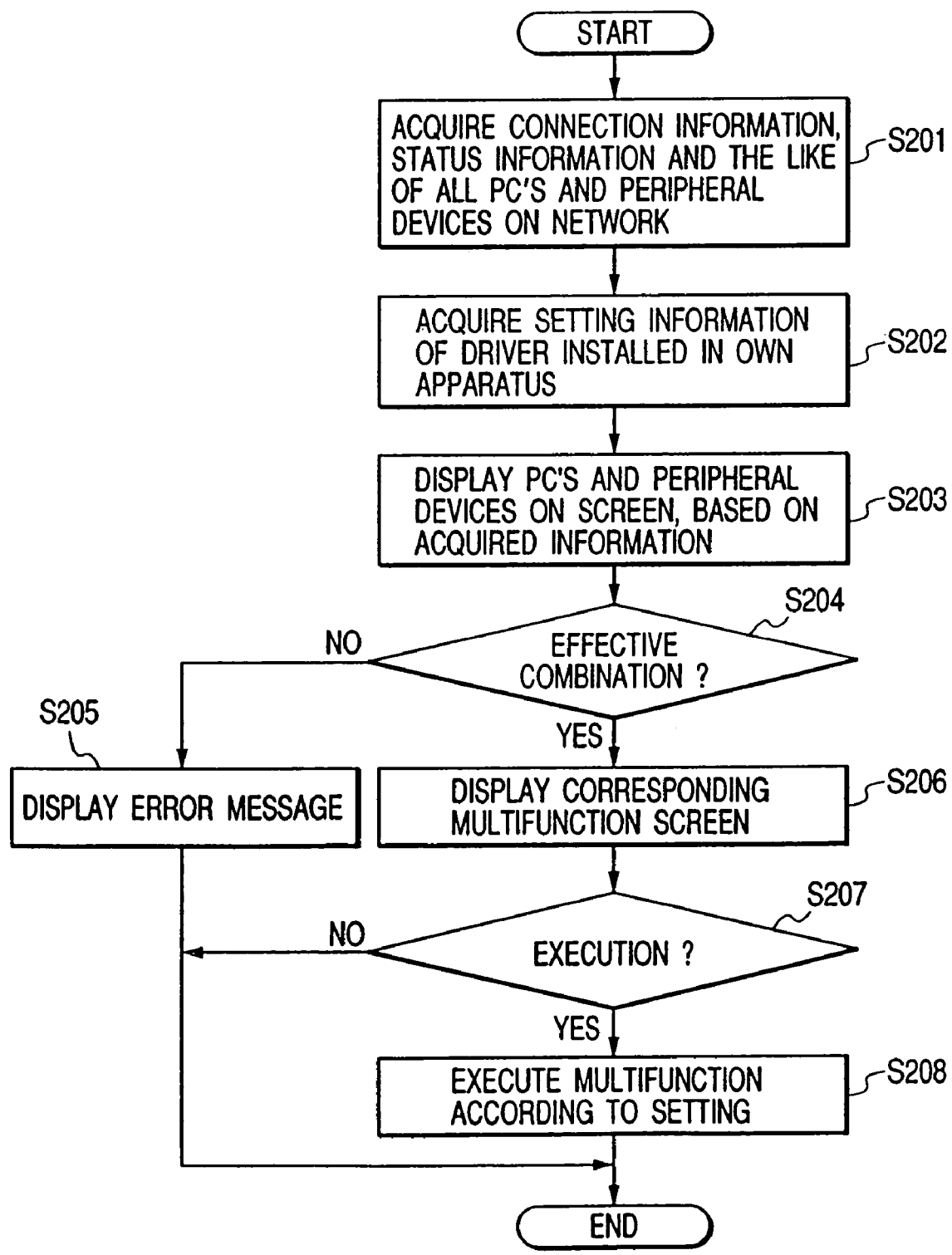
FIG. 9 is a flow chart showing an example of a first data processing procedure in the data processing apparatus according to the present invention.

FIG. 9 is a flow chart illustrating an example of a first data processing operation to be executed by the data processing apparatus of the present invention. This flow chart corresponds to the combination function execution operation after the system configuration display processing. This flow chart includes steps S201 to S208.

First, at the step S201 the connection information, use state information, and status information of all PC's and devices shown in FIG. 1 shared by the network are acquired. The acquired information is stored in PMEM 3 shown in FIG. 2. Next, at the step S202 the information of a driver installed at the subject apparatus is checked (acquired). At the step S203, in accordance with the acquired information, a display screen is displayed on CRT 16 of the subject apparatus to display at the same time the system configuration and system status shown in FIG. 5.

Next, at the step S204, it is checked whether the combination designated with the mouse is effective. For example, the scanner icon 302d is dragged and dropped on the printer icon 302n with the mouse on the display screen shown in FIG. 5. In this case, the copy function is executed.

If it is judged at the step S204 that the combination is not effective, the flow advances to the step S205 to display the error message on CRT 16 as shown in FIG. 8.

If it is judged at the step S204 that the combination is effective, the flow advances to the step S206 whereat the corresponding function window is displayed. In this example, the copy function setting screen shown in FIG. 7 is displayed on CRT 16.

Next, it is judged at the step S207 whether copy function is executed. If the button 414 on the virtual operation panel shown in FIG. 7 is depressed to enter a copy inhibition instruction, the processing is terminated.

If it is judged that a copy execution instruction is entered with the button 415, the flow advances to the step S208 to execute a copy operation in accordance with the setting contents to thereafter terminate the processing. Namely, an image of an original set on an actual scanner corresponding to the icon dragged on the display screen shown in FIG. 5 is input, the input image is transferred via the network to the actual printer corresponding to the dropped icon, the printer prints out an image on a printing sheet by performing a printing operation corresponding to the setting contents entered on the setting screen shown in FIG. 7.

Second Embodiment

In the first embodiment, each PC on the network communicates with each device and acquires device driver information from the device when the power of PC is turned on or at other timings. The connection information and operation status of each device are graphically and virtually displayed by an icon specific to the device in a different display form. The invention is applicable not only to a network system having printers, scanners and the like but also to a system having multi-function devices having at the same time both a printer function and a scanner function, or having these functions and another function (fax function, database function or the like). Such an embodiment will be described hereinafter.

FIG. 10 is a view showing an example of device driver information managed by a data processing apparatus according to the second embodiment of the invention. For example, at the initialization time such as at the time when the power of PC is turned on or at the time when an icon is depressed as will be later described, device driver information of a composite device connected with the network, e.g., the digital copying machine 118 managed by devices shown in FIG. 1 is acquired at PC on the network and stored and managed in PMEM 3 or HD 10. If a management server managing device driver information is connected with the network, the device driver information is acquired from the management server.

Although the description for FIG. 10 pertains mainly to the digital copying machine 118, each device on the network has the device driver information such as shown in FIG. 10. The device driver information may be acquired directly from PC or each device and managed in PMEM 3 or HD 10 (or management server), and in response to a request from another device, necessary information is read and transferred to the requesting device.

In FIG. 10, numeral 800 denotes acquired information. Numeral 801 denotes a header segment which stores a driver name, version information and a comment.

Numeral 802 denotes a page setting information segment constituted of an original size, an output sheet size, a printing direction, a page layout, a magnification factor, and a stamp. The original size and output sheet size are, for example, A4, A3 and B4. The printing direction is, for example, vertical and horizontal. The page layout is, for example, 1-in-1, 2-in-1, and 4-in-1. The magnification factor is, for example, 100% and 141%. The stamp is, for example, "Corporation Secret" and "Confidential".

In the present embodiment, the digital copying machine 118 has fundamental functions and in additions expansion functions such as a page layout function and a stamp function. In such a case, the page setting information includes information of the fundamental functions as well as information of the expansion functions such as the page layout function and stamp function. If one function has plural selectable candidates (e.g., user selectable candidates such as 2-in-1 and 4-in-1 of the page layout function, user selectable candidates such as "Secret" and "Confidential"), the details of this information are also stored. It is managed that when a user designates each function, the candidates are displayed on the operation panel so that the user can select a desired candidate.

Numeral 803 denotes a finish information segment including a printing method, a binding direction, and a sheet discharge method. The printing method includes, for example, a normal printing, a binding printing, a two-face printing, an OHP printing and the like. The binding direction is, for example, vertical and horizontal. The sheet discharge method is, for example, sort, group, and rotation sort.

In the present embodiment, the digital copying machine 118 can execute the fundamental functions such as normal printing as well and the expansion functions such as the staple function by the sorter 2090, sort function, binding function with bookbinding unit 2096 and two-face printing function. In such as case, the finish information segment 803 includes information of the fundamental functions as well as information of the such expansion functions executable by the subject apparatus. It is managed that when a user designates each function, the fundamental functions as well as the expansion functions are displayed on the operation panel so that the user can select a desired function.

Numeral 804 denotes a sheet feed information segment constituted of various sheet feed setting information (sheet feed method and OHP printing detail setting). For example, the sheet feed method is to use the cassette 1, to manually feed sheets, or the like, and the OHP printing detail setting includes a sheet feed port, an intermediate sheet, a sheet type or the like.

Numeral 805 denotes a device setting information segment including sheet feed/discharge option information (sheet feed option and sheet discharge option). The sheet feed option is used for setting a sheet feed option unit, and the sheet discharge option is used for setting a sheet discharge option unit.

In the present embodiment, the digital copying machine 118 has various option units including the ADF 2080, sheet deck 2050, sorter 2090, Z folder 2095, bookbinding unit 2096, inserter 2091 and the like. Therefore, for example, the sheet feed option 805 stores and manages information on each option unit such as the ADF 2080 and sheet deck 2050, and the sheet discharge option 805 stores and manages information on each option unit such as the sorter 2090, Z folder 2095, bookbinding unit 2096, and inserter 2091.

The device driver information of each device (in this example, device driver information 800) is also utilized in order to display a graphical image, function button or the like on CRT when a user designates the network device (in this example, digital copying machine 118) corresponding to the device driver information (to be later described with reference to FIGS. 12 to 14 and the like).

As described above, the device driver information is managed for each device. The managed device driver information becomes different for each device, for example, for devices capable of executing the printing function, depending upon whether the devices have the option unit, upon the type of the option unit, and upon the executable functions other than the fundamental functions such as the normal printing. As the device driver information is different, it is obvious that the display contents and form of the visual image, function button or the like to be displayed on CRT in accordance with the device driver information are different for each device.

Figure 11:
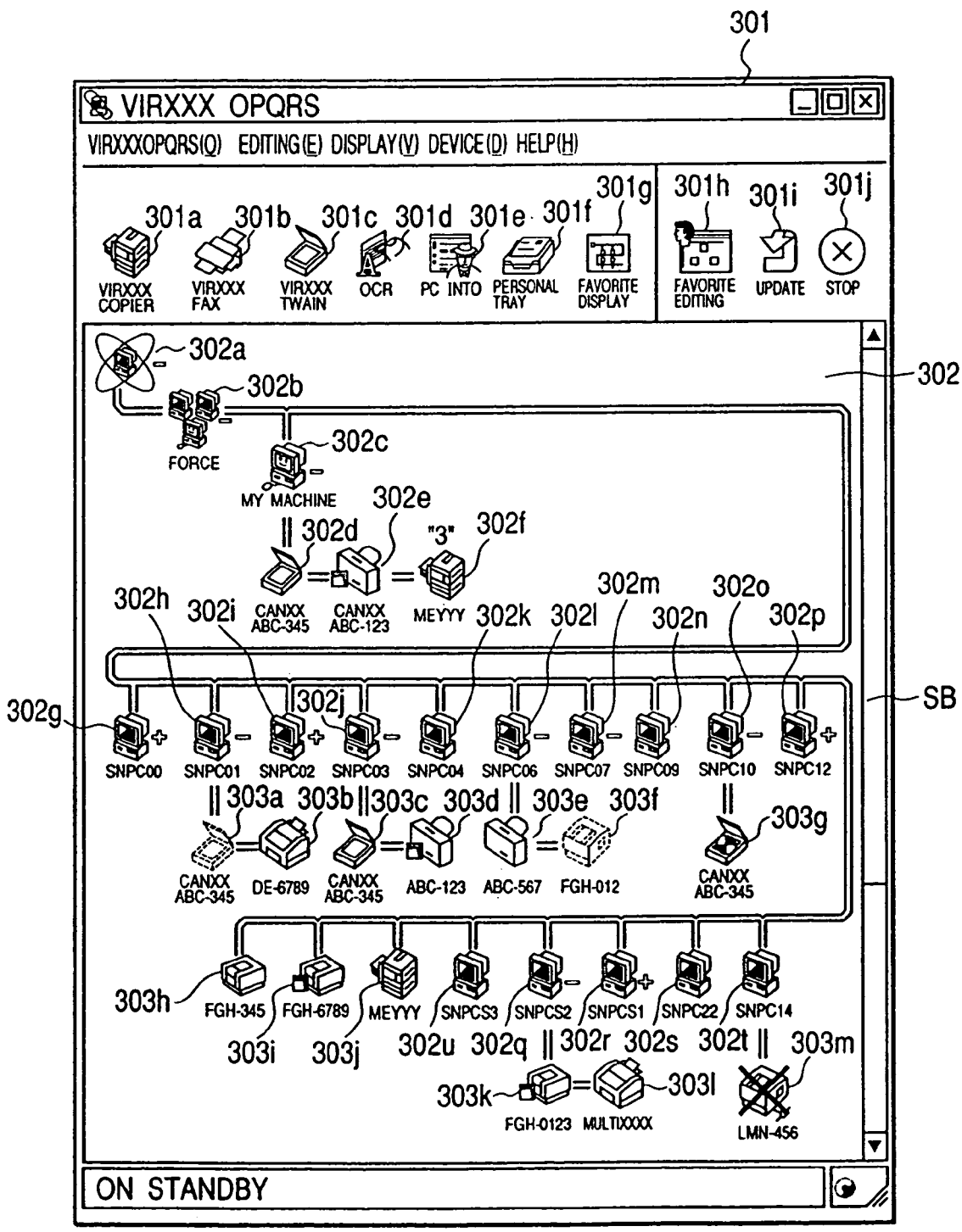
FIG. 11 is a view for explaining a second network connection structure displayed on the CRT shown in FIG. 2.

In the first embodiment, the same icons are used for the same type of devices. In the embodiment, data of an icon similar to the appearance of a product of each maker is stored in advance and this icon is displayed. It is therefore possible to discriminate between icons of devices of respective makers. As shown in FIG. 11, a maker name and a product name may be displayed near the icon.

If the device can used for color, a color mark CM (the details being shown in FIG. 11) is added.

Displaying an icon is controlled by device driver information managed in the HD 10 or PMEM 3.

The device driver information uses information of a device mode supported by the device driver. Therefore, even if a maker provide a new device (option unit), the new device can be used at once by installing the device driver of the device.

FIG. 11 is a view illustrating a second network connection configuration to be displayed on CRT 16 of the data processing apparatus shown in FIG. 2. In the system configuration state display screen shown in FIG. 11, like elements to those shown in FIG. 5 are represented by using identical symbols.

In FIG. 11, symbols 301g to 301j denote icons. As the icon 301g is clicked with the cursor of the mouse 13, the display screen is changed to an unrepresented favorite display screen (by dividing the system display window, icons of devices of the system registered as favorite devices frequently used by the subject apparatus user as well as the whole system are displayed).

The icon 301h is used for changing the system display window 302 to an editing window for registering an icon to the favorite window. The icon 301i is used for updating the contents of the system display window 302. The icon 301j is used for stopping the program for displaying the system display window.

Symbols 302g to 302u denote icons corresponding to other PC's connected with the network. An icon 302f corresponds to a composite device, for example, the digital copying machine 118 shown in FIG. 1, and is added with a numeral "3" indicating three jobs are spooled presently. The icon 302f has a specific icon and a device name different from input/output devices connected with the network devices.

Symbols 303a to 303m denote icons corresponding to input/output devices connected with the network devices. The icons 303a to 303m are specific icons (icons having very similar appearances to the actual devices connected) identified by the device names to display the connection and operation states thereof. The icon 303m with a "cross mark" indicates that the corresponding device cannot be selected because of some failure those icons (in this example, icons 303a and 303f) corresponding to the devices which although are connected, they are not installed, are displayed in grey.

Figure 12:
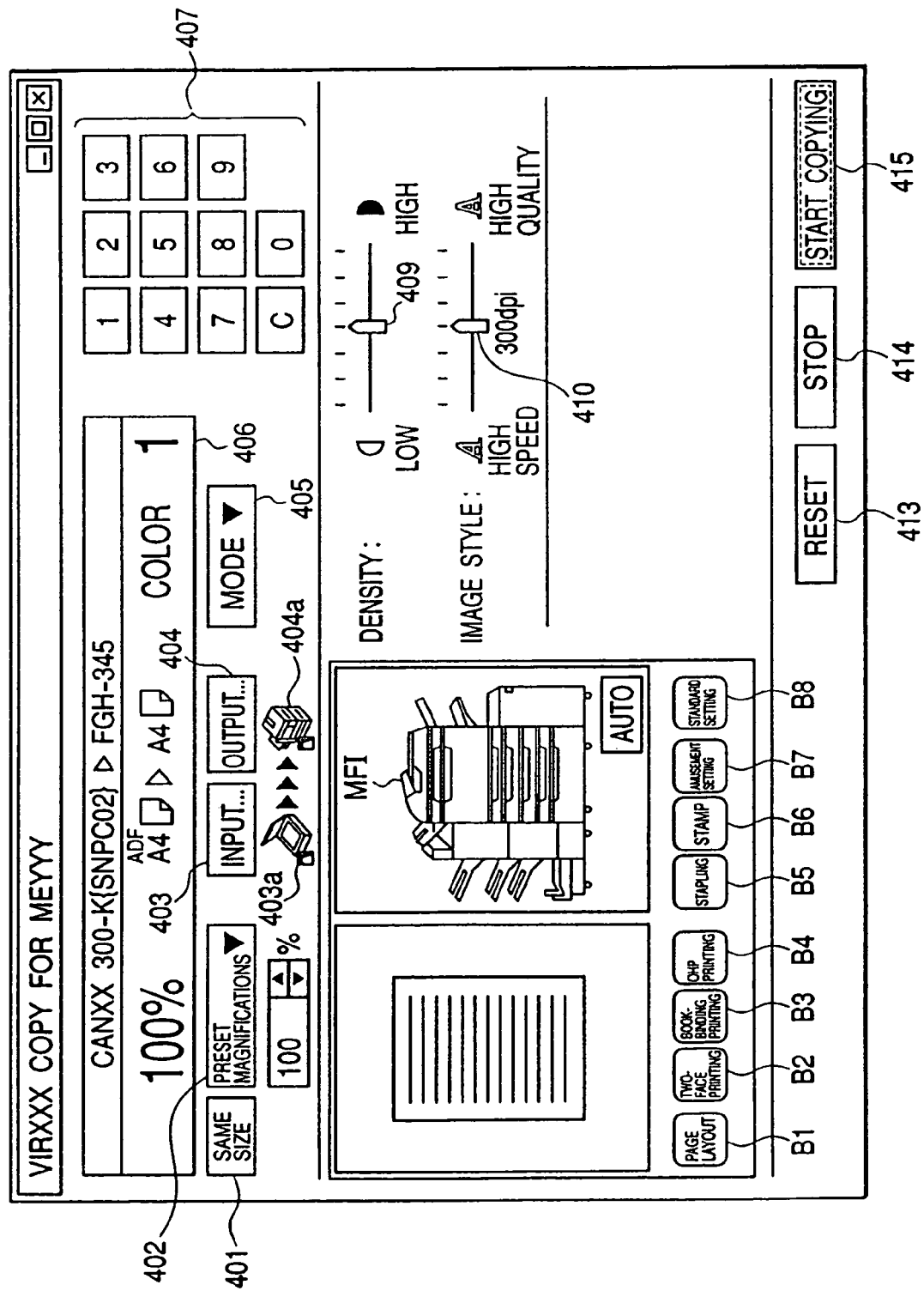
FIG. 12 is a view showing an example of a virtual operation panel displayed on the CRT of the data processing apparatus shown in FIG. 2.
Figure 13:
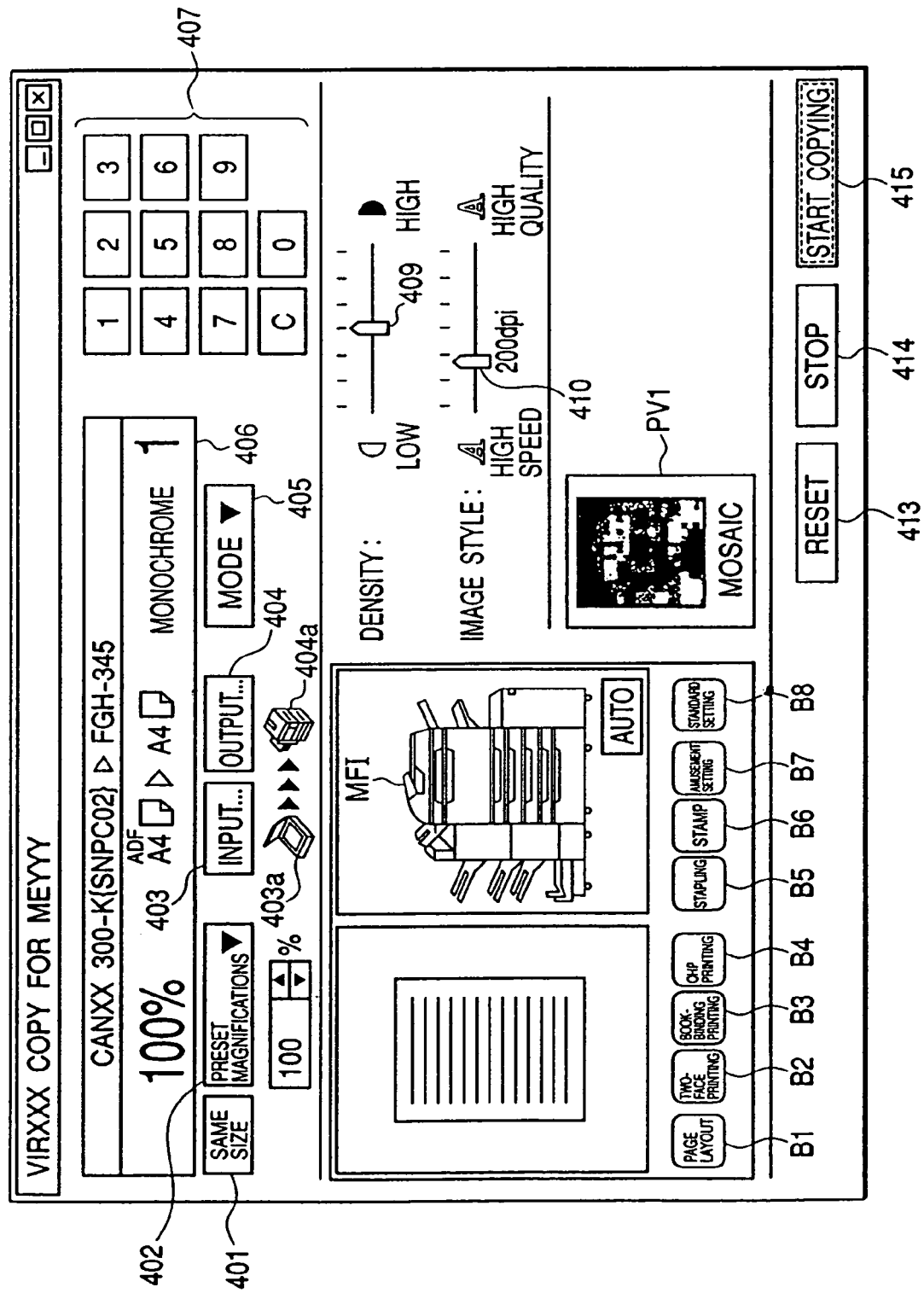
FIG. 13 is a view showing an example of the virtual operation panel displayed on the CRT of the data processing apparatus shown in FIG. 2.
Figure 14:
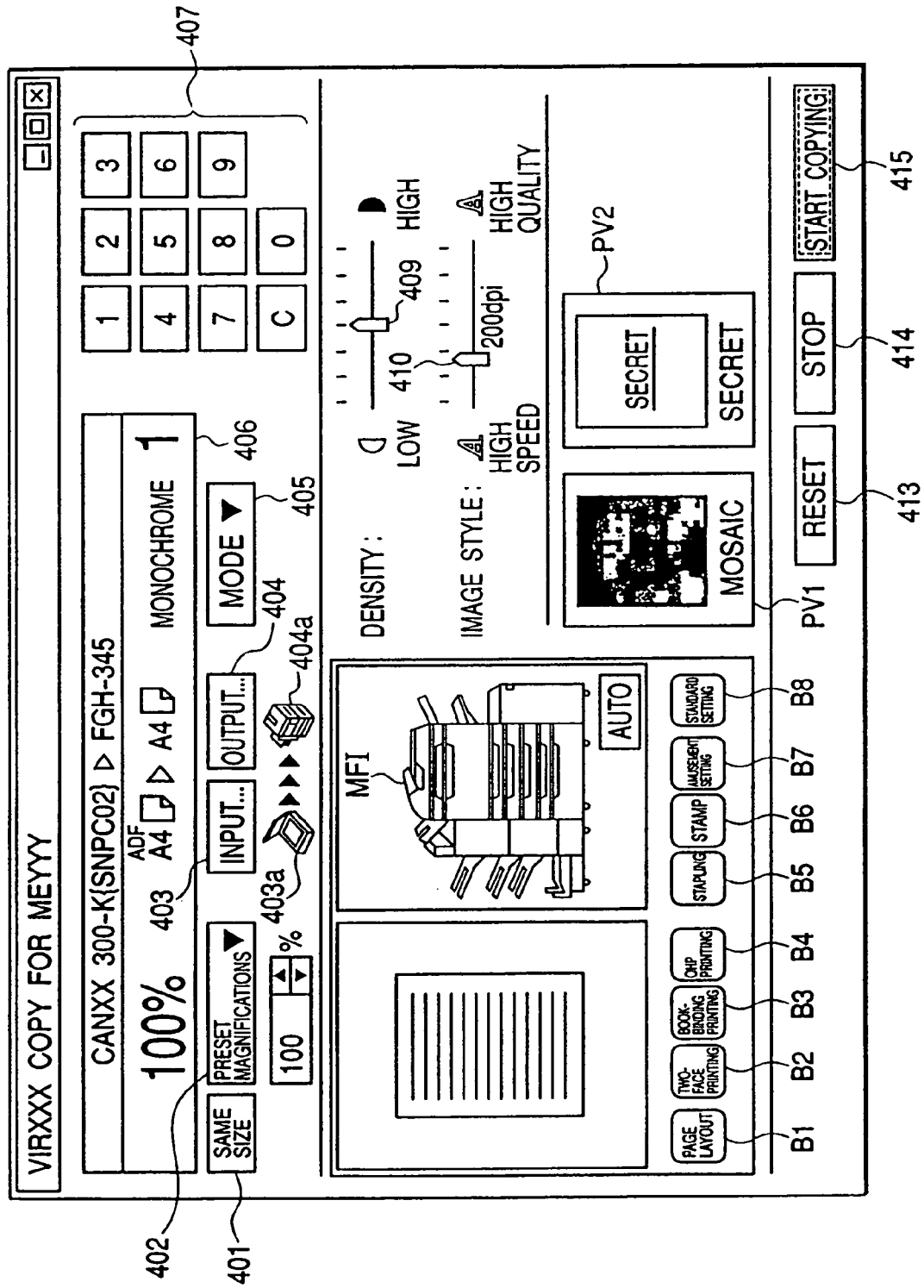
FIG. 14 is a view showing an example of the virtual operation panel displayed on the CRT of the data processing apparatus shown in FIG. 2.

FIGS. 12, 13 and 14 show examples of a virtual panel displayed on CRT 16 of the data processing apparatus (e.g. PC) shown in FIG. 2. When the scanner icon (e.g., 302d, 303c or the like) dragged in the state that the icon 302f shown in FIG. 11 is displayed in an effective state, is dropped on the icon 302f, the device driver information (e.g., device driver information shown in FIG. 10) and the like acquired from the digital copying machine 118 corresponding to the icon 302f and managed in the HD 10 or PMEM 3 are referred to display on CRT 16 an image which a user can visually confirm various option units including the digital copying machine 118 and the sorter 2090, ADF 2080, sheet deck 2050, and inserter 2091 connected with the digital copying machine 118. Namely, the displayed virtual operation panel changes with the types of icons subjected to a drag and drop operation (i.e., a combination of plural devices as one selected group). In FIGS. 12 to 14, like elements to those shown in FIG. 7 are represented by using identical symbols.

Symbols B1 to B8 shown in FIGS. 12 to 14 denote function buttons disposed in a predetermined display area of the setting screen (operation panel) and capable of being selected by a user with the mouse 13 or the like. The buttons B1 to B6 are operation buttons specific to the digital copying machine 118 (i.e., buttons for setting the expansion functions of the digital copying machine 118 different from the fundamental functions such as the normal printing). The buttons B1 to B6 are buttons approximately equal to those in the operation panel for the digital copying machine 118. The button B1 is designated with the cursor when the page layout mode (e.g., including a node of forming image data of plural pages on one side of one recording sheet: layout modes including an n-in-1 mode such as 2-in-1 and 4-in-1 and a 1-to-N mode of outputting one image to plural recording sheets) is to be set. In a default state, the sheet size is "A4", and the output image corresponding to the laterally written output is displayed (refer to an image visually expressing an output sheet displayed in a display area above the buttons B1 to B4).

The button B2 is depressed by a user when the two-face printing mode is designated. The button B3 is depressed when the bookbinding mode is to be performed. The button B4 is depressed when the OHP printing mode is to be performed. The button B5 is depressed when the staple mode is to be designated as the sheet discharge option of the digital copying machine 118. The button B6 is depressed when the stamp output mode is to be performed to output stamp information to be added to the output image, e.g., output an image such as an image of "Secret" superposed upon an output image (e.g., a mode of forming an input original image together with additional image such as an image of "Secret" on a recording sheet).

The functions to be set by these buttons B1 to B6 are the expansion functions possessed by the digital copying machine 118 (in this example, although six expansion functions of the digital copying machine 118 are displayed, if there are more expansion functions, they are also displayed in the display area to allow the user to select a desired one).

The button B7 is depressed for setting a fun setting mode of executing a function executable by PC and not possessed by the digital copying machine 118 (a PC function executable by PC). In the present embodiment, the fun setting mode includes two modes, an image effect setting mode and a stamp setting mode. As a user depresses the button B7, the display screen is changed to a setting screen for setting these two modes. The button B8 is depressed when the copy mode setting is to be reset to the standard mode.

As described above, in the present embodiment, the setting screen for setting a function executable by a device such as the digital copying machine 118 installed remotely from the subject apparatus can be displayed on CRT 16 of the subject apparatus. In addition, for example, even if there are plural printers having the printing function connected with the network, the expansion functions possessed by the devices can be displayed in a discriminable manner without uniformly displaying the display contents and forms of the setting screen of these devices. Namely, if the expansion functions of even those devices having the printer function are different, the contents to be displayed by using the buttons B1 to B6 of the setting screens shown in FIGS. 12 to 14 become different.

The buttons for allowing a user to set the expansion functions of a device such as the digital copying machine 118 installed remotely from the subject apparatus and the buttons for allowing the user to set the function executable at the subject apparatus (PC) can be all disposed and displayed in the predetermined display area of one setting screen. It is possible for the user to select a desired function.

Therefore, not only processing can be executed by using the devices designated by a drag and drop operation on the display screen shown in FIGS. 5 and 11 and the like, but also combination processing (composite processing) added with an image processing at the computer (PC) of the user side can be requested to the system and executed. Further, a user is not required to perform a cumbersome and complicated operation such as setting a digital copying machine on the setting screen of the digital copying machine, then setting the PC side on the PC setting screen, and then combining the above settings on a different display screen. The user can execute all desired settings by using one display screen without being conscious about the execution of different functions for plural devices.

In the operation panel displayed on CRT 16 shown in FIG. 13 or 14, PV1 and PV2 denote preview areas in which as an effect image to be selected by the PC fun setting to be described later, in the present embodiment, "mosaic" is selected, and as the stamp, "secret" is selected.

It is assumed that the resolution indicated by the slider 410 is automatically set to a half of the maximum resolution of a selected output device by considering the traffics of image data to be transferred on the network, and the resolution same as the automatically set resolution or near to it is automatically set as the resolution of an input device.

Therefore, in the display screen shown in FIG. 12, although the maximum resolution of a color copying machine is "600 dpi", the input resolution of a color scanner is set to a half of the printer resolution, i.e., "300 dpi".

Similarly, a resolution of, for example, about a half of the read resolution set to a scanner corresponding to the dragged icon is automatically set. It is possible to increase or lower the resolution in response to a user request.

MFI displayed in a display area above the display area for the buttons B5 to B8 is a system image. If the scanner icon is dropped on the icon 302f by a user with the mouse 13 or the like while it is displayed in an effective state on the display screen of FIGS. 5 and 11, then the CPU 2 of the apparatus confirms the device driver information (e.g., device driver information 800 shown in FIG. 10) acquired from the device corresponding to the icon, i.e., the digital copying machine 118, and managed in the HD 10 or PMEM 3. In accordance with this confirmation, image data expressing the detailed appearances of the whole image forming system including option units is displayed as the image MFI on CRT 16 in order to visually confirm the digital copying machine 118 and various option units connected with the main body of the digital copying machine 118 such as the sorter 2090, ADF 2080, sheet deck 2050, and inserter 2091. It is assumed that an automatically selected sheet feed unit among sheet feed units in the image MFI is displayed so as to be discriminated from other sheet feed units.

Each device has, as described earlier, the device driver information managed by the data processing apparatus to be used also for displaying the image MFI data displayed on the operation panel shown in FIGS. 12 to 14. The data processing apparatus manages the device driver information in a manner capable of discriminating the device driver information.

If the network has a digital copying machine of the same model as the digital copying machine 118 and it has no sorter and sheet deck, the device driver information of the device is different from that of the digital copying machine 118. The image MFI data to be displayed on the operation panel of PC corresponding to the device is only the main body of the digital copying machine 118 and the image data showing the appearances of a sorter, a sheet deck and the like of the digital copying machine 118 is not displayed. If a sorter is connected and a sheet deck is not connected, image data showing the appearances of the device main body and sorter is displayed as the image MFI. If a new sheet deck is installed, the device driver information of the device is updated, and image data showing the appearances of the device main body, sorter and sheet deck is displayed as the image MFI.

As described above, in the present embodiment, even for devices (e.g., image forming apparatuses) of the same type, depending upon whether an option unit is connected with the device, the display form of the image MFI to be displayed on the operation panel shown in FIGS. 12 to 14 and the like is made different for each device, and also depending on the type of a connected option unit, the display form is made different for each device. In this manner, the CPU 2 controls the display operation.

In the example described with FIGS. 12 to 14 and the like, in response to designation of a combination of a scanner and a digital copying machine on the display screen shown in FIG. 5 or 11, the device driver information of the digital copying machine is derived. In accordance with the derived device driver information, the display form on the operation panel shown in FIGS. 12 to 14 is determined. This is because the functions of the digital copying machine include also the functions of the scanner. Therefore, for example, if the scanner icon is not dropped on the icon 302f of the digital copying machine on the display screen of FIG. 11 or the like but it is dropped on the printer icon (e.g., 303h), the display contents and forms are determined in accordance with the device driver information of both the scanner and printer managed in the HD 10 or PMEM 3. In such a case, for example, image data showing the appearance of the digital copying machine main body not connecting an option unit such as ADF is displayed as the image MFI.

Icons 403a and 404a are used as buttons for setting input/output sheet sheets. In response to depression of the icon 403a, 404a, a dialog (e.g., FIG. 17 to be described later) for setting the sheet size, sheet direction and the like is displayed to allow detail settings including the sheet size, sheet direction, color/monochrome mode and the like.

Figure 15:
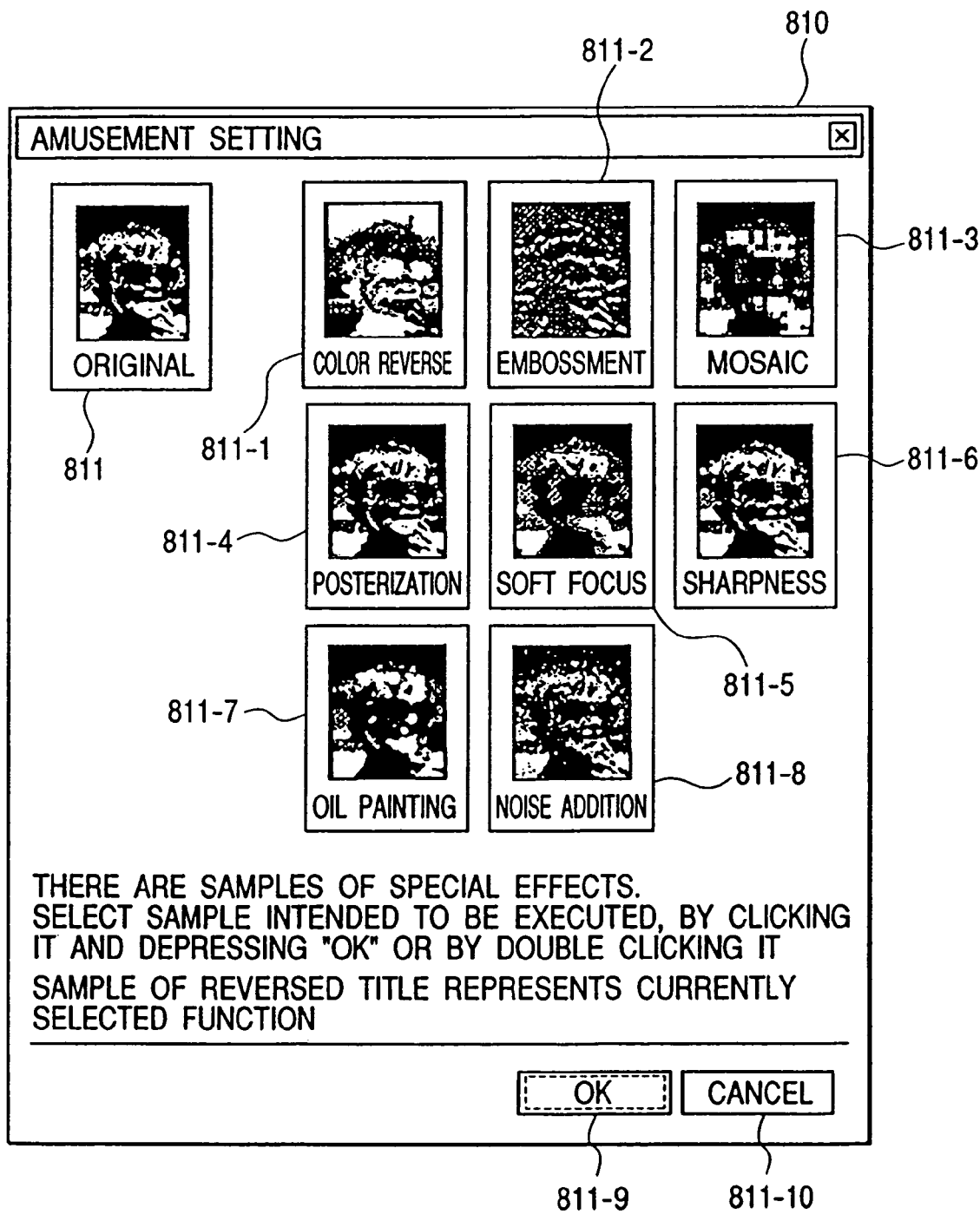
FIG. 15 is a view showing an example of a first window displayed, in case of amusement setting, on the virtual operation panel of the CRT of the data processing apparatus shown in FIG. 2.

FIG. 15 shows an example of a first window displayed on the virtual operation panel on CRT 16 of the data processing apparatus shown in FIG. 2 when the fun setting is initiated. This first window is displayed, for example, when a user selects "effect" on an unrepresented menu screen to be displayed when the user depresses the button B7 shown in FIG. 14 or the like.

In FIG. 15, numeral 811 denotes an original image input from a scanner. Numerals 811-1 to 811-8 denote effect images. The effect image 811-1 is a color reversed image, the effect image 811-2 is an embossed image, the effect image 811-3 is a mosaic image, the effect image 811-4 is a posterization image, the effect image 811-5 is a soft-focussed image, the effect image 811-6 is a sharpened image, the effect image 811-7 is an oil painted image, and the effect image 811-8 is a noise-added image. The effect image 811-3 is presently selected and the mosaic image is displayed in the preview area PV1 on the virtual operation panel shown in FIG. 13. If a button 811-9 is depressed, the selected effect can be established, or if a button 811-10 is depressed, the selected effect can be cancelled.

The effect processing is executed by an image software application of PC which performs a predetermined image processing calculation of scanner image data.

For example, consider the example shown in FIG. 11 and FIGS. 12 to 14. An image of an original set to a scanner corresponding to an icon dragged on the display screen shown in FIG. 11 is acquired by the scanner. The data processing apparatus receives the image from the scanner via the network. PC processes the image data supplied from the scanner so as to execute the effect processing corresponding to an effect candidate selected by the user on the window shown in FIG. 15. The image data processed by PC is transferred via the network to the digital copying machine 118 corresponding to the icon 302f to print the image on a recording sheet at the digital copying machine 118.

Figure 16:
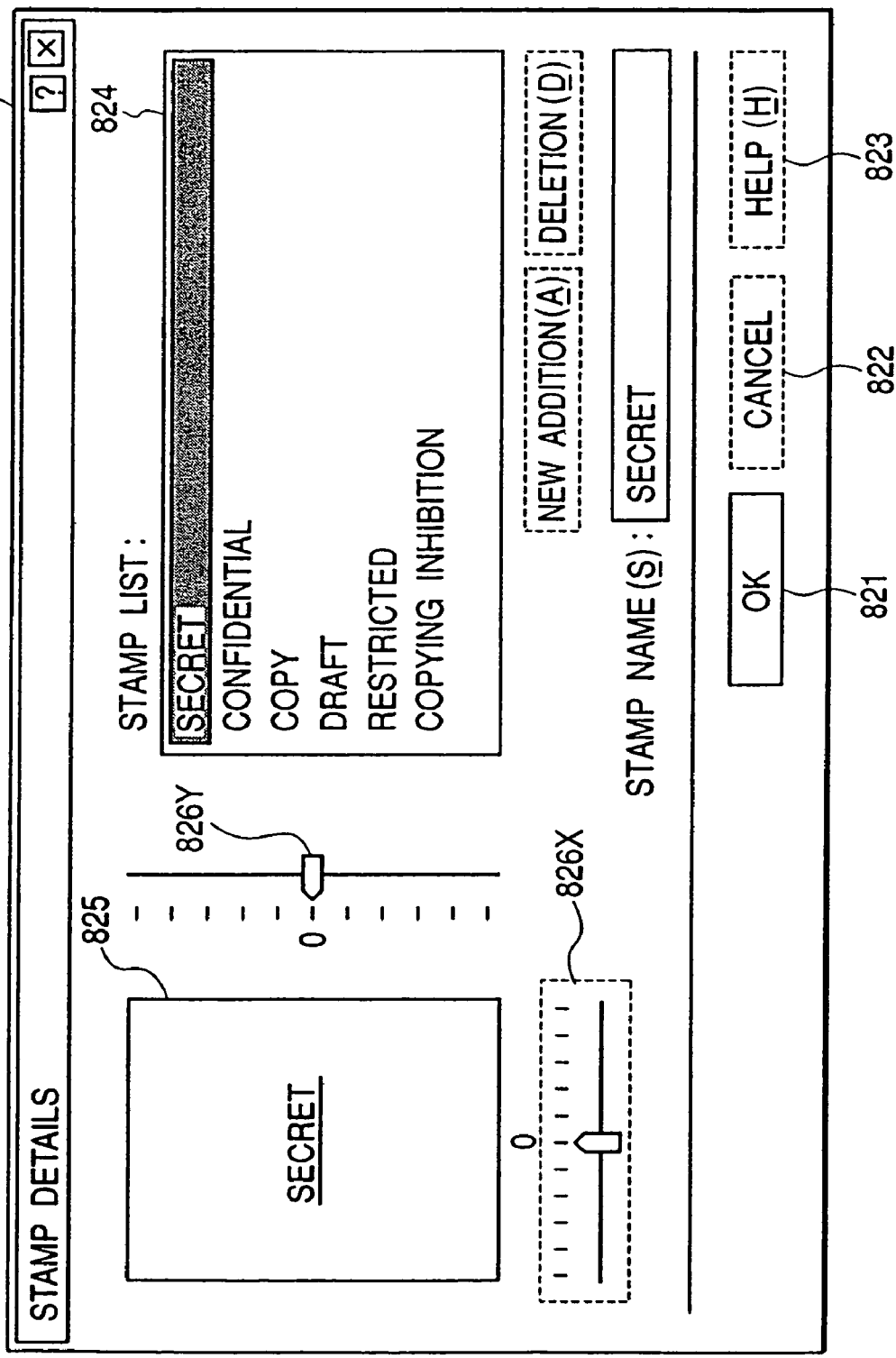
FIG. 16 is a view showing an example of a second window displayed, in case of amusement setting, on the virtual operation panel of the CRT of the data processing apparatus shown in FIG. 2.

FIG. 16 shows an example of a second window displayed on the virtual operation panel on CRT 16 of the data processing apparatus shown in FIG. 2 when the fun setting is initiated. This second window is displayed, for example, when a user selects "stamp" on an unrepresented menu screen to be displayed when the user depresses the button B7 shown in FIG. 14 or the like.

In FIG. 16, numerals 821 and 822 denote buttons which are used for selecting or cancelling a stamp (displayed in reversal) selected in a stamp list 824. A button 823 is used for displaying a help screen for the stamp processing.

Symbols 826X and 826Y denote sliders which can set a stamp position in an output sheet independently for X- and Y-directions. In the example shown, stamp information 825 is set at the center of the output image.

Stamp information registered in the stamp list can be newly added or deleted. Namely, printing data of stamp information desired by a user and formed by an application or the like, image data input from a scanner, or a combination thereof, are stored and managed in the HD 10 or the like. The stamp processing is executed by a function of PC not by a function of a copying machine. Similar to the effect processing, the data processing apparatus (PC) executes the stamp processing and stamp image data is transferred to the digital copying machine 118 to form a stamp image.

Figure 17:
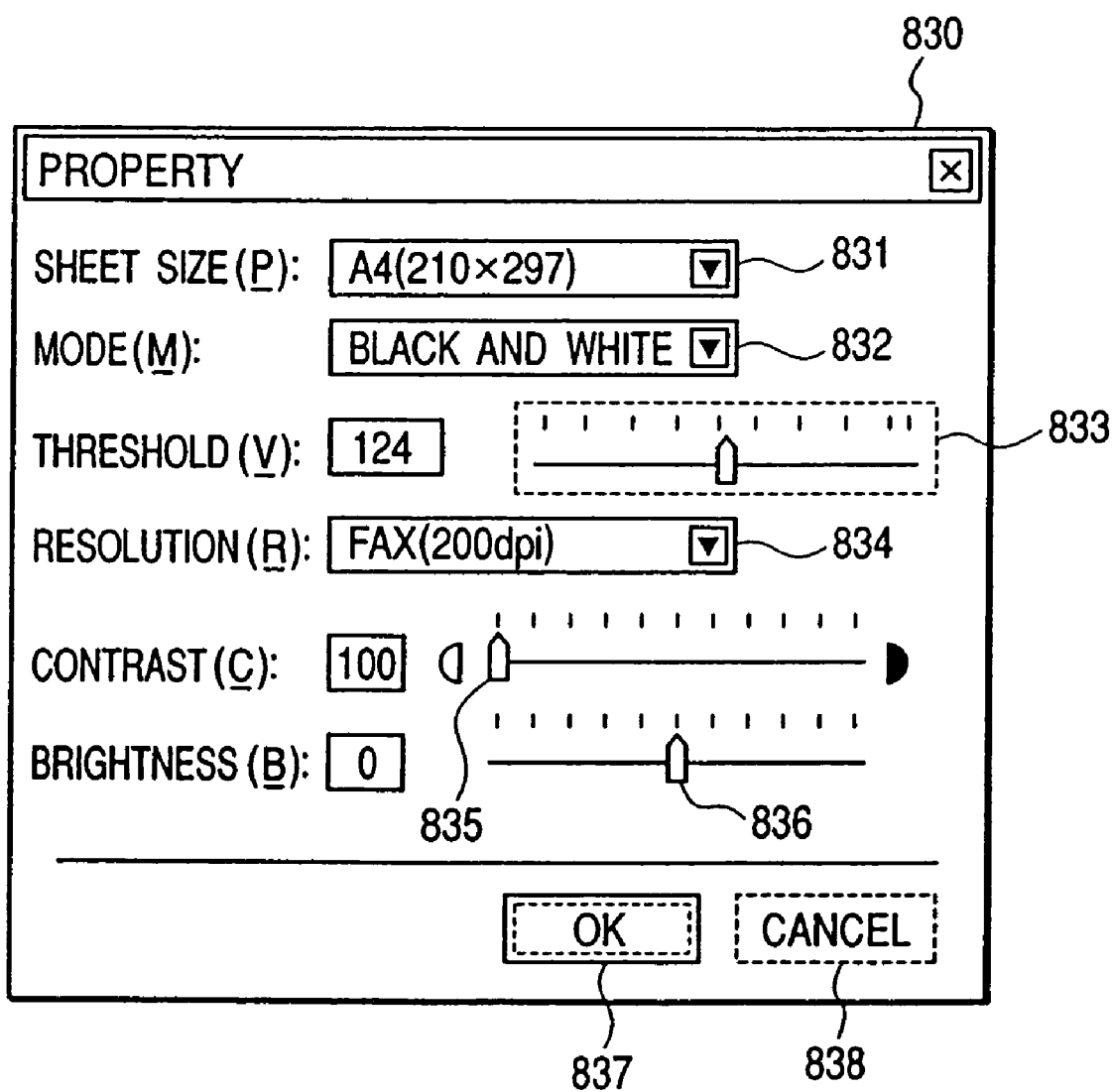
FIG. 17 is a view showing an example of a property screen displayed, according to icon instructions, on the virtual operation panel of the CRT of the data processing apparatus shown in FIG. 2.

FIG. 17 shows an example of a property window displayed upon operation of an icon displayed on the virtual operation panel on CRT 16 of the data processing apparatus shown in FIG. 2. The property window is displayed, for example, in accordance with the device driver information of the input and output devices acquired through a drag and drop operation of the icon 403a shown in FIG. 14 or the like.

In FIG. 17, numeral 830 denotes a property window through which various image input conditions of, for example, a scanner, can be set flexibly. In this example, a sheet size 831 is set to A4, a mode 832 is set to black and white, a resolution 834 is set to FAX 200 dpi. Numerals 833, 835 and 836 denote sliders. The slider 833 is used for setting a gradation threshold value, the slider 835 is used for setting a contrast, and the slider 836 is used for setting a brightness. Numerals 837 and 838 denote buttons. The button 837 is used for establishing the set contents, and the button 838 is used for cancelling the set contents.

FIG. 18 shows an example of a resource file of device drivers to be managed by the data processing apparatus of the second embodiment of the invention. For example, at the initializing processing such as when a power of PC is turned on or at the time of designation by an icon to be described later, this resource file of each device is displayed which is acquired and integrally managed by an unrepresented management server connected with the network.

In FIG. 18, numeral 800 denotes acquired information, numeral 801 denotes the header segment in which a driver name, version information and a comment are stored.

Numeral 802 denotes the page setting information segment constituted of resource offset information and page information (original size, output sheet size, printing direction, page layout, magnification factor, and stamp). For example, the original size and output sheet size are A4, A3, B4 or the like, the printing direction is vertical, horizontal or the like, the page layout is 1-in-1, 1-in-1 or the like, the magnification factor is 100%, 141% or the like, the stamp is "Secret", "Confidential" or the like.

Numeral 803 denotes the finish information segment constituted of resource offset information, a printing method, a binding direction, and a sheet discharge method. For example, the printing method is a normal printing, bookbinding printing, two-face printing, OHP printing or the like. The binding direction is vertical, horizontal or the like. The sheet discharge method is sort, group, rotation sort or the like.

Numeral 804 denotes the sheet feed information segment constituted of resource offset information and various sheet feed setting information (sheet feed method, OHP printing detail setting). For example, the sheet feed method is to use a cassette, to manually feed sheets, or the like. The OHP printing detail setting is a sheet feed port, an intermediate insertion sheet, a sheet type or the like.

Numeral 805 denotes the device setting information segment constituted of resource offset information and sheet feed/discharge option information (sheet feed option, sheet discharge option). For example, the sheet feed option means a sheet feed option unit, and the sheet discharge option means a sheet discharge option unit.

Numeral 806 denotes a resource data segment stored in which is specific image information (image components) including various icon image data for displaying the system configuration of devices. The resource data capable of being updated stored in the resource data segment 806 is used for displaying the system configuration state display screen shown in FIGS. 5 and 11 and FIG. 33 or the like to be later described, and the display screens shown in FIGS. 12 to 14, and the like.

Even if the functions of a composite device on the network are expanded by connecting a new option unit, a virtual operation panel or buttons representative of the expanded functions can be displayed flexibly by acquiring the newest resource file from the management server (refer to the display screens of FIGS. 12 to 14 and the like.

Figure 19:
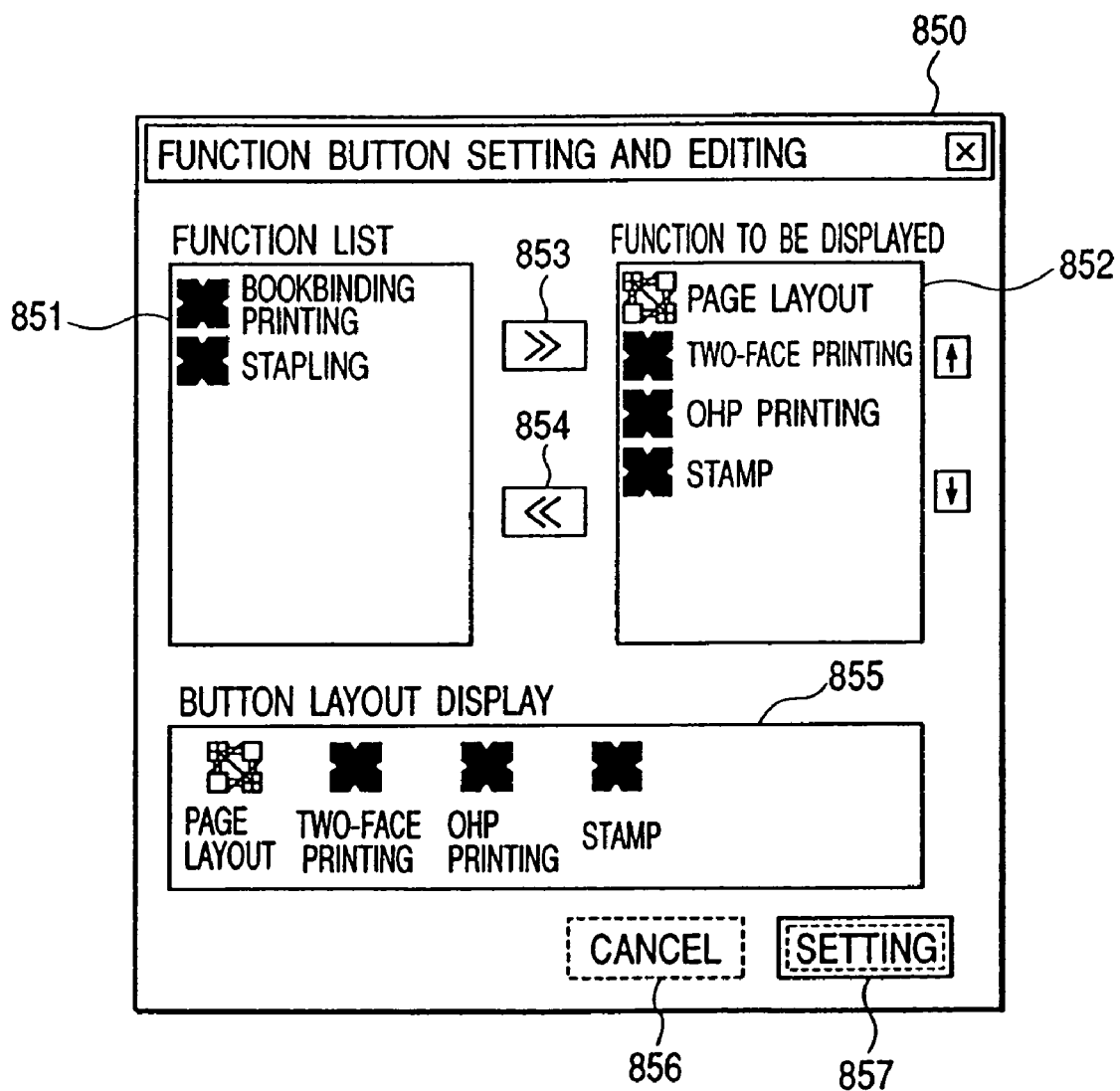
FIG. 19 is a view showing an example of a button editing screen displayed on the virtual operation panels shown in FIGS. 12 to 14.

FIG. 19 shows an example of an editing window for editing buttons to be displayed on the virtual operation panel shown in FIGS. 12 to 14 and the like. This editing window is displayed on CRT 16 so that a user can select a candidate for an expansion function to be displayed as a function button on the virtual operation panel shown in FIGS. 12 to 14 and the like, and can designate the layout order of function buttons.

In FIG. 19, numeral 850 denotes an editing window. In this window, a button to be displayed is selected from a function button group displayed in a function list area 81, and moved to a display function area 852 by using shift buttons 853 and 854, or alternatively a button is moved from the display function area 852 to the function list area 851. In this manner, displayed buttons can be edited.

Numeral 855 denotes a button layout display area. Buttons B1 to B6 shown in FIG. 12 or the like to be displayed are arranged in the order a user selected (the order can be arranged with the mouse or the like). This editing window is initiated when an editing program is read from the HD 10 in response to depression of an unrepresented editing button to be displayed on the virtual operation panel.

After buttons desired to be displayed are edited, a desired button to be displayed is established or cancelled by using buttons 856 and 857.

Data processing will be described. This data processing is executed by the CPU 2 shown in FIG. 2 in accordance with a program stored in the HD 10 or the like.

First, display/non-display is designated by the shift buttons 853 and 854 on the editing window 850, and the selected button is moved from the function list area 851 to the display function area 852 or vice versa.

Next, when a change designation of the button layout is effected on the button layout display area 855 of the editing window 850, the layout of buttons on the button layout display area 855 is changed in accordance with the change designation.

Next, when a setting designation is effected by the button 857 of the editing window 850, the setting on the editing window 850 is acquired and stored as setting function button layout information in the HD 10 or the like shown in FIG. 2 to thereafter close the editing window.

When a cancel designation is effected by the button 856 of the editing window 850, a setting designation on the editing window 850 is cancelled to thereafter close the editing window.

Candidates for the buttons B7 and B8 may be displayed on the editing window 850 together with candidates for the buttons B1 to B6. The user selects a candidate to be displayed as a function button on the virtual operation panel shown in FIGS. 12 to 14 and the like, from the displayed candidates, to determine the layout order.

As described above, according to the present embodiment, a function button (e.g., button B7) and a function button (e.g., buttons B1 to B6) can be displayed on one virtual operation panel (refer to FIGS. 12 to 14) in the order desired by a user. The function button (e.g., button B7) corresponds to a function executable by the subject apparatus (PC), and the function button (e.g., buttons B1 to B6) corresponds to an expansion function executable by another device (in the present embodiment, digital copying machine 118) installed remotely from the subject apparatus (PC). Obviously, it is possible to display only the function button corresponding to the expansion function executable by the remotely installed device or to display only the function button corresponding to the function executable by the subject apparatus. It is also possible for a user to determine whether the function button is displayed on the virtual operation panel, or if there are plural candidates for function buttons capable of being displayed, to determine the candidates to be displayed on the virtual operation panel shown in FIGS. 12 to 14 and the like and the layout order of these candidates. It is therefore possible for each client to display on its PC the function setting display screen in the display form desired by the client.

With the above processes, the function buttons (B1 to B8 shown in FIGS. 12 to 14) in a predetermined area on the virtual operation panel can be edited (layout order and display/non-display) by using the editing window 850 shown in FIG. 19. The function can therefore be set more easily.

Third Embodiment

In the above-described embodiment, it was explained the case where the desired function processing is performed by the drag-and-drop operation for the virtually displayed icons of the scanner and the printer or of the scanner and the multifunctional device. However, the management server on the network can sequentially manage the information concerning a resource remaining quantity for each printer by managing such the combined function or a log for each device. Thus, log information is acquired when a log demand is issued from the PC on the network or when the function is executed, whereby it is possible to display whether or not the set function can be executed or to effectively use the log information for each device. Hereinafter, the third embodiment will be explained.

Figure 20:
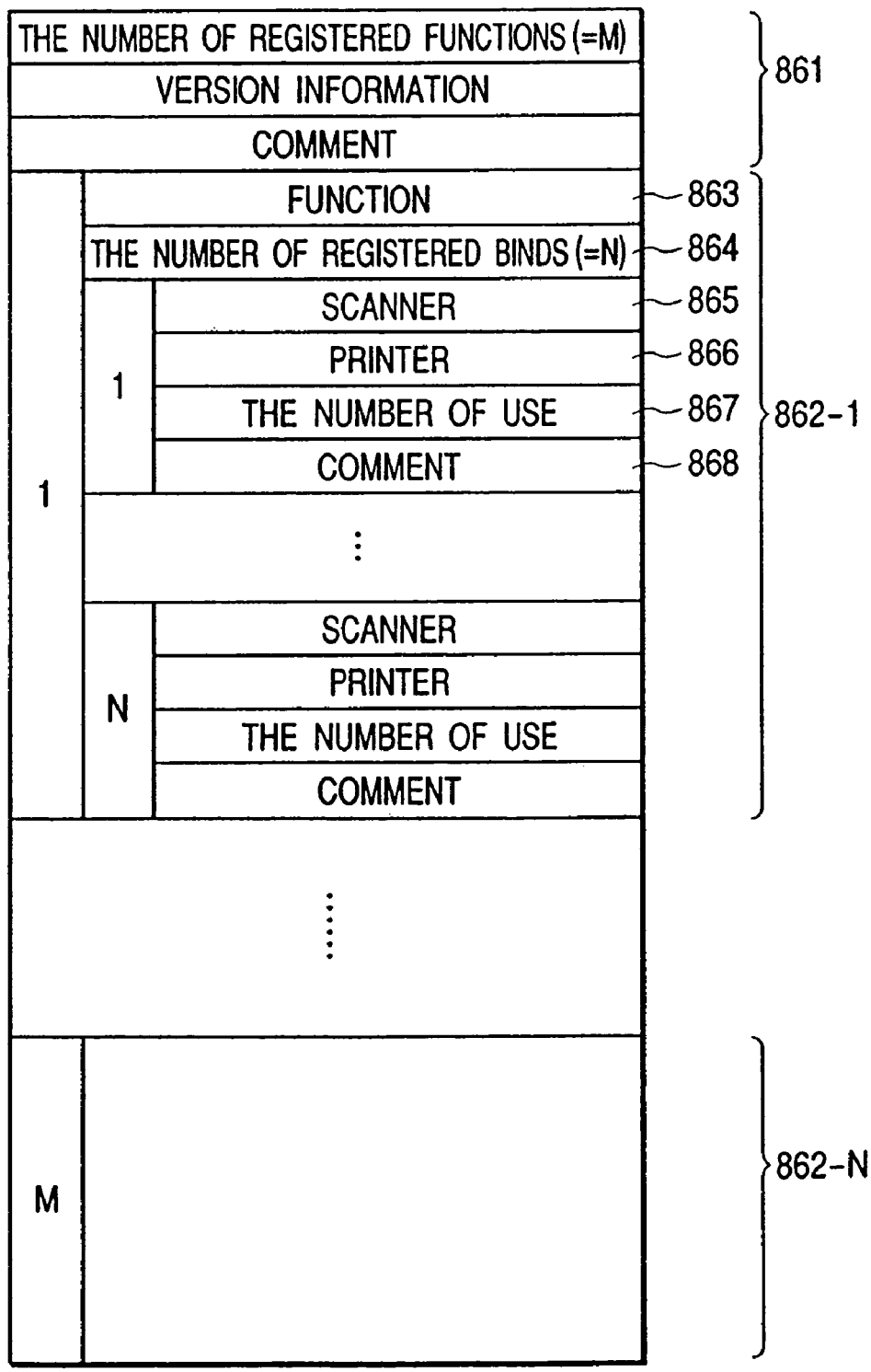
FIG. 20 is a view showing an example of log information managed by a data processing apparatus according to the third embodiment of the present invention.

FIG. 20 is a view showing an example of the log information managed by a data processing apparatus according to the third embodiment of the present invention. In the present embodiment, either of PC's on the network shown in FIG. 1 is registered as the management server, and the registered management server manages the function log information.

In FIG. 20, numeral 860 denotes the function log information which is composed of a header segment 861 and function log information segments 862-1 to 862-N.

Numeral 863 denotes a segment which corresponds to a function (e.g., a copying function) capable of using the network device. In the segment 863, discrimination information of the copying function is set. Numeral 864 denotes a segment which corresponds to the number of registered binds. The number of binds is the value which is counted every time a bind function is executed. Numeral 865 denotes a segment which corresponds to a scanner ID (identification). In the segment 865, a device ID corresponding to the dragged and dropped icon (scanner) on the network is set. Numeral 866 denotes a segment which corresponds to a printer ID. In the segment 866, a device ID corresponding to the dragged and dropped icon (printer) on the network is set.

Numeral 867 denotes a segment which corresponds to the number of uses. In the segment 867, the number of copying operations based on the identical combination is accumulatively counted and set. Numeral 868 denotes a segment which corresponds to a comment.

When the function execution is started by using the icon dragged and dropped by the user who operates the PC on the network, the function log information is notified to the management server and stacked on the HD in this server.

Further, according to an acquirement demand from the user on the network, the function log information managed by the management server is read and transferred to the demand sender's PC. The transferred function log information is maintained or subjected to data processing and then displayed in a list form or a visual form on the demand sender's PC.

FIG. 21 is a view showing an example of the log information managed by the data processing apparatus according to the third embodiment of the present invention. In the present embodiment, either of PC's on the network shown in FIG. 1 is registered as the management server, and the registered management server manages the device log information.

In FIG. 21, numeral 870 denotes printer log management information which is composed of a header segment 871 and printer log information segments 872-1 to 872-M. It should be noted that symbol M denotes the number of discriminating printers on the network.

Numeral 873 denotes a segment which corresponds to a printer name. In the segment 873, the printer name determined based on the device driver information is automatically set. Numeral 874 denotes a segment which corresponds to the number of logs. In the segment 874, the value N1 which is obtained by accumulatively counting the number of logs in the printer is set. Numeral 875 denotes a segment which corresponds to a comment. Numerals 876-1 to 876-N denote segments which correspond to log detail information. In the segments 876-1 to 876-N, input information (an application name or the like), the number of total printing pages, a preset sheet size, a longitudinal size of non-preset sheet, a lateral size of non-preset sheet, color printing/monochrome printing, one face/two faces, a toner use quantity, and the like are set. The toner use quantity is set based on toner use quantity information notified by the printer every time a printing job by the printer ends. Each log information is occasionally updated and managed in the HD of the management server.

Therefore, every time each printer on the network executes the job, latest log information is updated. Thus, when the printer function or the copying function is executed on the PC of the network, the log information might be used as judgment information to judge whether or not the set job can be executed with the current toner quantity. Therefore, when a command to demand the printer log management information is received from the PC on the network (e.g., when the user's operation to drag and drop the scanner icon to the printer icon to execute the copying function is issued as the key to the management server), the management server notifies the printer log management information managed based on ID (the printer name) of the designated icon, to the PC of the demand sender.

FIGS. 22, 23, 24 and 25 are views showing examples of the log information managed by the data processing apparatus according to the third embodiment of the present invention. In the present embodiment, either of PC's on the network shown in FIG. 1 is registered as the management server, and the registered management server manages the log information for each job.

FIG. 22 shows job information which is managed when a FAX function job is executed and corresponds to log item information in a reception folder. Concretely, a sender, a FAX number, date, a reception result, a reception time, a reception page, error information, resolution, a compression system and the like are managed as the log information by the management server.

FIG. 23 shows job information which is managed when the FAX function job is executed and corresponds to log item information in a transmission-end folder. Concretely, a receiver, a FAX number, date, a transmission result, a transmission time, the number of trials, a document name, the number of receivers, a transmission page, error information, a belonging of a receiver, a comment, resolution, a compression system, a server reception time, a sender, a sender's PC and the like are managed as the log information by the management server.

FIG. 24 shows log information of the scanner on the network shown in FIG. 1. The log information which includes items of user name, scan start time, scan end time, the number of total scan pages, machine name, TWAIN driver name, sheet size, height of sheets, width of sheet, color/monochrome and the like is notified to the management server, when the job using the scanner is executed. Then the notified log information is managed on the HD of the management server and read from the HD according to the log information demand from the user of the PC on the network, and the read log information is displayed on a display apparatus of the PC or the management server of the demand sender.

FIG. 25 shows log information of the printer on the network shown in FIG. 1. The log information which includes items of user name, printing start time, printing end time, the number of total printing pages, machine name, printer driver name, application name, the number of designated prints, preset sheet size, non-preset sheet longitudinal size, non-preset sheet lateral size, color/monochrome, one face/two faces, toner use quantity and the like is notified to the management server, when the job using the printer is executed. Then the notified log information is managed on the HD of the management server and read from the HD according to the log information demand from the user of the PC on the network, and the read log information is displayed on a display apparatus of the PC or the management server of the demand sender.

The toner use quantity data detected or calculated at the printer side is set as the toner use quantity.

<Explanation of Data Processing Procedure>

Hereinafter, the data processing procedure in the data processing apparatus according to the fourth to tenth embodiments of the present invention will be explained. The processing of the later-described fourth to seventh embodiments is executed by the CPU 2 on the basis of a program stored in the HD 10 of FIG. 2 or a not-shown storage medium.

Fourth Embodiment

Figure 26:
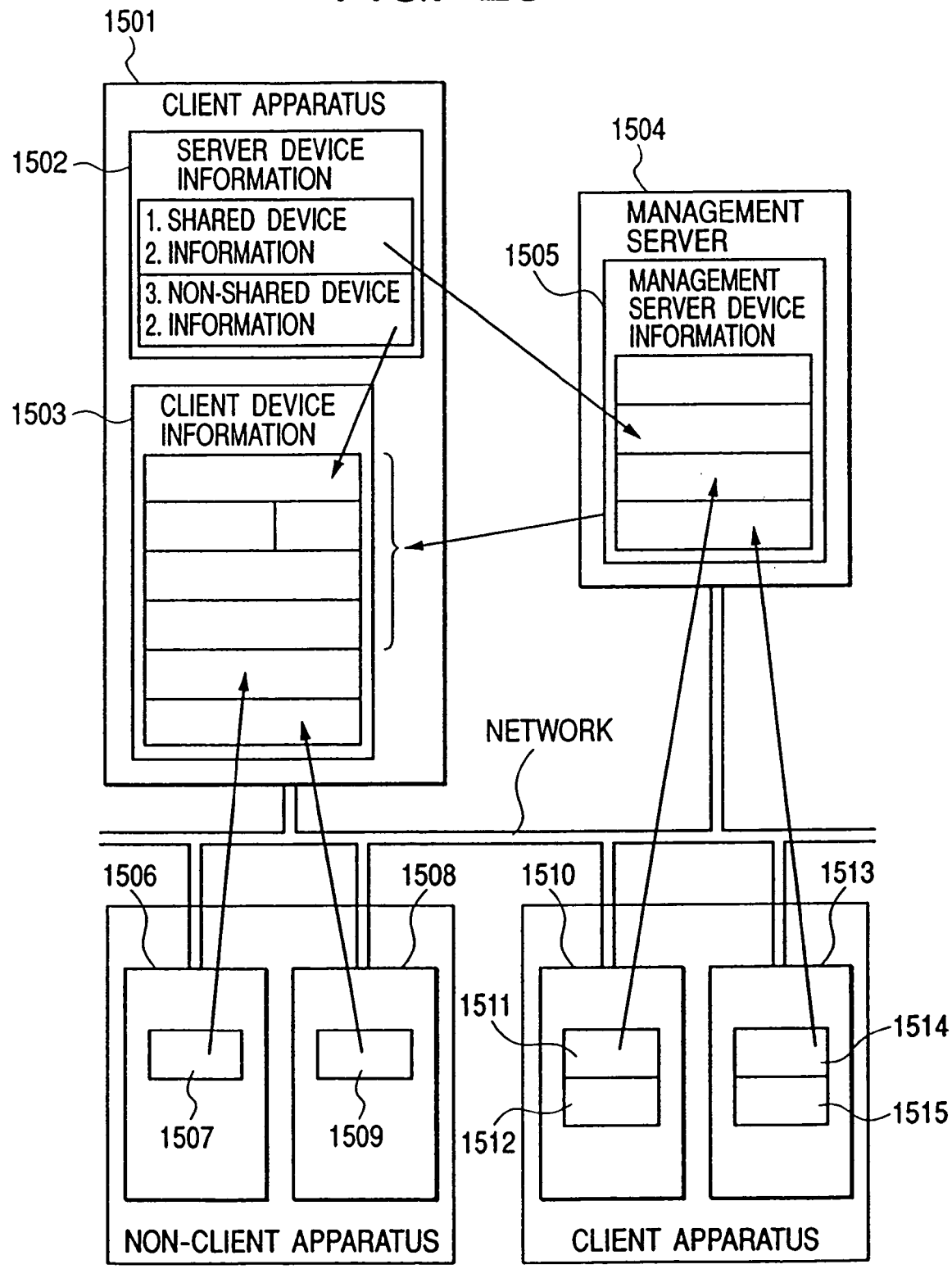
FIG. 26 is a view showing relation between a data processing apparatus registered as a management server and a client device, in the data processing apparatus according to the present invention.

FIG. 26 is a view showing relation between the data processing apparatus registered as the management server and a client device, in the data processing apparatus according to the present invention.

In FIG. 26, numerals 1501, 1510 and 1513 denote client apparatuses. Numerals 1502, 1511 and 1514 denote server device information (later-described FIG. 30), and numerals 1503, 1512 and 1515 denote client device information (later-described FIG. 31) which are all stored in the HD 10 of FIG. 2.

The server device information 1502 (1511, 1514) is composed of information (1. shared device; 2. information) of the devices shared on the network and information (3. non-shared device; 4. information) of the devices not shared on the network, acquired according to the device driver information installed in the user's own apparatus, and managed in a client program in the client apparatus 1501 (1510, 1513).

Numeral 1504 denotes a management server which stores and manages management server device information 1505 (later-described FIG. 27) in the HD 10 of FIG. 2. Numerals 1506 and 1508 denote non-client apparatuses in which a server program, a client program, programs represented by later-described flow charts, and the like are not installed. The non-client apparatuses 1506 and 1508 store device information 1507 and 1509, respectively.

The client device information 1503 (1512, 1515) is composed of the server device information, the device information of the client apparatus effective or available on the network, and the device information of the non-client apparatus, acquired by the management server and the non-client apparatus, and managed by the client program in the client apparatus 1501 (1510, 1513).

FIG. 27 is a view for explaining the management server device information 1505 shown in FIG. 26.

As shown in FIG. 27, the management server device information 1505 is composed of header information 1601, an index table 1602, and device information (client PC device information data) 1603-1 to 1603-N of the client apparatuses effective or available on the network.

Each of elements [0] to [N−1] in the index table 1602 is composed of a data offset, a data size and a flag. The elements [0] to [N−1] correspond to the device information 1603-1 to 1603-N, respectively.

Further, each of the device information (client PC device information data) 1603-1 to 1603-N of the client apparatuses is composed of PC information 1604 (later-described FIG. 28), printer information 1605 (later-described FIG. 28), scanner information 1606 (later-described FIG. 29), and FAX board information 1607 (later-described FIG. 29).

Further, the device information 1603-1 to 1603-N of the client apparatuses correspond to the information (1. shared device; 2. information) of the device shared on the network which is acquired from the server device information 1502, 1511 and 1514 shown in FIG. 26.

FIG. 28A is a view for explaining in detail the PC information 1604 shown in FIG. 27, and FIG. 28B is a view for explaining in detail the printer information 1605 shown in FIG. 27.

The PC information 1604 is composed of information and content, as shown in FIG. 28A.

The printer information 1605 is composed of information, content and an acquirement method, as shown in FIG. 28B.

FIG. 29A is a view for explaining in detail the scanner information 1606 shown in FIG. 27, and FIG. 29B is a view for explaining in detail the FAX board information 1607 shown in FIG. 27.

The scanner information 1606 is composed of information, content and an acquirement method, as shown in FIG. 29A.

The FAX board information 1607 is composed of information, content and an acquirement method, as shown in FIG. 29B.

FIG. 30 is a view for explaining the server device information 1502, 1511, 1514 shown in FIG. 26. In FIG. 30, it should be noted that the same content as that in FIG. 27 is added with same explanation.

In FIG. 30, numeral 1701 denotes local device information (or local device information data) which represents the devices locally connected with the user's own apparatus. The structure of the local device information 1701 is the same as that of the device information 1603-1 to 1603-N of the client apparatus shown in FIG. 27.

As shown in FIG. 30, the server device information 1502 is composed of the header information 1601, the index table 1602 and the local device information 1701.

FIG. 31 is a view for explaining the client device information 1503 (1512, 1515) shown in FIG. 26. In FIG. 31, it should be noted that the same content as that in FIG. 27 is added with same explanation.

As shown in FIG. 31, the client device information 1503 is composed of the header information 1601, the index table 1602, the local device information 1701, the device information (client PC device information data) 1603-1 to 1603-N–1 of the client apparatuses effective or available on the network, the device information 1507 of the non-client apparatus 1506, and the device information 1509 of the non-client apparatus 1508.

The structure of the printer information in each of the device information 1507 and 1509 of the non-client apparatuses 1506 and 1508 is the same of that of the printer information 1605 shown in FIG. 28. As the printer information, only a shared name and a server name are set.

Figure 32:
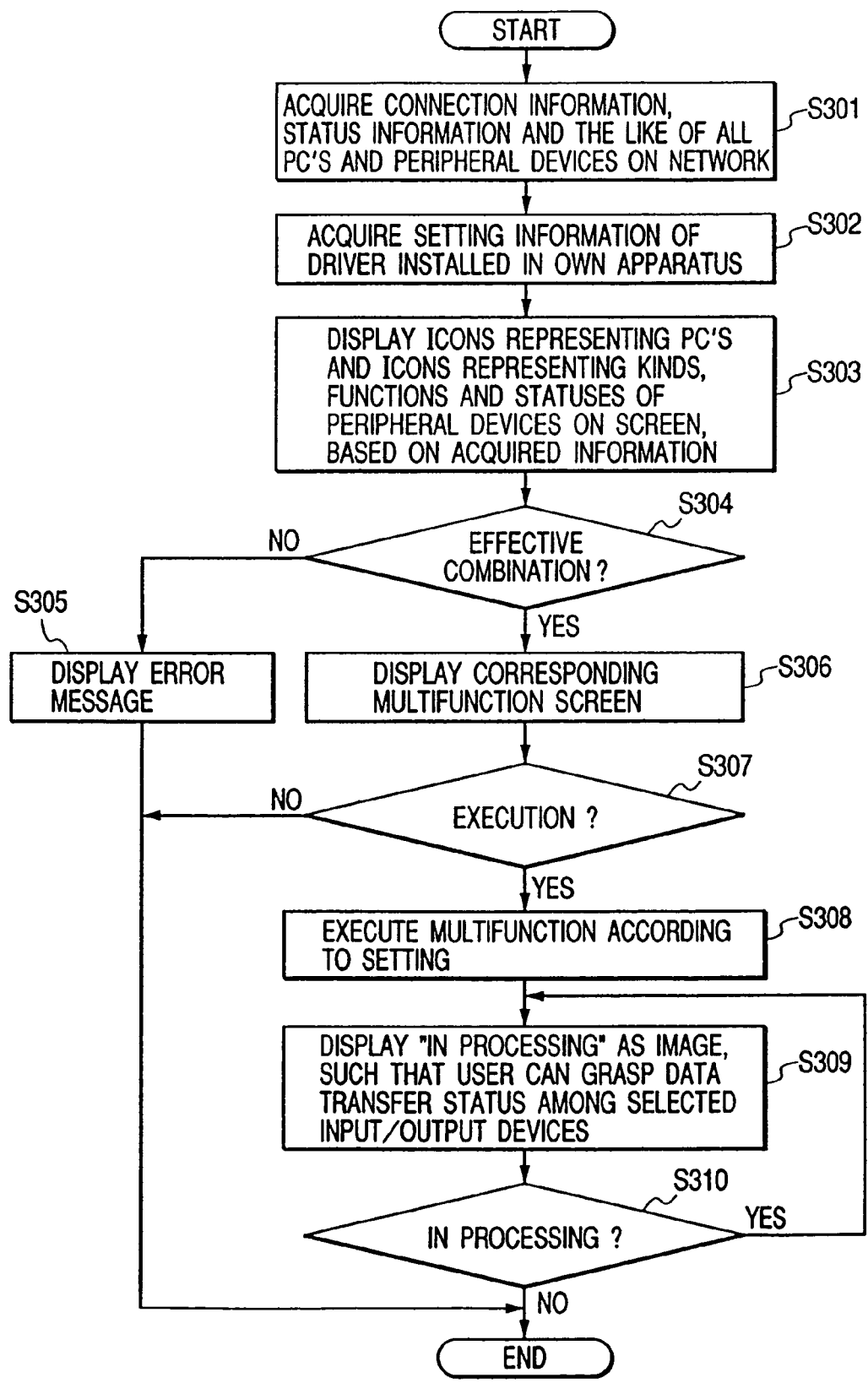
FIG. 32 is a flow chart showing an example of a second data processing procedure in the data processing apparatus according to the present invention.

FIG. 32 is a flow chart showing an example of a second data processing procedure in the data processing apparatus according to the present invention. The second data processing procedure corresponds to a combination function processing procedure according to a system structure display processing.

First, in a step S301, the domain information to which the user's own apparatus belongs is acquired, the address of the management server (either of PC's on the network shown in FIG. 1 is registered as the management server), and the connection information of all the PC's and the peripheral devices of FIG. 1 shared on the network and use conditions and status information of these devices are acquired from the management server. At this time, also the device information (the management server device information 1505 shown in FIG. 26) which has been installed in other PC (i.e., managed by the management server) is acquired. The acquired information is stored and managed in the PMEM 3 shown in FIG. 2. Next, in a step S302, the device information (the server device information of FIG. 30, the information of FIG. 10 or the like) which has been installed (managed) in the user's own apparatus is checked (acquired). At this time, the device information acquired from the management server is compared with the device information installed in the user's own apparatus to specify the device of which driver information is not installed in the user's own apparatus.

The management server always monitors the connection information of all the PC's and the peripheral devices of FIG. 1 shared on the network and the use conditions and status information of these devices. Thus, when status of the PC or the peripheral device on the network changes, the management server notifies latest system information (the connection status, the user condition and the status of each device on the network) to each client through the LAN's 100, 120 and the like.

In a step S303, the PC's and the peripheral devices are displayed on the basis of the acquired information. Namely, a system structure status screen for simultaneously displaying the system structure and the system status shown in FIG. 11 is displayed based on the client device information shown in FIG. 31. At this time, each peripheral device is represented by a device name and an inherent icon (i.e., a icon highly close to the actual appearance of the device body to be connected (the icon representing the function including monochrome/color information)) specified by the device name, on the basis of the acquired information and the resource data of the resource data segment 806 of FIG. 18 stored in the HD 10. Such the icon is displayed on the CRT 16 together with the connection status and the operation status (including the number of currently spooled jobs, and visual or numerical information representing a unusable status). Also, at this time, the icon which corresponds to the device not installed in the user's own apparatus is displayed in gray.

Next, in a step S304, when execution of each function is instructed, it is judged whether or not such an instruction is effective. For example, on the screen shown in FIG. 11, the scanner icon 303c is dragged to and dropped on the digital copying machine icon 303f by using the mouse to execute the copying function.

If judged that the combination is not effective (e.g., a combination of the scanner and the scanner, a combination of the printer and the printer, or the like), the flow advances to a step S305 to display the error message as shown in FIG. 8.

Conversely, if judged in the step S304 that the combination is effective (e.g., a combination of the scanner and the printer, a combination of the scanner and the copying machine, a combination of the scanner and the PC, a combination of the scanner and the FAX unit, a combination of the PC and the printer, a combination of the PC and the PC, a combination of the FAX unit and the FAX unit, or the like), the flow advances to a step S306 to display a corresponding-function window such that the function executable by combining the devices can be set as well as the function executable by each device. In the present embodiment, the virtual operation panels shown in FIGS. 12 to 14 are displayed.

Next, it is judged in a step S307 whether or not the copying is to be performed. When it is instructed to stop the copying, the processing ends. Conversely, when the button 415 on the virtual operation panels shown in FIGS. 12 to 14 is depressed to instruct the copying, the flow advances to a step S308 to perform the copying according to the setting. When the processing is performed, the function window is closed, and the displayed content returns to the system structure status screen for simultaneously displaying the system structure and the system status shown in FIG. 11.

Next, in a step S309, the status that the processing is being performed (the copying processing is being performed in this case) is image-displayed on the screen for simultaneously displaying the system structure and the system status shown in FIG. 11. The display continues until the processing ends (step S310) (see later-described FIG. 33), and the processing ends.

Figure 33:
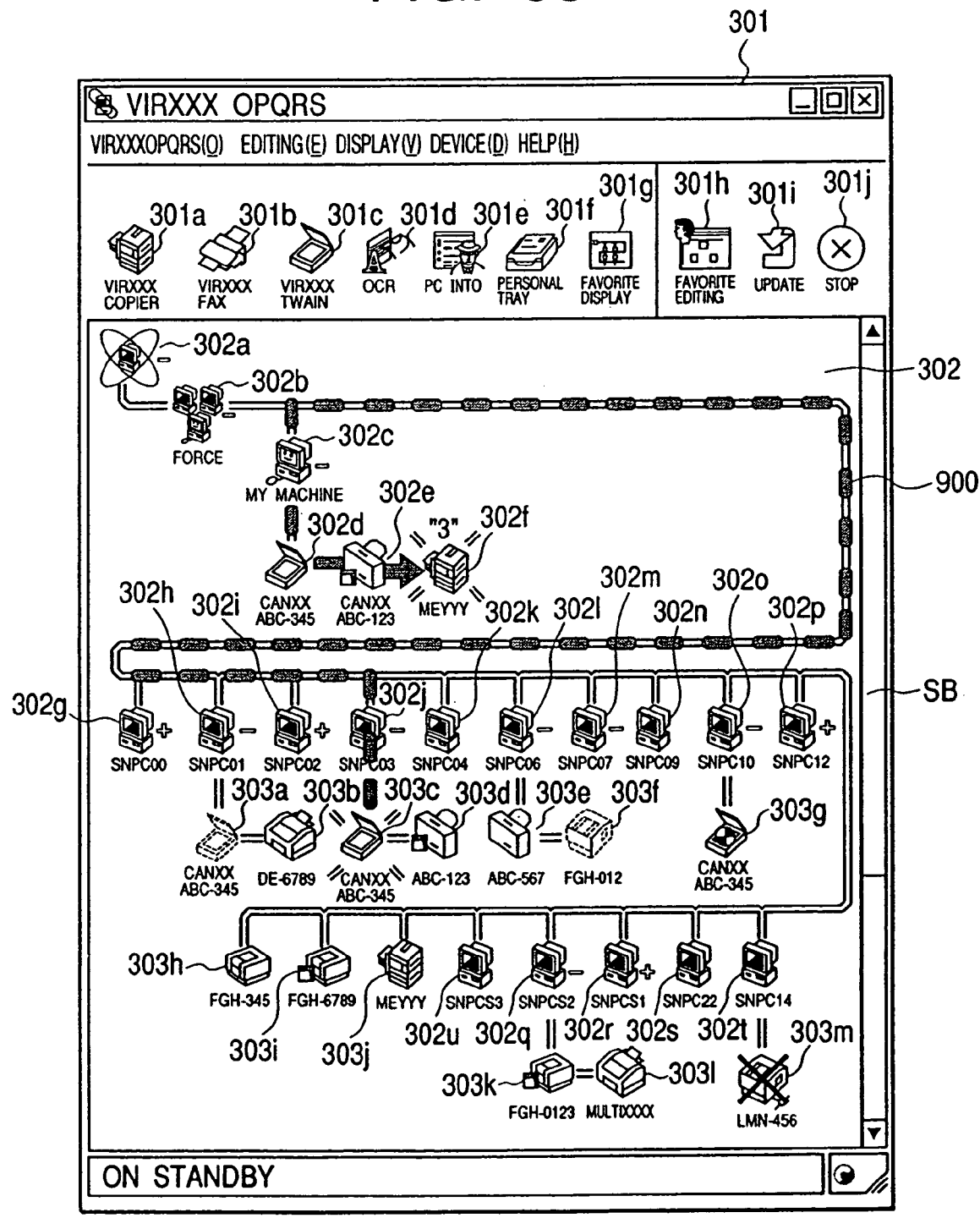
FIG. 33 is a view showing an example of a copying function execution screen of a data processing apparatus according to the fourth embodiment of the present invention.

FIG. 33 is a view showing an example of a copying function execution screen of the data processing apparatus according to the fourth embodiment of the present invention. It should be noted that the same parts as those in FIG. 11 are added with same numerals and symbols, respectively.

In FIG. 33, numeral 900 denotes function in-execution (i.e., function is being executed) display which represents that the image read by the scanner of the icon 303c is being printed now by the printer of the icon 302f, by displaying the icons 303c and 302f in a manner different from other icons and further displaying as an image a network path with an arrow of fat chain line. When the scanner icon 303c is dragged and dropped on the digital copying machine icon 302f by using the mouse on the operation screens shown in FIGS. 12 to 14 to instruct the copying function execution, the function in-execution display 900 continues until the copying processing ends.

By the above processing, the device on the network is displayed with the icon highly close to the actual appearance of the device body, the icon representing the function including monochrome/color information, and the number of currently spooled jobs, whereby it is possible to easily select the optimum device on the network. Besides, after the processing execution for the selected device is instructed, the status that the processing is being performed is displayed as the image such that the user can grasp the data transfer status among the selected input and output devices on the network, whereby it is possible to visually confirm the used input and output devices and processing end timing.

As described above, in the present embodiment, the data processing apparatus which can perform the data communication with the various peripheral devices (the printer, the FAX machine, the digital copying machine, the scanner, the digital camera, the modem, etc.) including the PC's connected on the data communication paths such as the LAN's 100 and 120 shown in FIG. 1 is provided. The data processing apparatus acquires, e.g., the device driver information of FIG. 10, the device information of FIG. 26, the status information of each peripheral device, the connection information of the peripheral devices, the use condition of the peripheral device, the resource data of FIG. 18 and the like, through the management server or directly from the various peripheral devices by the communication with them. Then, on the basis of the acquired information, the information managed in the user's own apparatus, and the like, the data processing apparatus displays together with the data communication path the image on one screen (e.g., screen of FIG. 5, 11 or 33) of the CRT 16, such that the user can confirm as the visible image whether the device having what function exists on the system (i.e., the kind of device), by which maker the device was manufactured (in case where there are plural makers), and how the device is connected and disposed on the communication path. Besides, the data processing apparatus displays on the screen of the CRT 16 the icons which were classified for the function of the devices actually connected with the path. On the screen, the shape of the visible image of the icon represents the actual appearance of the device. Further, the data processing apparatus determines arrangement or layout of the image of the communication path and the respective icons on the screen according to the actual connection status of them, and disposes and displays the path and the icons on the screen such that the user can visually confirm the connection status of the devices and the data communication path. In this case, the arrangement status of the image representing the communication path and the icons is made near to the actual system as much as possible. For example, in the actual system, when one printer is connected with the communication path through the scanner and the PC, the status that the scanner icon and the PC icons are interposed between the image of the communication path and the printer icon is displayed on the screen of the CRT 16. Further, for example, in the actual system, when one printer is directly connected with the communication path without using the device such as the PC, the status that any device icon is not interposed between the image of the communication path and the printer icon (i.e., the communication path image and the printer icon are directly connected with each other) is displayed on the screen of the CRT 16 (see the screen shown in FIG. 11). Thus, the user can confirm as the visible image on the screen shown in FIG. 11 or the like whether the device having what function (type) is connected with the communication path, whether or not the device is connected with the path through other device, what other device interposed is in case of connecting the device with the path through other device, and the like.

The shape of the icon classified for each function is made different from that for other function. Besides, the displayed icon shape is made different for each maker and each kind of device even if the plural kinds of devices have an identical function. Further, on the screen, the operation status that, e.g., three jobs are spooled now is displayed nearby the icon, the status that the color mark or the like is added to the corresponding to the icon is displayed when the device can cope with color processing. Further, when the device connected with the communication path and existing on the system is shared on the network but does not have any installed driver software, the icon of the corresponding device is displayed in gray on the screen so as to make the displaying status of the icon of the corresponding device different from other icons. In this case, before the screen is displayed, it is judged in the data processing apparatus whether or not driver software has been installed in each of the plural devices shared on the network. When the device in which the driver software is not installed exists, such the device is specified. Further, when the device in which the driver software has been installed but which can not be selected (used) due to some troubles (e.g., no sheet, no toner, breakdown, etc.) exists, the impossibility mark or the like is added on the icon of the corresponding device and such the status is displayed (see FIG. 11).

When the user performs the drag-and-drop operation of the icon on the system structure status screen of FIG. 5 or 11 displayed on the CRT 16 by using the cursor or the like, an arbitrary combination of the icons classified for the respective functions is instructed or designated. Thus the data processing apparatus judges whether or not the combination of the dragged-icon device and the dropped-icon device is appropriate (i.e., effective or available). When the data processing apparatus judges that such the combination is not appropriate, the apparatus notifies the user of such a judged result and demands to again perform the instruction operation. Conversely, when the data processing apparatus judges that such the combination is appropriate, the screen shown in FIG. 5 or 11 is changed to the operation screen (e.g., the screen shown in FIG. 12, 13 or 14) which displays at least the button capable of selecting the function (including the expanded function) executable by each device and the function obtained by combining these executable functions. Then, when the output is instructed on this screen by the user (i.e., when the copying start button 415 is depressed), for example, the image is input from the scanner corresponding to the dragged icon, the input image is then transmitted to the printer corresponding to the icon on which the dragged icon is dropped, and the image formation based on the mode set on the setting screen is performed. On the basis of the output instruction by such the combined functions, while the processing is being actually performed by using the devices of the corresponding icons, the screen as shown in FIG. 33 is displayed on the CRT 16, and a specific emphasis pattern (e.g., a blinking flash pattern)

is added to each of the indicated icons to emphasis it. Further, the displaying status of the indicated icon for each function is temporarily made different from the displaying status of other icons, and the communication path which is displayed on the screen and connects shortest the icons for the respective functions to which the network path is indicated is made different from other paths (see FIG. 33).

As explained above, the system structure is discriminated by the specific icon capable of being discriminated for each function and displayed together with its use condition (the screen of FIG. 5 or 11). Namely, one icon selected from the discriminated and displayed icons is overlaid on other icon for combination function (multifunctional) processing intended by the user, and display of the operation status of the devices indicated by the icons is changed to other display (see the screen in FIG. 33), whereby the connection status of the devices constituting the system can be displayed as the icons connected with the virtual network path. Thus, the user can visually confirm the running network structure and the connected peripheral devices as compared with the existing network structure without strangeness. Besides, the user can easily discriminate whether or not the user-selected input and output devices normally operate on the virtually displayed system, as compared with other non-selected icons. Thus, it is possible to highly improve operability of the data processing apparatus in case of selecting each peripheral device connected with the network and issuing intended input and output instructions.

Therefore, as the user visually confirms the entire system by using the icons for connecting the combination function (multifunctional) structure with the virtual network path, he can perform the function setting for combining the peripheral devices on the network by a simple icon instruction operation.

When the PC connected with the network is shut down, this PC notifies the management server of such shutdown. The management server judges whether or not there is other user who has selected the device connected with this PC. If there is the user who has selected the device connected with this PC or already started the processing by the device connected with this PC, a message "There is a user who has selected or uses the device connected with this computer. If you shut down this computer, the selection or use of such the device by that user is forcedly released or ended. Do you shut down this computer?" is transmitted to this PC. Thus, the shutdown of the PC from which the shutdown is demanded is temporarily reserved.

Thus, when the device connected with other PC has been selected, or when the processing by the device connected with other PC was already started, it is possible to prevent that, by the PC shutdown, the selection of such the device is released or the processing by such the device is forcedly ended. For example, in FIG. 33, even if the PC of the icon 302*j* connected with the scanner of the icon 303*c* notifies the management server of the shutdown through the network, the management server returns the above-described message to the PC of the icon 302*j* so as to cause this PC to temporarily reserve the shutdown at least until the current job ends.

Fifth Embodiment

Figure 34:
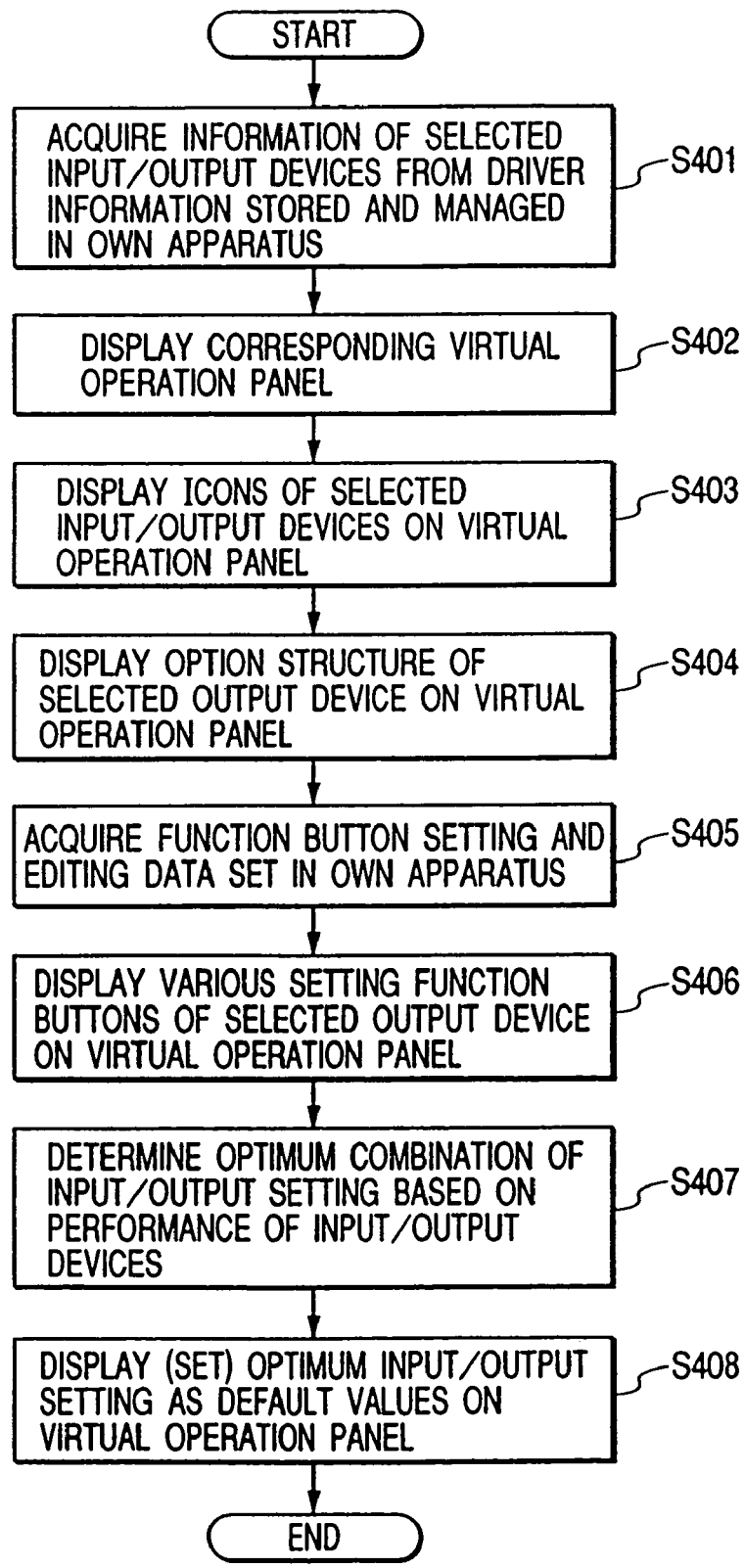
FIG. 34 is a flow chart showing an example of a third data processing procedure in the data processing apparatus according to the present invention.

FIG. 34 is a flow chart showing an example of a third data processing procedure in the data processing apparatus according to the present invention. The third data processing procedure corresponds to display processing procedure on the virtual operation panels shown in FIGS. 12 to 14. For example, when the scanner icon 303*c* is dragged and dropped on the digital copying machine icon 302*f* and thus the copying function is executed, the third data processing procedure is executed in the step S306 of FIG. 32.

First, in a step S401, the information of the selected input and output devices is acquired from the device driver information (e.g., the device driver information of FIG. 10) stored and managed in the user's own apparatus, the resource file of FIG. 18, and the like.

Concretely, on the basis of the device driver information of FIG. 10, the resource file of FIG. 18 and the like, the resource data (corresponding to the icons 403*a* and 404*a* respectively representing the input and output devices of FIGS. 12 to 14) of the inherent icons corresponding to the selected input and output devices (i.e., the icons (the icons representing the functions including monochrome and color information) extremely close to the appearances of the connected bodies) and the resource data (corresponding to the system image MFI of FIGS. 12 to 14) of the system image MFI (including each option device image) corresponding to the selected output device are acquired.

Next, the virtual operation panels shown in FIGS. 12 to 14 are displayed on the CRT 16 in a step S402, the icons 403*a* and 404*a* respectively representing the input and output devices corresponding to the selected input and output devices are displayed on the virtual operation panel in a step S403, and the system image MFI corresponding to the output device is displayed in a step S404. This system image MFI is the structure image which includes an expansion function capable of being set by the output device, i.e., the structure image of the output device which includes option devices (a finisher, a sorter, a paper deck, etc.) optionally installed in the output device. Here, in addition to the structure image concerning the output device, the structure image which includes an expansion function capable of being set by the input device, i.e., the structure image of the input device which includes an option device optionally installed in the input device (e.g., the ADF optionally installed in the scanner) may be displayed.

Next, in a step S405, the setting function button layout information which has been previously set on the editing window 850 of FIG. 19 and stored in the HD 10 or the like of FIG. 2 is acquired. Then, in a step S406, the selectable function buttons (the buttons B1 to B8 of FIGS. 12 to 14) are displayed on the virtual operation panel, on the basis of the setting function button layout information.

Next, in a step S407, on the basis of the input device performance and the output device performance, optimum input and output settings (monochrome/color, density, an image style (resolution), and a sheet size) is determined.

For example, when both the input and output devices can cope with color processing, the color is determined as the monochrome/color setting. Conversely, when either one of the input and output devices can cope with only monochrome processing, the monochrome is determined. Half the resolution of the resolution of the output device is determined as the resolution setting. The sheet size is determined based on, e.g., the image size and the sheet size capable of being managed by the selected scanner and printer (A4 size for both the input and output images in this case).

Next, in a step S408, the optimum input and output settings are displayed as default values on the virtual operation panel (the slider 409 for performing the density setting of FIGS. 12 to 14, the slider 410 for setting the image style, the color mode of the input image, and the sheet size are set and displayed in the area 406), and the processing ends. Although it is not displayed here (i.e., it is displayed according to the indications by the icons 403 and 404*a* of the input and output devices), the determine optimum input and output settings are set and displayed on the property screen 830 shown in FIG. 17.

By the above processing, since the icons highly close to the appearances of the bodies of the selected input and output devices and the function including the monochrome/color information and the like are displayed on the virtual operation panel, the user can visually recognize the kinds and functions of the selected input and output devices.

Further, since the optimum input and output settings of the selected input and output devices are displayed as default values, even the user who is unfamiliar with the input and output settings (the monochrome/color, the density, the image style (resolution), and the sheet size) can easily output the high-quality image suitable for the performances of the input and output devices.

Further, the user can perform the input and output settings in detail by using the detail setting screen (e.g., the property screen shown in FIG. 17) displayed according to the indications by the icons 403*a* and 404*a* respectively representing the input and output devices.

Further, since the system image which includes the option device installation status of the selected output device is displayed on the virtual operation panel, the user can visually recognize the option device installation statuses of the selected input and output devices. Thus, even the user who does not know the option device installation status of the selected output device can easily perform the option setting.

Further, since the function buttons (the buttons B1 to B8 of FIGS. 12 to 14) can be previously edited (i.e., arrangement order setting, and display/non-display setting) on the editing window 850 of FIG. 19, thereby further improving operability for function setting.

Since the resource file and the resource data of the icon of each device shown in FIG. 18 are transmitted from the management server to each device through the network path every time the data is updated, the resource of the latest option can be always provided. Even if a new device (including an option device) is manufactured and added by a maker, it is possible by only installing the resource file into the management server, to display the icon (system image) corresponding to the new device (including the option device) on all client machines (PC's) on the network without performing complicated operations to install the resource file into all the client machines (PC's).

Sixth Embodiment

Figure 35:
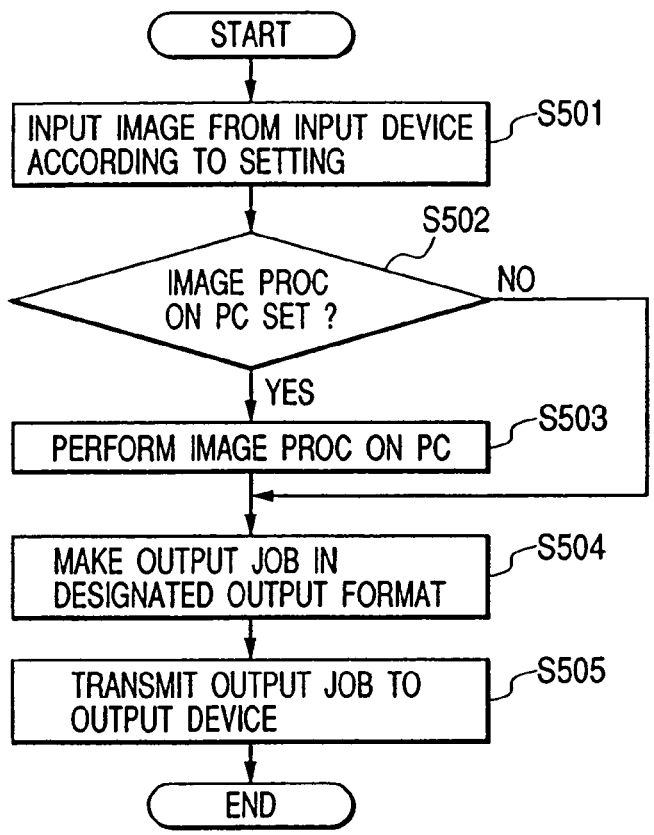
FIG. 35 is a flow chart showing an example of a fourth data processing procedure in the data processing apparatus according to the present invention.

FIG. 35 is a flow chart showing an example of a fourth data processing procedure in the data processing apparatus according to the present invention. The fourth data processing procedure corresponds to processing which is performed in the step S308 of FIG. 32, for example, when the scanner icon 303*c* is dragged and dropped on the digital copying machine icon 302*f* and thus the copying function is executed.

First, in a step S501, the image is input from the input device according to the setting on the virtual operation panels shown in FIGS. 12 to 14. In the present embodiment, the image is actually input from the scanner corresponding to the icon 303*c*.

Next, in a step S502, it is judged whether or not the image processing (i.e., two kinds of image processing (the effect processing and the stamp processing) called the amusement setting in the present embodiment) on the PC side has been set by the button B7 of FIGS. 12 to 14 and on the setting screen of FIGS. 15 and 16. If judged that the image processing on the PC side has been set, the flow advances to a step S503 to cause the PC to perform the image processing (the effect processing, the stamp processing, etc.) to the image input in the step S501 on the basis of the setting of FIGS. 15 and 16, and the flow advances to a step S504.

Conversely, if judged in the step S502 that the image processing on the PC side has been set by the button B7 of FIGS. 12 to 14 and on the setting screen of FIGS. 15 and 16, the flow advances to the step S504 as it is.

Next, in the step S504, an output job of output format (including processing page layout depending on the output device, two-face printing, stapling or the like) based on the input and output settings on the virtual operation panel is generated, and the generated output job is transmitted to the output device (the digital copying machine corresponding to the icon 302*f* in the present embodiment) in a step S505. In this case, the output job data (including the command to instruct the processing (the page layout, the two-face printing, the stapling, etc.) to be performed on the output device side) is transmitted together with the input image (or the image processed on the PC side when the image is processing on the PC side). Then the processing ends. It should be noted that the processing in the steps S502 to S505 is performed every time the data corresponding to output one page is input.

By the above processing, after the image input by using the input device is subjected to the image processing by the user on the basis of the application on the PC, the conventional complicated processing to output the processed image by using the function of the output device is unnecessary. Namely, after the input and output devices are selected by the drag and drop operations, the image subjected to the PC-side processing independent on the output device in addition to the output-device-side image processing can be output from the output device by simply setting the PC-side processing and the output-device-side processing on the virtual operation panel.

Seventh Embodiment

In the above embodiment, the case where the printing processing by the output device is performed based on the setting on the virtual operation panels shown in FIGS. 12 to 14 was explained. However, when the printing processing is performed, it is possible to acquire resource information (a sheet remaining quantity, a toner remaining quantity, a staple remaining quantity, etc.) of the output device to judge whether or not the printing processing can be performed, and notify the user of the judged result. Hereinafter, the seventh embodiment will be explained.

Figure 36:
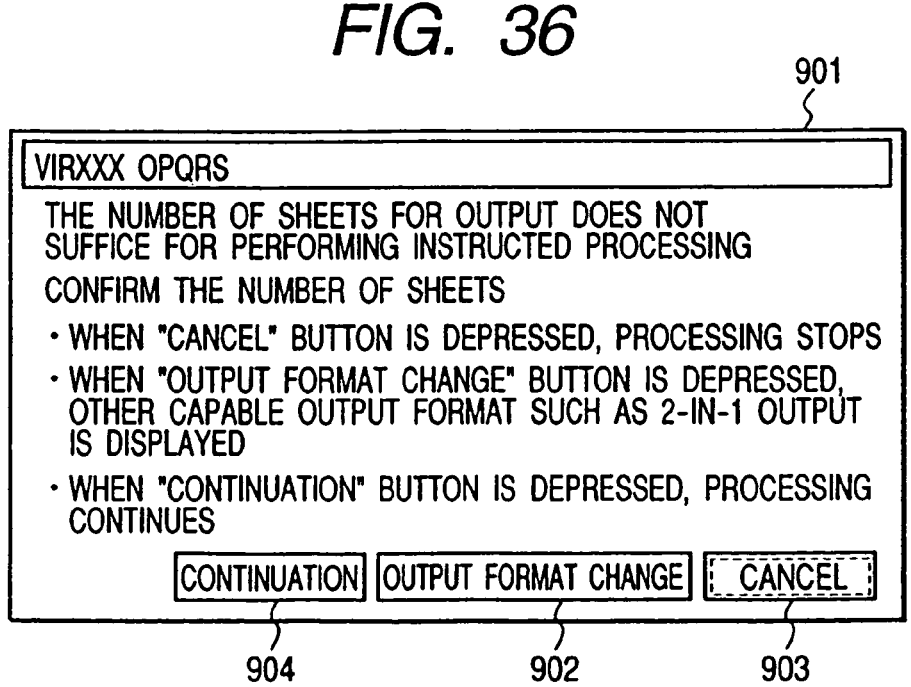
FIG. 36 is a view showing an example of a warning message displayed on the CRT shown in FIG. 2.

FIG. 36 is a view showing an example of a warning message displayed on the CRT 16 shown in FIG. 2. For example, in the case where the button 415 on the virtual operation panels of FIGS. 12 to 14 is depressed by the user to instruct the copying execution, when the number of sheets held in the output device is smaller than the number of sheets necessary for the instructed printing processing, the warning message is displayed before the printing processing is actually performed.

In FIG. 36, numeral 901 denotes the warning message. For example, in the case where the button 415 on the virtual operation panels of FIGS. 12 to 14 is depressed to instruct the copying execution, when it is anticipated that the number of sheets held in the output device is smaller than the number of sheets necessary for the instructed printing processing, the warning message 901 is displayed on the CRT 16 before the printing processing is actually performed.

Numeral 902 denotes a button. When the button 902 is depressed, the printing processing in the selected output format is stopped. Instead, a selection screen of other output format (i.e., a selection window of output format shown in later-described FIG. 37) which can output the image is displayed.

Numeral 903 denotes a cancel button. When the cancel button 903 is depressed, the printing processing is stopped, and the displayed content returns to the setting screen, e.g., the virtual operation panels shown in FIGS. 12 to 14.

Numeral 904 denotes a continuation button. When the continuation button 904 is depressed, the printing processing is continued (or forcedly performed).

Figure 37:
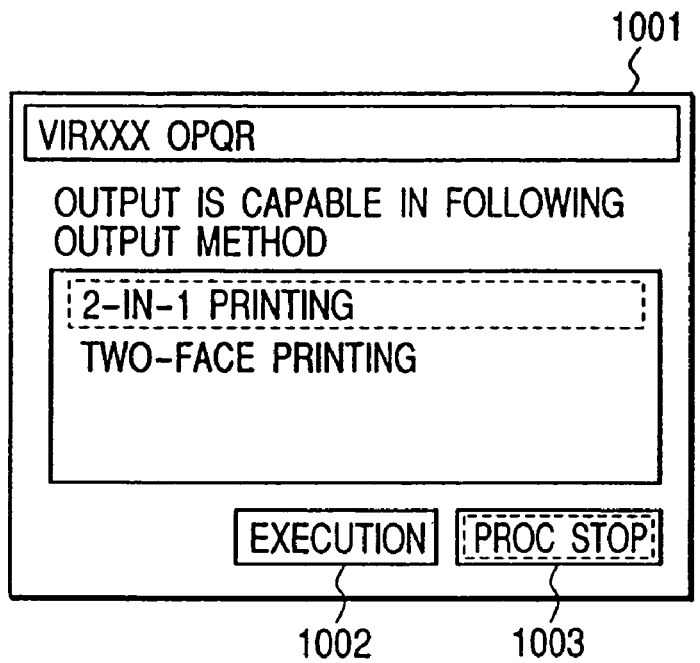
FIG. 37 is a view showing an example of an output format selection window displayed on the CRT shown in FIG. 2.

FIG. 37 is a view showing an example of an output format selection window displayed on the CRT 16 shown in FIG. 2.

In FIG. 37, numeral 1001 denotes the output format selection window which is displayed when the button 902 of FIG. 36 is depressed. In the window 1001, other output formats capable of performing image output (e.g., 2-in-1 printing, two-face printing, etc.) in the number of sheets held in the output device are listed and displayed in a selectable manner.

Numeral 1002 denotes an execution button. When the execution button 1002 is depressed, the printing processing is performed in the selected other output format. Numeral 1003 denotes a processing stop button. When the processing stop button 1003 is depressed, the displayed content returns to the setting screen, e.g., the virtual operation panels shown in FIGS. 12 to 14.

Figure 38:
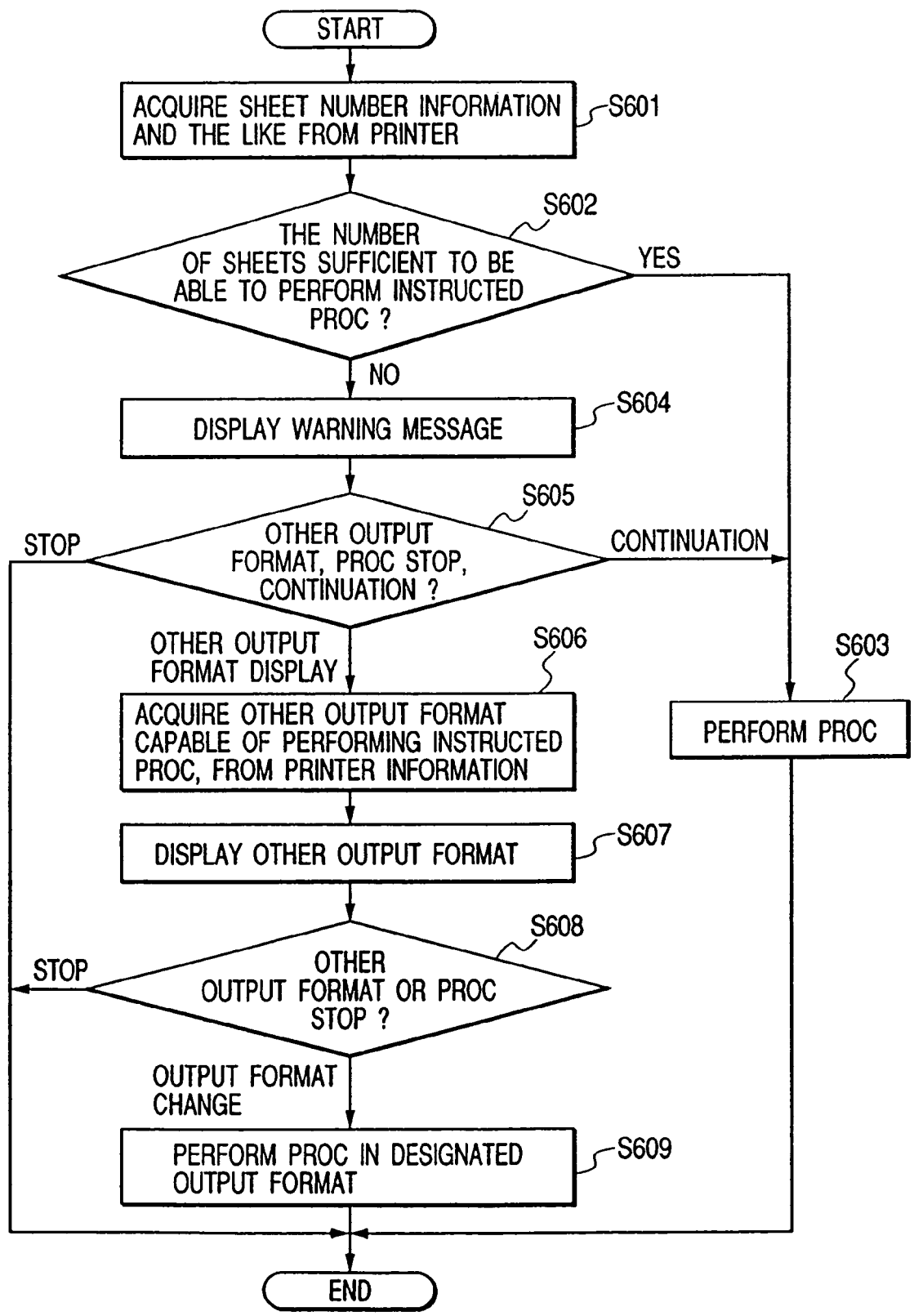
FIG. 38 is a flow chart showing an example of a fifth data processing procedure in the data processing apparatus according to the present invention.

FIG. 38 is a flow chart showing an example of a fifth data processing procedure in the data processing apparatus according to the present invention. The fifth data processing procedure is performed when the functions (the copying function, the printing function, etc.) to perform the printing processing by using the output device (i.e., the printer) is executed.

When it is judged that the printing processing is performed, sheet number information (representing the number of sheets) is acquired from the indicated printer in a step S601.

Next, in a step S602, it is judged based on the acquired sheet number information whether or not the number of sheets capable of performing the instructed (e.g., designated on the virtual operation panels of FIGS. 12 to 14) printing processing has been held in the printer (i.e., whether or not a processing condition is satisfied). If judged that the processing condition is satisfied, the flow advances to a step S603 to perform the printing processing.

Conversely, if judged in the step S602 that the number of sheets capable of performing the instructed (e.g., designated on the virtual operation panels of FIGS. 12 to 14) printing processing is not held in the printer (i.e., the processing condition is not satisfied), the flow advances to a step S604 to display the warning message 901 shown in FIG. 36.

Next, in a step S605, it is judged whether the user depresses the button 902 shown in FIG. 36 (i.e., instructs the display of other processible output format), depresses the cancel button 903 (i.e., instructs the print processing stop), or depresses the continuation button 904 (i.e., instructs the continuation of the printing processing).

If judged that the user instructs the printing processing stop, the printing processing ends.

If judged in the step S605 that the user instructs the continuation of the printing processing, the flow advances to the step S603 to perform the printing processing.

Further, if judged in the step S605 that the user instructs the display of other processible output format, the flow advances to a step S606 to acquire other output format capable of performing the printing processing instructed from the virtual operation panel or the like, on the basis of printer information previously acquired from a printer driver, the sheet number information acquired in the step S601, and the like. Then, in a step S607, the output format selection window 1001 of FIG. 37 which shows other output format capable of performing the instructed printing processing is displayed.

Next, in a step S608, it is judged whether the user depresses the execution button 1002 shown in FIG. 37 (i.e., instructs the change of output format), or depresses the processing stop button 1003 (i.e., instructs the printing processing stop).

If judged that the user instructs the printing processing stop, the printing processing ends.

Conversely, if judged in the step S608 that the user instructs the change of output format, the flow advances to a step S609 to perform the printing processing in the instructed output format, i.e., the output format selected in the output format selection window 1001 of FIG. 37, and the processing ends.

By the above processing, when it is anticipated that the number of sheets becomes insufficient during the printing, the warning message is displayed. Thus, it is possible to prevent that the number of sheets becomes insufficient during the printing beforehand, whereby the user can refill the sheets to the output device before the actual processing is started.

In the present embodiment (especially the steps S601 and S602 of FIG. 38), the case where the sheet number information is acquired from the designated printer, and then it is judged based on the acquired sheet number information whether or not the sheets of which number is sufficient to perform the instructed printing processing have been held was explained. However, it is possible to acquire the sheet number information of the designated printer and the sheet number information used in the spooled job in the step S601 of FIG. 38, and to judge based on the acquired sheet number information whether or not the sheets of which number is sufficient to perform the instructed printing processing have been held in consideration of the sheet information used in the spooled job. In this case, a message "This sheet has been preserved for printing." can be additionally displayed.

Thus, it is possible to accurately anticipate that the sheets become insufficient during the printing processing, in consideration of the spooled job.

Further, it is possible to notify the user of other output format (e.g., the two-face printing, the 2-in-1 printing, or the like) capable of performing the printing processing designated by the user, and to perform the selection on the screen notified, whereby the complicated operation that the displayed content must return to the setting screen every time the output format is changed is unnecessary. Thus, even the user who is unfamiliar with the operation can easily change the output format to other output format. Besides, it is possible to perform the instructed printing processing (i.e., it is possible to perform substitute printing) without refilling sheets to the printer.

In the present embodiment, the case where, in case of performing the printing, the sheet remaining quantity in the output device is acquired and it is judged based on the acquired information whether or not the printing processing can be performed was explained. Besides, when stapling processing has been set to the designated printing processing, it is possible to acquire staple remaining information of the output device, judge based on the acquired information whether or not the printing processing can be performed, and notify the user of such a warning message as shown in FIG. 36 if the printing processing can not be performed.

Even in this case, the user can instruct the change of output format. Namely, in an output format selection window such as the window 1001 shown in FIG. 37, it is possible to select other output format (e.g., single-staple sort processing or non-staple sort processing by which the number of used staples can be reduced) capable of performing the instructed printing processing. Thus, the user can change the output format and perform the printing processing.

By the above processing, when it is anticipated that the number of staples becomes insufficient during the printing, the warning message is displayed. Thus, it is possible to prevent that the number of staples becomes insufficient during the printing beforehand, whereby the user can refill the staples to the output device before the actual processing is started.

Further, it is possible to notify the user of other output format (e.g., single-staple sort processing, two-face printing sort processing, 2-in-1 sort processing or non-staple sort processing by which the number of used staples can be reduced (i.e., by which stapling can be easily performed in later manual stapling)) capable of performing the staple-added printing processing, and to perform the selection on the screen notified, whereby the complicated operation that the displayed content must return to the setting screen every time the output format is changed is unnecessary. Thus, even the user who is unfamiliar with the operation can easily change the output format to other output format. Besides, it is possible to perform the instructed printing processing (i.e., it is possible to perform substitute processing) without refilling the staples to the printer.

Further, it is possible to acquire the staple information from the designated printer and the information of the staple used in the spooled job, and to judge based on the acquired staple information whether or not the staples of which number is sufficient to perform the instructed printing processing have been held in the printer, in consideration of the staples used in the spooled job.

Thus, it is possible to accurately anticipate that the staples become insufficient during the printing processing, in consideration of the spooled job.

Eighth Embodiment

In the above seventh embodiment, the case where, in case of performing the printing, the resource information (i.e., the sheet remaining information, and the staple remaining information) or the like of the output device is acquired, it is judged based on the acquired information whether or not the printing processing can be performed, and the judged result is notified to the user was explained. Besides, in case of performing the printing, it is possible to acquire resource information (i.e., toner remaining information) or the like of the output device, judge based on the acquired information whether or not the printing processing can be performed, and notify the user of the judged result. Hereinafter, the eighth embodiment will be explained.

Figure 39:
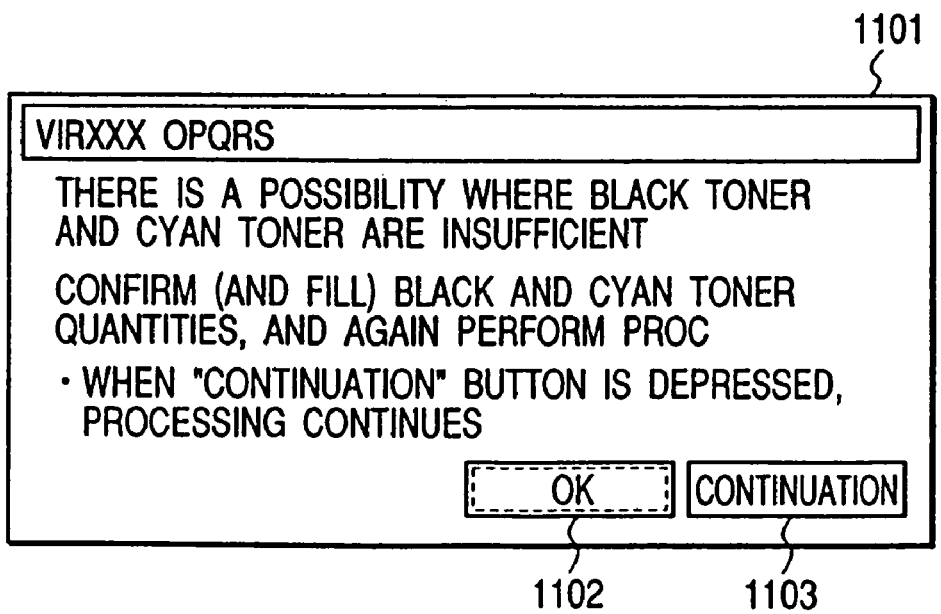
FIG. 39 is a view showing an example of the warning message displayed on the CRT shown in FIG. 2.

FIG. 39 is a view showing an example of the warning message displayed on the CRT 16 shown in FIG. 2. For example, in the case where the button 415 on the virtual operation panels of FIGS. 12 to 14 is depressed to instruct the copying execution, when the remaining quantity of the toner held in the output device is smaller than the toner quantity necessary for the instructed printing processing, the warning message is displayed before the printing processing is actually performed.

In FIG. 39, numeral 1101 denotes the warning message. For example, in the case where the button 415 on the virtual operation panels of FIGS. 12 to 14 is depressed to instruct the copying execution, when it is anticipated that the remaining quantity of the toner held in the output device is smaller than the toner quantity necessary for the instructed printing processing, the warning message 1101 is displayed before the printing processing is actually performed.

It should be noted that the warning message 1101 is displayed for the toners of all the colors to which insufficiency is anticipated. For example, when it is anticipated that black toner and cyan toner become insufficient, the message "There is a possibility where black toner and cyan toner are insufficient. Confirm (and fill) black and cyan toner quantities, and again perform proc." is displayed.

Numeral 1102 denotes an OK button. When the OK button 1102 is depressed, the printing processing ends, and the displayed content returns to the setting screen, e.g., the virtual operation panels shown in FIGS. 12 to 14.

Numeral 1103 denotes a continuation button. When the continuation button 1103 is depressed, the printing processing is continued (or forcedly performed).

Figure 40:
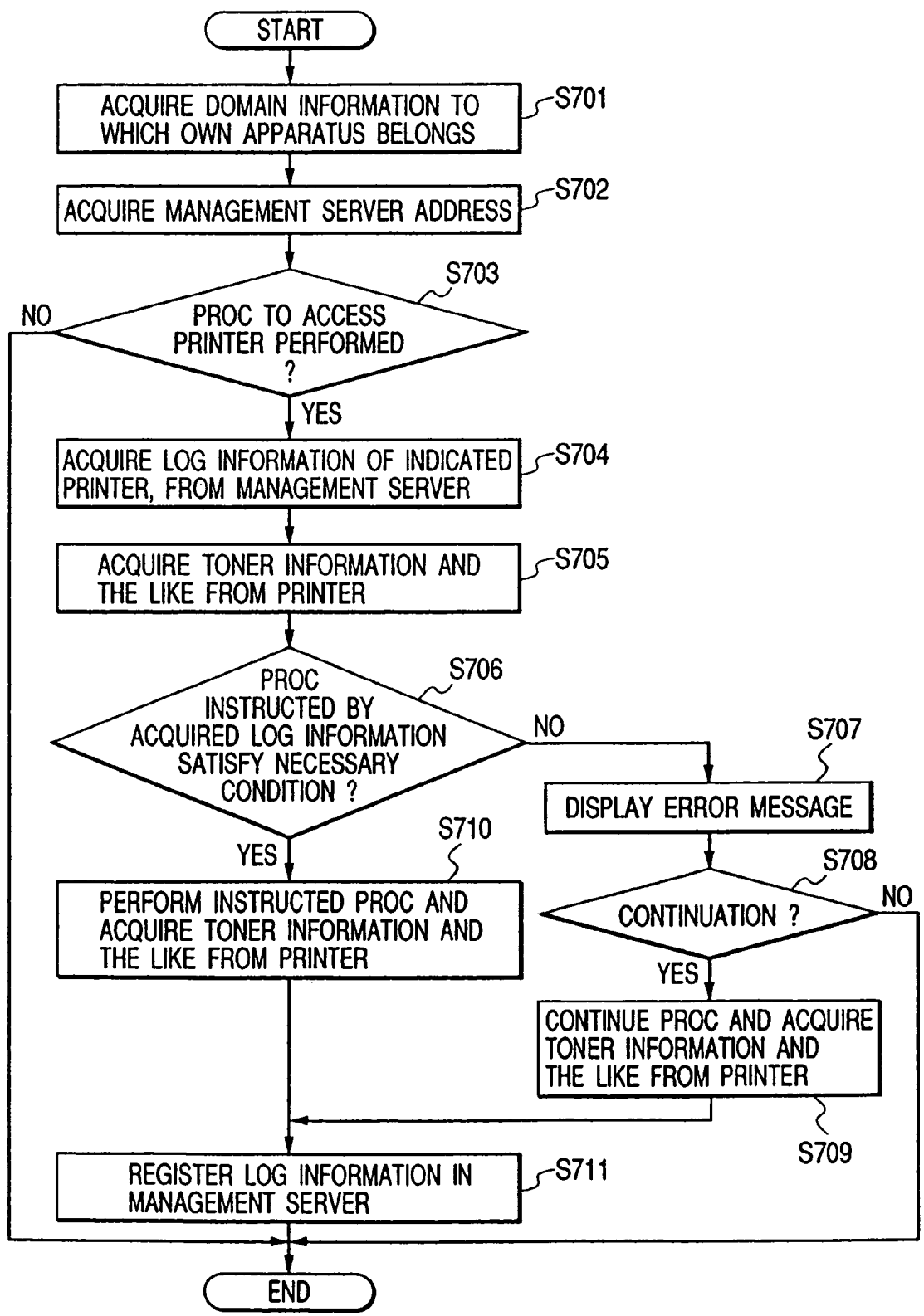
FIG. 40 is a flow chart showing an example of a sixth data processing procedure in the data processing apparatus according to the present invention.

FIG. 40 is a flow chart showing an example of a sixth data processing procedure in the data processing apparatus according to the present invention.

Initially, in a step S701, the domain information to which the user's own apparatus belongs is acquired. Next, in a step S702, the address of the management server (either of the PC's on the network shown in FIG. 1 is registered as the management server) is acquired.

Next, in a step S703, it is judged whether or not the processing (e.g., the copying processing, the printing processing or the like) to access the printer is performed. If judged that the processing to access the printer is not performed, the processing ends as it is.

Conversely, if judged in the step S703 that the processing to access the printer is performed, the flow advances to a step S704 to acquire the indicated printer log (either of the printer log information segments 872-1 to 872-M in the printer log management information shown in FIG. 21). Concretely, the information as to which printer the access is performed (i.e., the information as to the designated printer) is notified to the management server, and the management server returns to the client machine (PC) the printer log information segment (log information) of the corresponding printer selected from among the printer log information segments 872-1 to 872-M in the printer log management information shown in FIG. 21.

Next, in a step S705, the toner information (i.e., the toner remaining quantity) or the like is acquired from the designated printer.

Next, in a step S706, it is judged whether or not the instructed processing satisfies a necessary condition, on the basis of the log information acquired in the step S704 and the printer toner information acquired in the step S705. Concretely, the log information acquired from the management server is analyzed, the toner use quantity in case of performing processing same as the currently designated processing (i.e., the processing judged to be the same as the currently designated processing on the basis of a kind of application, a kind of scanner (high speed scanner, low speed scanner, color scanner, or monochrome scanner), the number of total printing pages, sheet size, color/monochrome, one face/two faces, etc.) is calculated (anticipated), and the anticipated toner user quantity is compared with the toner remaining quantity acquired from the printer, thereby judging whether or not the instructed processing satisfies the necessary condition (i.e., judging whether or not the processing can be performed).

If judged in the step S706 that the instructed processing satisfies the necessary condition on the basis of the log information and the printer toner information, the flow advances to a step S710 to perform the instructed processing. Thus, the toner information is acquired from the printer, and the log information (printer name, input information, the number of total printing pages, sheet size, color/monochrome, one face/two faces, toner use quantity (for each color), etc.) is generated based on the acquired toner information.

Next, in a step S711, the generated toner information (printer name, input information, the number of total printing pages, sheet size, color/monochrome, one face/two faces, toner use quantity (for each color), etc.) is registered in the management server, and the processing ends.

Conversely, if judged in the step S706 that the instructed processing does not satisfy the necessary condition on the basis of the log information and the printer toner information, the flow advances to a step S707 to display the warning message shown in FIG. 39. Then, in a step S708, it is judged whether or not the processing is instructed to be continued as it is (i.e., it is judged whether or not the continuation button 1103 is depressed).

If judged in the step S708 that the processing is instructed to be continued as it is, the flow advances to a step S709 to continue the processing. Thus, the toner information is acquired from the printer, the log information (printer name, input information, the number of total printing pages, sheet size, color/monochrome, one face/two faces, toner use quantity (for each color), etc.) is generated based on the acquired toner information, and the flow then advances to the step S711.

Conversely, if judged in the step S708 that the processing is instructed not to be continued (i.e., judged that the OK button 1102 is depressed), the processing ends.

By the above processing, when it is anticipated that the toner becomes insufficient during the printing, the warning message is displayed. Thus, it is possible to prevent that the toner becomes insufficient during the printing beforehand, whereby the user can refill the toner to the output device before the actual processing is started.

Further, it is possible to notify the user of other output format (e.g., economy-mode printing of which toner use quantity is small, monochrome printing, 2-in-1 printing, etc.) capable of performing the instructed printing processing with use of the selection window same as the output format selection window 1001 shown in FIG. 37, and to perform the selection on the screen notified, whereby the complicated operation that the displayed content must return to the setting screen every time the output format is changed is unnecessary. Thus, even the user who is unfamiliar with the operation can easily change the output format to other output format. Besides, it is possible to perform the instructed printing processing (i.e., it is possible to perform substitute processing) without refilling the toner to the printer.

Further, if judged that the instructed processing does not satisfy the necessary condition, it is possible to notify the user of other printer capable of performing the user-instructed printing processing with use of the selection window same as the output format selection window 1001 shown in FIG. 37, and to perform the selection on the screen notified, whereby the complicated operation that the displayed content must return to the setting screen every time the output format is changed is unnecessary. Thus, even the user who is unfamiliar with the operation can easily change the used printer to other printer. Besides, it is possible to perform the instructed printing processing without refilling the toner to the printer.

Further, for example, when it must wait for one executable job for a long time to execute because of a spooled other job, it is possible to acquire an end anticipation time of the spooled other job from the printer when accessing this printer, and then notify the warning message as to the end anticipation time.

In the present embodiment, the case where, in case of performing the printing, the toner remaining quantity or the like of the output device is acquired, it is judged based on the acquired information whether or not the printing processing can be performed, and the judged result is notified to the user was explained. However, the checked target is not limited to the toner. Namely, ink, an ink ribbon or the like may be checked.

Further, in the present embodiment, the case where, in case of performing the printing processing, the printer log is acquired from the management server through the network and the resource information (the toner remaining quantity) is acquired from the printer, and it is judged based on the acquired information whether or not the printing processing can be performed was explained. However, in a case where a stand-alone PC ends the printing processing to the printer connected with the PC itself, it is possible to once store a printer log in the PC's own HD or the like, acquire the stored printer log and the printer resource information (the toner remaining quantity) from the connected printer, and judge based on the acquired information whether or not the printing processing can be performed.

Thus, even in the printer which is connected with the stand-alone PC, it is possible to prevent that the toner becomes insufficient during the printing beforehand, whereby the user can refill the toner to the output device before the actual processing is started.

Ninth Embodiment

In the above eighth embodiment, the case where, in case of performing the printing processing, the printer log is acquired from the management server and the resource information (the toner remaining quantity) is acquired from the printer, it is judged based on the acquired information whether or not the printing processing can be performed, and the judged result is notified to the user was explained. However, it is possible based on a user's instruction to acquire the log information for each processing (printing processing, FAX transmission/reception processing, image reading processing, etc.) managed by the management server, and display the acquired log information. Hereinafter, the present embodiment will be explained.

Figure 41:
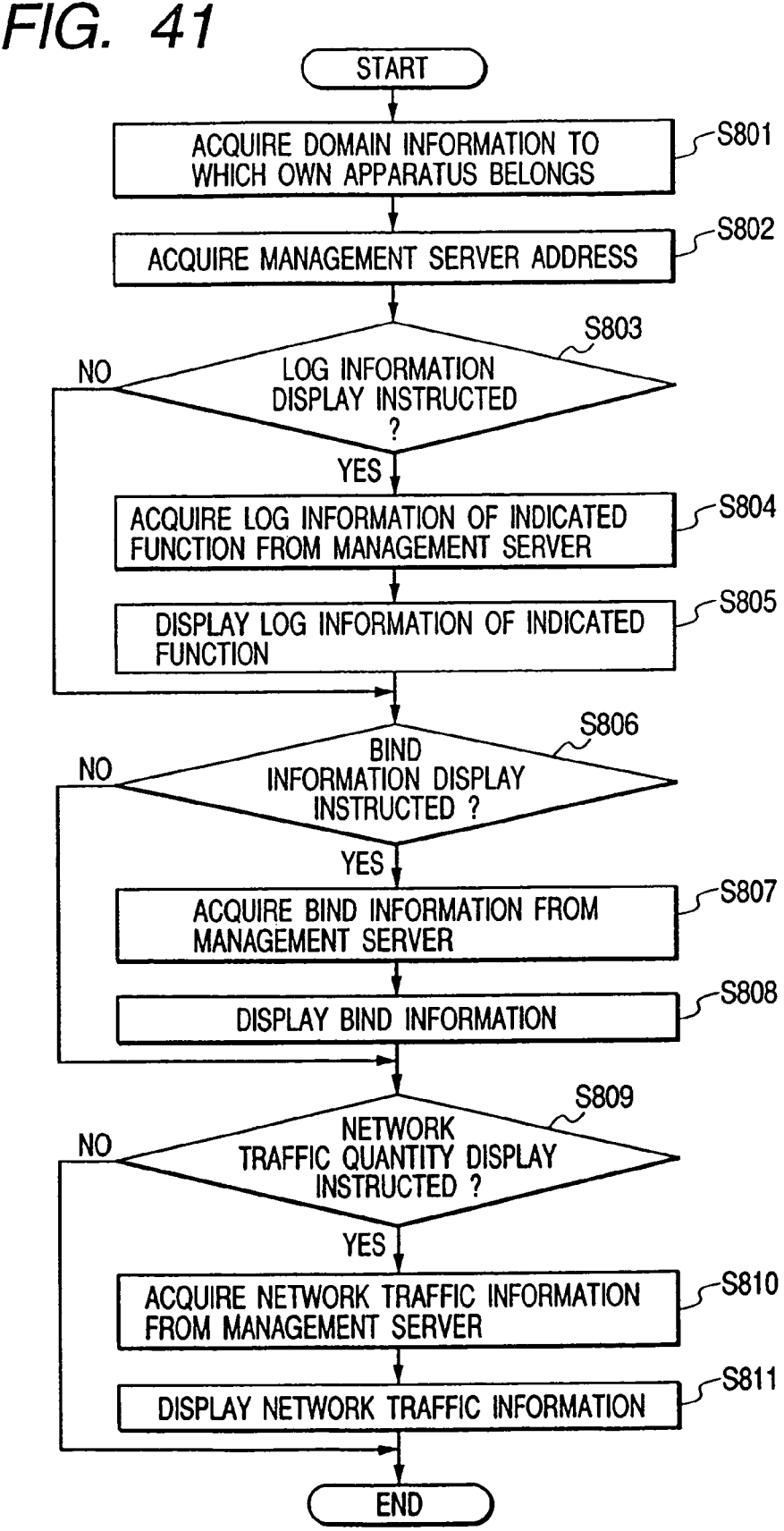
FIG. 41 is a flow chart showing an example of a seventh data processing procedure in the data processing apparatus according to the present invention.

FIG. 41 is a flow chart showing an example of a seventh data processing procedure in the data processing apparatus according to the present invention.

Initially, in a step S801, the domain information to which the user's own apparatus belongs is acquired. Next, in a step S802, the address of the management server (either of the PC's on the network shown in FIG. 1 is registered as the management server) is acquired.

Next, in a step S803, it is judged whether or not display of the log information is instructed (e.g., it is possible to instruct the display for each of the printing function, the FAX transmission/reception function, the image reading function, etc.). If judged that the log information display is not instructed, the flow advances to a step S806.

Conversely, if judged in the step S803 that the log information display is instructed, the flow advances to a step S804 to acquire the log information of the indicated function (FIGS. 22 to 25) from the management server, and the flow further advances to a step S805 to display the acquired information in a user's desired form (list display, graph display or the like). It should be noted that this display form is indicated when the log information display is instructed.

Next, in the step S806, it is judged whether or not display of bind information is instructed (e.g., it is possible to instruct the display for each of the copying function and the FAX transmission/reception function). If judged that the bind information display is not instructed, the flow advances to a step S809.

Conversely, if judged in the step S806 that the bind information display is instructed, the flow advances to a step S807 to acquire the bind information of the indicated function (FIG. 20) from the management server, and the flow further advances to a step S808 to display the acquired information in the user's desired form (list display, graph display or the like). It should be noted that this display form is indicated when the bind information display is instructed.

Next, in the step S809, it is judged whether or not display of a network traffic quantity is instructed. If judged that the network traffic quantity display is not instructed, the processing ends as it is.

Conversely, if judged in the step S809 that the network traffic quantity display is instructed, the flow advances to a step S810 to acquire network traffic quantity information (not shown) from the management server, and the flow further advances to a step S811 to display the acquired information in the user's desired form (list display, graph display or the like). It should be noted that this display form is indicated when the network traffic quantity display is instructed.

By the above processing, it is possible to easily grasp the device combination information (bind information), a use frequency, a use time and the like for each function. For example, it is possible to easily grasp the combination of the scanner and the printer in case of the copying function.

It should be noted that, as each log information, the processing information is notified from the client machine (PC) to the management server every time each function is executed.

Further, it should be noted that the network traffic quantity is always monitored by the management server.

Tenth Embodiment

In the above first to ninth embodiments, the case where the icons of the virtually displayed scanner and printer or the icons of the virtually displayed scanner and multifunctional device are dragged and dropped, and thus the function processing to print the image of one document input from one scanner with use of the printer, the multifunctional device and the like was explained. However, it is possible to combine the image of one document input from the scanner with the images of the documents of the data files stored in the user's own apparatus and other PC on the network, and output the combined images. Besides, it is possible to combine (i.e., bind) the image data of the plural documents input from the two scanners with others, and output the combined images. Hereinafter, the tenth embodiment will be explained.

Figure 42:
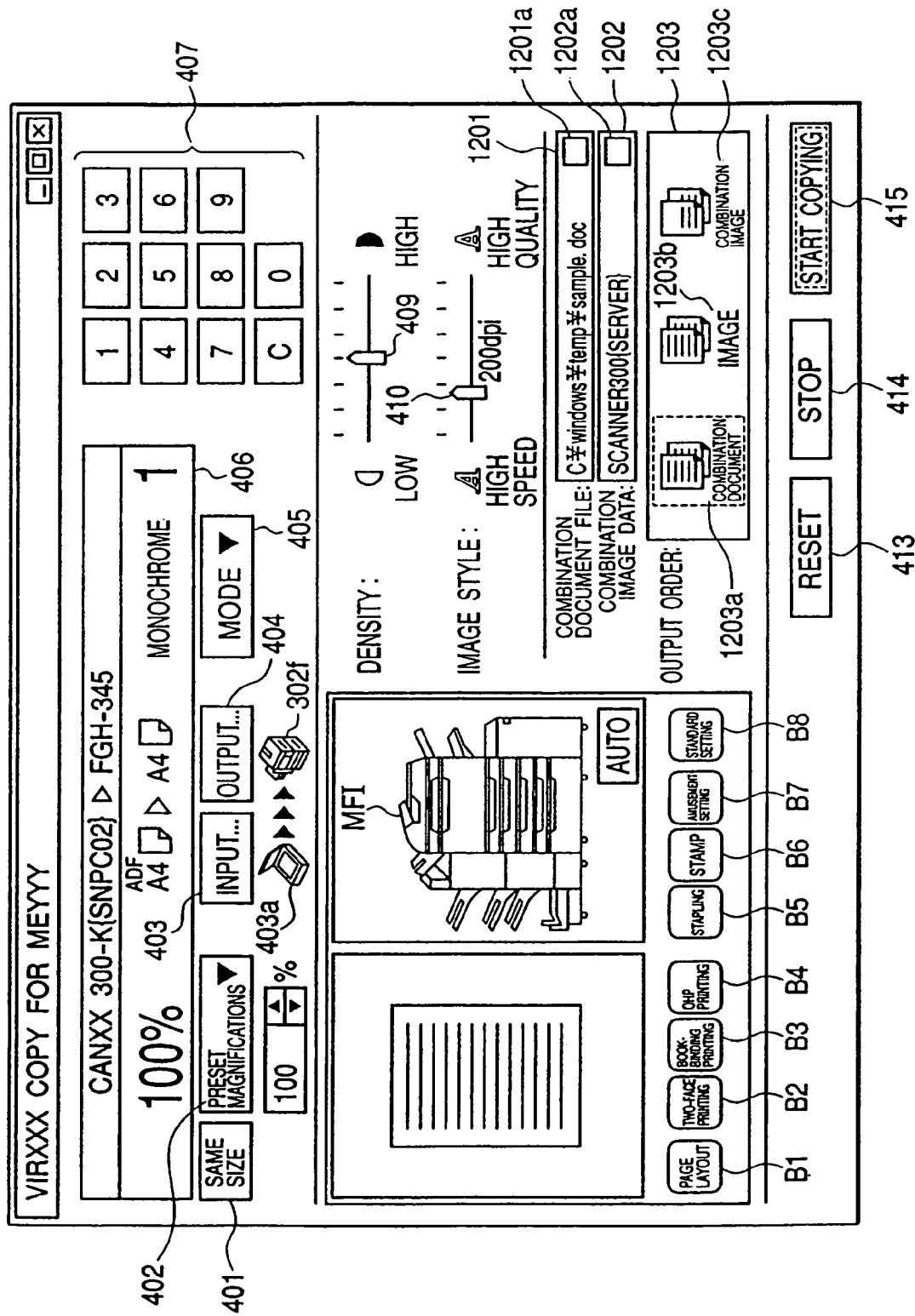
FIG. 42 is a view showing an example of a virtual operation panel displayed on the CRT of the data processing apparatus shown in FIG. 2.

FIG. 42 is a view showing an example of a virtual operation panel displayed on the CRT 16 of the data processing apparatus shown in FIG. 2. When the scanner icon dragged in the status that the icon 302f of FIG. 11 is effectively displayed is dropped on the icon 302f, the virtual operation panel is displayed on the CRT 16 as the image by which the digital copying machine 118 and the option devices connected thereto can be confirmed, by referring to the device driver information acquired from the digital copying machine 118 corresponding to the icon 302f and managed on the HD 10 or the PMEM 3. It should be noted that the same parts as those in FIG. 12 are added with same numerals and symbols, respectively.

Figure 43:
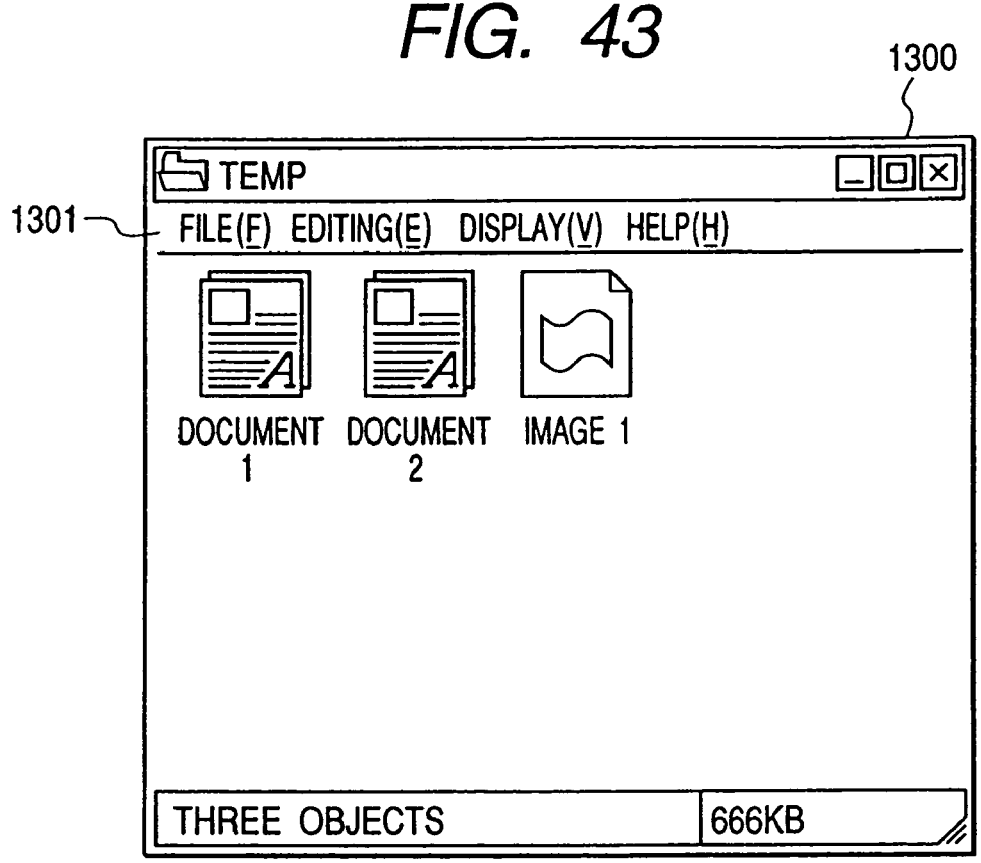
FIG. 43 is a view showing an example of a combination document selection window displayed according to icon instructions corresponding to buttons displayed on the virtual operation panel of the CRT of the data processing apparatus shown in FIG. 2.

In FIG. 42, numeral 1201 denotes a combination document file designation area in which the document file (a document file, an image file or the like stored as a shared file in the user's own apparatus or other PC) to be combined with the image of one document input from the input device corresponding to the icon 403a is designated. When there is no designation, a message "none" is displayed in the combination document file designation area 1201, and the image input from the input device of the icon 403a and the file are not combined with each other. Numeral 1201a denotes a button. When the button 1201a is depressed, the combination document file selection window shown in later-described FIG. 43 is displayed.

Figure 44:
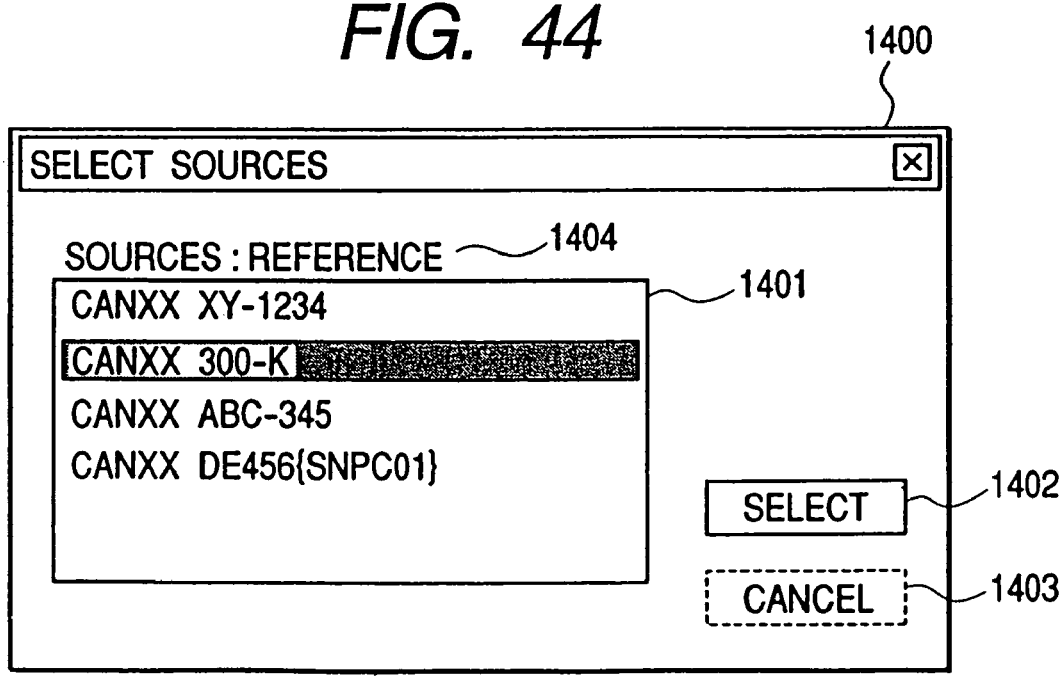
FIG. 44 is a view showing an example of a combination image data selection window displayed according to the icon instructions corresponding to the buttons displayed on the virtual operation panel of the CRT of the data processing apparatus shown in FIG. 2.

Numeral 1202 denotes a combination image data designation area in which other input device for inputting the image data to be combined with the image input from the input device corresponding to the icon 403a is designated. When there is no designation, a message "none" is displayed in the combination image data designation area 1202, and the image input from the input device of the icon 403a and the file are not combined with each other. Numeral 1202a denotes a button. When the button 1202a is depressed, the combination image data selection window shown in later-described FIG. 44 is displayed.

Numeral 1203 denotes an output order display area which includes an icon (a combination document 1203a) representing the file designated in the combination document file designation area 1201, an icon (an image 1203b) representing the image input from the input device corresponding to the icon 403a, and an icon (a combination image 1203c) representing the image input from the input device designated in the combination image data designation area 1202. The combination document 1203a, the image 1203b and the combination image 1203c are output in the displayed order (i.e., from the left in due order). Namely, the image input from the input device corresponding to the icon 403a is combined with the image of the file designated in the combination document file designation area 1201, and the image input from the input device designated in the combination image data designation area 1202 is serially combined with the above combined image, whereby the three documents are collected into one document and output.

The output order of the combination document 1203a, the image 1203b and the combination image 1203c in the output order display area 1203 can be changed by, e.g., the drag operation of the mouse 13 shown in FIG. 2.

The combination document 1203a and the combination image 1203c are not displayed when there is no designation in the combination document file designation area 1201 and the combination image data designation area 1202.

For example, when the scanner icon dragged in the status that the icon 302f of FIG. 11 is effectively displayed is dropped on the icon 302f, the virtual operation panel as shown in FIG. 42 is displayed. At this time, only the icon of the image 1203b (i.e., the icon representing the image input from the scanner corresponding to the dragged scanner icon) is displayed in the output order display area 1203. When the file is designated in the combination document file designation area 1201, the icon of the combination document 1203a is displayed at the right of the image 1203b. Subsequently, when the input device is designated in the combination image data designation area 1202, the icon of the combination image 1203c is displayed at the right of the icon of the combination document 1203a. Then, when the copying start button 415 is depressed, the documents corresponding to the icons displayed in the area 1203 are sequentially output and image formed as one document in the order displayed in the area 1203 (i.e., in the order of the image 1203b, the combination document 1203a and the combination image 1203c in this case).

FIG. 43 is a view showing an example of the combination document selection window displayed according to icon instructions corresponding to the button 1201*a* displayed on the virtual operation panel of the CRT 16 of the data processing apparatus shown in FIG. 2.

In FIG. 43, numeral 1300 denotes a combination document selection window which displays files (a document 1, a document 2 and an image 1) in a directory preset as a combination document directory. Here, the documents 1 and 3 represent the document files, and the image 1 represents the image file. When the user selects either of the document 1, the document 2 and the image 1 by using the mouse 13 or the like, the combination document selection window 1300 is closed, and the full path of the selected file is displayed in the combination image data designation area 1201 of FIG. 42.

When, in a file 1301, a selectable item "change of combination document directory" in a not-shown menu displayed based on an instruction of the mouse 13 or the like is selected, the combination document directory can be changed. Further, in the file 1301, when a selectable item "reference to network" in the not-shown menu displayed based on an instruction of the mouse 13 or the like is selected, the system structure status screen of FIG. 11 is displayed, whereby it is possible to select the shared file on other PC.

FIG. 44 is a view showing an example of the combination image data selection window displayed according as the button 1202*a* displayed on the virtual operation panel of FIG. 42 is depressed.

In FIG. 44, numeral 1400 denotes the combination image data selection window. Input device names shared in the network are displayed in a selection display area 1401. Numeral 1402 denotes a selection button. When the selection button 1402 is depressed after either of the input devices displayed in the selection display area 1401 is indicated by using the mouse 13 or the like, the combination image data selection window 1400 is closed, and the name of the selected input device is displayed in the combination image data designation area 1202 of FIG. 42. Numeral 1403 denotes a cancel button. When the cancel button 1403 is depressed, the selection in the selection display area 1401 is cancelled, and the combination image data selection window 1400 is then closed.

Numeral 1404 denotes a reference menu. When the reference menu 1404 is indicated by using the mouse 13 or the like, the system structure status screen shown in FIG. 11 is displayed, whereby it is possible to select the input device on this screen.

In the status that the system structure status screen shown in FIG. 11 is displayed, when predetermined keys, e.g., "CTRL" and "ALT" keys of the keyboard 12 are simultaneously depressed, the shape of the icon corresponding to the input device having the same function as that of the input device already selected (i.e., the input device corresponding to the icon 403*a* of FIG. 42) can be changed and displayed (e.g., winked).

Further, on the system structure status screen shown in FIG. 11, in order to prevent that the already-selected input device (i.e., the input device corresponding to the icon 403*a* of FIG. 42) is selected doubly, the icon of the already-selected input device may be displayed, e.g., in gray such that the user can not select such the device.

Figure 45:
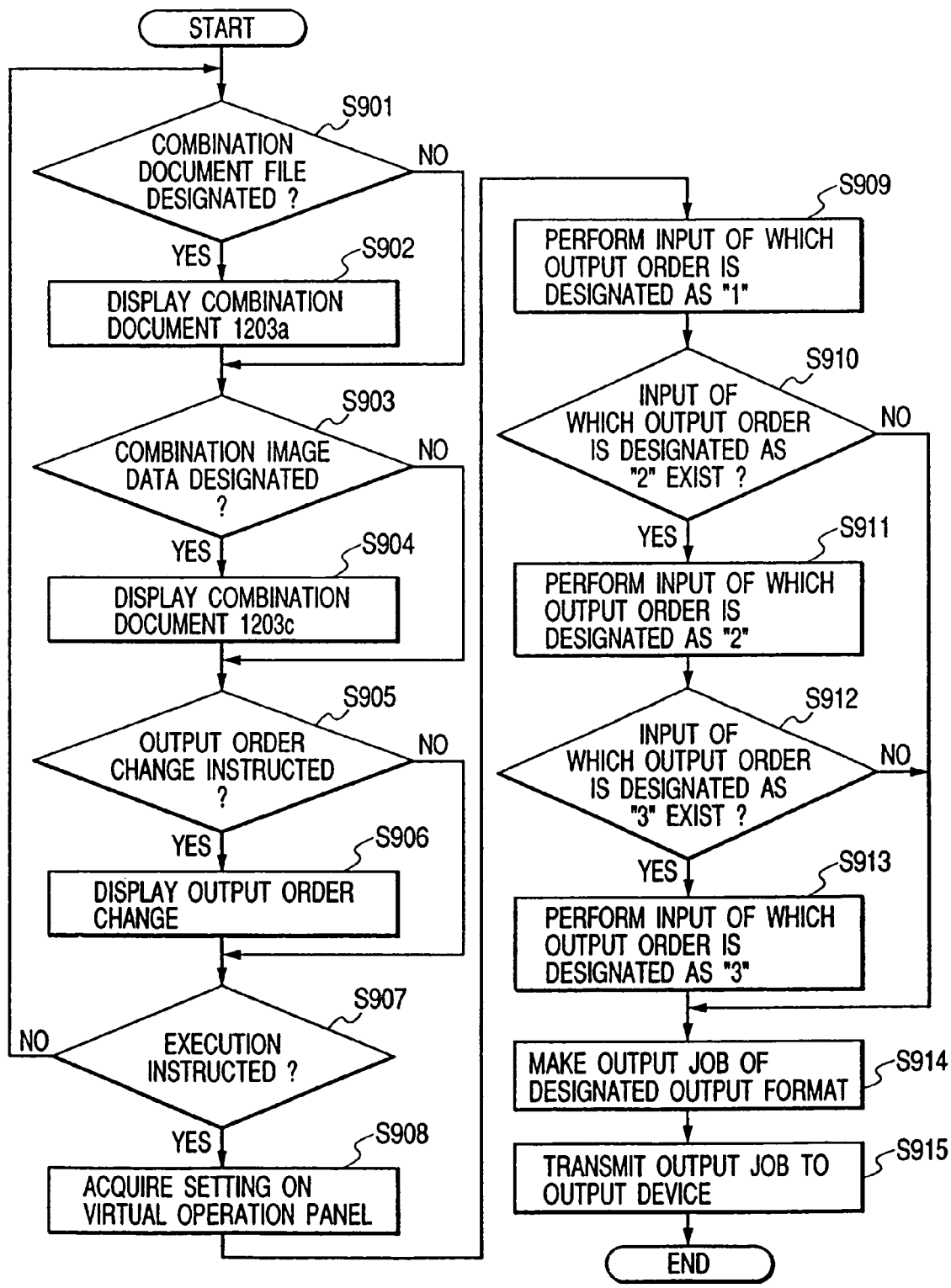
FIG. 45 is a flow chart showing an example of an eighth data processing procedure in the data processing apparatus according to the present invention.

FIG. 45 is a flow chart showing an example of an eighth data processing procedure in the data processing apparatus according to the present invention. The eighth data processing procedure corresponds to processing which is performed in the step S308 of FIG. 32, for example, when the scanner icon 303*c* is dragged and dropped on the digital copying machine icon 302*f* and thus the copying function is executed.

First, in a step S901, it is judged whether or not the combination document file is designated in the combination document file designation area 1201 on the virtual operation panel. If judged that the combination document file is not designated, the flow advances to a step S903 as it is. Conversely, if judged that the combination document file is designated, the flow advances to a step S902 to display the icon of the combination document 1203*a* in the output order display area 1203 (in left justify).

Next, in the step S903, it is judged whether or not the combination image is designated in the combination image data designation area 1202 on the virtual operation panel. If judged that the combination image is not designated, the flow advances to a step S905 as it is. Conversely, if judged that the combination image is designated, the flow advances to a step S904 to display the icon of the combination image 1203*c* in the output order display area 1203 (in left justify).

Next, in the step S905, it is judged whether or not the output order change is instructed in the output order display area 1203 on the virtual operation panel. If judged that the output order change is not instructed, the flow advances to a step S907 as it is. Conversely, if judged that the output order change is instructed, the flow advances to a step S906 to change the output order of the icons in the output order display area 1203 in accordance with the output order change instruction, and the display the icons in the changed output order.

Next, in the step S907, it is judged whether or not the copying start is instructed by using the copying start button 415 on the virtual operation panel. If judged that the copying start is not instructed, the flow returns to the step S901. Conversely, if judged that the copying start is instructed, the flow advances to a step S908 to acquire the setting on the virtual operation panel, and the flow further advances to a step S909 to perform the inputting firstly designated in the output order display area 1203 (i.e., the inputting corresponding to the icon displayed first from the left) in accordance with the acquired setting.

Next, in a step S910, it is judged whether or not the inputting secondarily displayed in the output order display area 1203 is designated (i.e., the icon displayed second from the left exists). If judged that the inputting secondarily displayed is not designated, the flow advances to a step S914. Conversely, if judged that the inputting secondarily displayed is designated, the flow advances to a step S911 to perform the inputting secondarily designated in the output order display area 1203 (i.e., the inputting corresponding to the icon displayed second from the left).

Next, in a step S912, it is judged whether or not the inputting thirdly displayed in the output order display area 1203 is designated (i.e., the icon displayed third from the left exists). If judged that the inputting thirdly displayed is not designated, the flow advances to the step S914. Conversely, if judged that the inputting thirdly displayed is designated, the flow advances to a step S913 to perform the inputting thirdly designated in the output order display area 1203 (i.e., the inputting corresponding to the icon displayed third from the left).

Next, in the step S914, the first inputting to the third inputting are sequentially combined with others, and an output job of output format (including processing page layout depending on the output device, two-face printing, stapling, etc.) based on the input and output settings on the virtual operation panel is generated. Then, in a step S915, the output job data and the images of the plural designated documents are transmitted in the designated order to the output device (the digital copying machine of the icon 302f in this case), and the processing ends. It should be noted that the job generation in the step S914 and the job transmission in the step S915 are performed every time the data of output one page is input. However, the job may be output after the data of plural pages is stored in a memory.

According to the above processing, by outputting the plural input sources and their output order designated on one operation screen, it is possible to combine the information input from the plural user-desired input sources in the user-desired order and then output the combination information from the output device selected by the user. Thus, for example, the image which is obtained by combining the document file, the image file and the like stored as the shared files in the user's own apparatus or other communicatable PC with the image read from the scanner can be output from the selected output device in the desired output format, e.g., two-face format, 2-in-1 format or the like.

Further, the image which is obtained by combining the image read from two different-function scanners (e.g., a color scanner and a monochrome high-speed scanner) with each other can be output from the selected output device in the desired output format, e.g., two-face format, 2-in-1 format or the like.

Further, in the case where the image obtained by combining the images respectively read from the two scanners having equivalent functions with each other is output from the selected output device in the desired output format, e.g., two-face format, 2-in-1 format or the like, for example, even if the scanner having an ADF or the like can not be used when two originals are read, it is possible by reading the originals one by one from the plural scanner to read the two original without troublesomely exchanging the originals. It should be noted that, although the two scanners are used in the present embodiment, three or more scanners may be used.

Further, when the information input from the plural input sources (although the three input sources are used in the present embodiment, four or more input sources may be used) are combined with others in the designated order and then output, it is possible to add page numbers throughout the sheets on which images are formed and then output these sheets from the output device in the desired output format, e.g., two-face format, 2-in-1 format or the like.

For example, the above operation will be explained with reference to the screen shown in FIG. 42 as follows. The document which corresponds to the icon 1203a displayed first from the left in the output order display area 1203 is the document which is generated based on the application program for the data processing apparatus (PC) and consists of five pages. The document corresponds to the second icon 1203b is the document which is to be input from the scanner corresponding to the icon 403a and consists of two pages. The third icon 1203c corresponds to the document which is input from other scanner on the network (a scanner 300 in FIG. 42) different from the scanner of the icon 403a and consists of three pages. In such display status of the output order display area 1203, according as the button 415 is depressed by the user, the three documents, i.e., the five-page image document corresponding to the icon 1203a read from the memory of the data processing apparatus, the two-page image document read from the scanner of the icon 403a, and the three-page image document read from the scanner 300 are transmitted to the digital copying machine of the icon 302f. The digital copying machine which received these three documents collects them into one document and performs the image formation. At this time, for example, page numbers (i.e., first to fifth pages) are formed together with the images respectively on the sheets (i.e., five sheets) to which the images of the document of the icon 1203a are to be formed, page numbers (i.e., sixth to seventh pages) are formed together with the images respectively on the sheets (i.e., two sheets) to which the images of the document of the icon 1203b are to be formed, and page numbers (i.e., eighth to tenth pages) are formed together with the images respectively on the sheets (i.e., three sheets) to which the images of the document of the icon 1203c are to be formed. Then, for example, when the stapling is set by using the button B5 of FIG. 42, the stapling is performed to one sheaf of these ten-page sheets. Further, for example, before the button 415 is depressed, when the user drags the icon 1203c and drops it between the icons 1203a and 1203b by using the mouse 13 of the data processing apparatus, the output order is changed to the order of the documents 1203a, 1203c and 1203b. Then, if the button 415 is depressed, the digital copying machine of the icon 302f which received these three documents forms the page numbers (i.e., first to fifth pages) together with the respective images on the sheets (i.e., five sheets) to which the images of the document of the icon 1203a are to be formed, forms the page numbers (i.e., sixth to eighth pages) together with the respective images on the sheets (i.e., three sheets) to which the images of the document of the icon 1203c are to be formed, and subsequently forms the page numbers (i.e., ninth to tenth pages) together with the respective images on the sheets (i.e., two sheets) to which the images of the document of the icon 1203b are to be formed. Thus, by operating and controlling the icons displayed on the output order display area 1203, it is possible to easily change the output order of the plural documents in the case where the plural documents from the plural image generation sources are collected and output.

Further, in the present embodiment, the case of combining the information input from the plural input sources and then outputting the combination information was explained. However, it is possible to set an application program of image processing started by the user's own apparatus, combine the information input from the plural input sources in the designated order, and embed the combination information in such the application program itself.

Thus, without performing the conventional complicated input operation of independently inputting the information from the plural input sources and then combining the input information, it is possible by only designating the input sources and the combination order to embed the combination information obtained by freely combining the information input from the plural input sources in the designated order, in the application program.

It should be noted that, in each of the above embodiments, the printer may be an electrophotographic-system printer, an inkjet-system printer, a sublimation-system printer or other-system printer, and the scanner may be a flatbed-system scanner or other-system scanner.

Further, it should be noted that the peripheral devices on the network are not limited to the printer, the scanner and the digital copying machine. Namely, a digital camera, a modem and other devices may be used as the peripheral devices. In this case, like the printer, the scanner and the digital copying machine, the peripheral devices such as the digital camera, the modem and the like can be displayed on the system structure screen of FIG. 11 by using the icons of which shapes are close to the respective appearances of these devices. Besides, like the printer, the scanner and the digital copying machine, the peripheral devices such as the digital camera, the modem and the like can be designated as the input and output devices, thereby executing the above various combination functions (multifunctions).

Hereinafter, the structure of the data processing program which is readable by the data processing apparatus according to the present invention will be explained with reference to a memory map shown in FIG. 46.

FIG. 46 is the view for explaining the memory map of a storage medium in which the various data processing programs readable by the data processing apparatus according to the present invention are stored.

Although the drawing is silent, information (e.g., version information, a programmer's name, etc.) for managing program groups stored in the storage medium is also stored in the storage medium. Further, information which depends on an OS (operating system) on the program reading side (e.g., an icon for discriminatingly displaying a program) is occasionally stored in the storage medium.

Further, data which depend on the various programs are also managed in the directory. When an installed program or data is compressed, a program for decompressing it is occasionally stored.

Further, each of the functions of the above embodiments shown in FIGS. 9, 32, 34, 35, 38, 40, 41 and 45 may be executed by a host computer in accordance with an externally installed program. In this case, the present invention is applicable to a case where an information group including the program is supplied from a storage medium such as a CD-ROM, a flash memory, an FD or the like or external storage medium through the network to the data processing apparatus.

As described above, it is needless to say that the object of the present invention can be achieved in a case where the storage medium storing the program codes of software for realizing the functions of the above embodiments is supplied to a system or an apparatus and then a computer (or CPU or MPU) in the system or the apparatus reads and executes the program codes stored in the memory medium.

In this case, the program codes themselves read from the storage medium realize the new functions of the present invention, and the storage medium storing such the program codes constitute the present invention.

The storage medium storing the program codes can be, e.g., a floppy disk, a hard disk, an optical disk, a magnetooptical disk, a CD-ROM, a CD-R, a magnetic tape, a non-volatile memory card, a ROM, an EEPROM, or the like.

Further, it is needless to say that the present invention also includes not only the case where the functions of the embodiments are realized by executing the program codes read by the computer, but also a case where an OS (operating system) or the like functioning on the computer executes all the process or a part thereof according to the instructions of the program codes, thereby realizing the functions of the above embodiments.

Further, it is needless to say that the present invention further includes a case where the program codes read from the storage medium are once stored in a memory provided in a function expansion board inserted in the computer or a function expansion unit connected with the computer, and a CPU or the like provided in the function expansion board or the function expansion unit executes all the process or a part thereof according to the instructions of such program codes, thereby realizing the functions of the above embodiments.

Further, the present invention is applicable to a system composed of plural devices or to an apparatus including a single device. Further, it is needless to say that the present invention is applicable to a case where a program is supplied to a system or an apparatus to realize the functions of the above embodiments. In this case, when the storage medium storing the program represented by software for realizing the present invention is read by the system or the apparatus, such the system or the apparatus can derive the effects of the present invention.

Further, when the program represented by software for realizing the present invention is downloaded and read from a database on the network by a communication program, such the system or the apparatus can derive the effects of the present invention.

As described so far, according to the invention, a user designates, in a system configuration display state, icons for a group of plural devices in order to execute a composite function (e.g., a user drags a scanner icon and drops it on the icon of the digital copying machine 118 with the mouse 13 on the display screen showing the system configuration shown in FIGS. 5 and 11 and the like). Then, a setting screen for the combination function is displayed (e.g., refer to the virtual operation panel on CRT 16 shown in FIGS. 12 to 14 and the like), and in addition on this setting screen, a configuration image of the designated devices including option units equipped with the designated devices is displayed (e.g., refer to the system image MFI visually expressing the appearance of the whole image forming system including the main body of the digital copying machine 118 and each option unit such as a sorter connected with the main body, the system image being displayed in a display area above the display areas of the buttons B5 to B8 on the virtual operation panel). In accordance with the settings on the setting screen, the operation of a combination of the corresponding devices is controlled (e.g., as a user depresses the copy start button 415, the scanner and digital copying machine operate in combination in accordance with the settings made by the user on the setting screen). The user can make settings for the composite function easily and efficiently on the setting screen for the composite or combination function, while visually confirming the state of the main body of another device remotely connected with the subject apparatus as well as the state of each option unit connected with the other device including a mount/dismount state, the type and shape of each option unit.

Further, the function buttons (e.g., buttons B1 to B6 on the virtual operation panel shown in FIGS. 12 to 14 and the like) for the executable expansion function of the other device installed remotely from the subject apparatus are displayed in a desired layout order. It is therefore possible to set the expansion function of the device easily and efficiently.

Still further, the management-server acquires the resource file which indicates configuration image resources of devices. Accordingly, even if a maker provides a new device (including option units), without a complicated work of installing the resource file to all client machines on the network, all client machines on the network can display the configuration image corresponding to the new device (including option units) by simply installing the resource file only to the management server.

On the display screen (refer to the virtual operation panel shown in FIGS. 12 to 14 and the like) which displays as the system image MFI the configuration image of the other device installed remotely from the subject apparatus including the option units of the other device, the function button (e.g., buttons B1 to B6 on the virtual operation panel shown in FIGS. 12 to 14 and the like) for the expansion function executable by the other device and the function button (e.g., button B7) for the function executable by the subject apparatus are displayed. These buttons are displayed on one setting display screen and arranged in the layout order desired by the user. Accordingly, the user can enter various settings by using one display screen and execute various functions, without being conscious about an execution of different functions provided by the subject apparatus and plural devices.

In accordance with the image processing conditions for the device installed remotely from the subject apparatus and the image processing conditions for the subject apparatus, respectively set on one setting display screen, the image data input from the other device is processed by the subject apparatus and output from the other device. Accordingly, by using each device on the network with a simple user work, the composite image data processed by an application of the data processing apparatus can be output to any desired device.

If a user cannot grasp all option units and expansion functions of each device, there is a possibility that the performance of each device cannot be demonstrated most effectively, the user cannot set each device as desired, or the user may abandon to set each device as desired. This problem can be solved. Even if the network environment can meet various needs of users, the system may not be utilized most effectively if users cannot grasp the system. This problem can also be solved. It has also been desired not only to realize a particular function by a combination of devices, but also to meet various complicated and sophisticated needs of users under advancement of technique. For example, a function together with composite image processing provided by a user computer is desired. This requirement can be met by an excellent user interface of the invention which is easy to use in dealing with an image processing request from users.

As above, according to the embodiments, under the system environment including the various devices, it is possible to visually recognize the configuration image of the devices (including the expansion function) desired by the user, to effectively use the entire system, and to flexibly meet various complicated and sophisticated needs of the user.

What is claimed is:

1. A data processing apparatus capable of data communications with various devices, including an image input device and an image output device, connected with a network, comprising:
    a storing unit configured to store function information and connection information of the various devices;
    a system displaying unit configured to display a system configuration of the network on a display by using an icon corresponding to each of the devices, in accordance with the connection information stored by said storing unit;
    a designation unit configured to designate an icon corresponding to the image input device and an icon corresponding to the image output device from among the icons displayed on the display unit;
    a function setting screen displaying unit configured to display a setting screen for setting a combination function achievable by combining the image input device and the image output device respectively corresponding to the icons designated by said designation unit such that the image data input by the image input device is output by the image output device, in accordance with the function information stored by said storing unit; and
    a control unit configured to cause the image input device and the image output device respectively corresponding to the icons designated by said designation unit to perform a process of outputting, by the image output device, the image data input by the image input device, on the basis of the combination function set by using the screen displayed by said function setting screen displaying unit.

2. An apparatus according to claim 1, wherein said function setting screen displaying unit displays a setting segment for an executable expansion function of each device on the setting screen, in accordance with the function information of the device stored by said storing unit.

3. An apparatus according to claim 2, further comprising an editing unit configured to edit display contents on the setting segment for the executable expansion function of each device displayed by said function setting screen displaying unit.

4. An apparatus according to claim 1, wherein the network is connected with plural other data processing apparatuses communicable with the data processing apparatus.

5. An apparatus according to claim 4, wherein one of the plural data processing apparatuses is used as a management server.

6. An apparatus according to claim 5, wherein the management server can store and manage an expansion configuration image resource of each device.

7. An apparatus according to claim 1, wherein the image input device includes a fax machine, a digital copying machine, a scanner, a digital camera, and a modem, and the second image output device includes a printer, a fax machine, a digital copying machine, a digital camera, and a modem.

8. A data processing method for a data processing apparatus capable of data communications with various devices, including an image input device and an image output device, connected with a network, comprising:
    a storing step of storing function information and connection information of the various devices;
    a system displaying step of displaying a system configuration of the network on a display unit by using an icon corresponding to each of the devices, in accordance with the connection information stored in said storing step;
    a designation step of designating an icon corresponding to the image the icons displayed on the display unit;
    a function setting screen displaying step of displaying a setting screen for setting a combination function achievable by combining the image input device and the image output device respectively corresponding to the icons designated in said designation step such that the image data input by the image input device is output by the image output device, in accordance with the function information stored in said storing step; and
    a function executing step of causing the image input device and the image output device respectively corresponding to the icons designated in said designation step to perform a process of outputting, by the image output device, the image data input by the image input device, on the basis of the combination function set by using the screen displayed in said function setting screen displaying step.

9. A method according to claim 8, wherein said function setting screen displaying step includes displaying a setting segment for an executable expansion function of each device on the setting screen, in accordance with the function information of the device stored in said storing step.

10. A method according to claim 9, further comprising an editing step for editing display contents on the setting segment for the executable expansion function of each device displayed in said function setting screen displaying step.

11. A method according to claim 8, wherein a management server is provided which can store and manage an expansion configuration image resource of each device.

12. A method according to claim 8, wherein the image input device includes a fax machine, a digital copying machine, a scanner, a digital camera, and a modem, and the image output device includes a printer, a fax machine, a digital copying machine, a digital camera, and a modem.

13. A computer-readable storage medium storing a program for controlling a data processing apparatus capable of data communications with various devices, including an image input device and a an image output device, connected with a network, comprising:
- a storing step of storing function information and connection information of the various devices;
- a system displaying step of displaying a system configuration of the network on a display unit by using an icon corresponding to each of the devices, in accordance with the connection information stored in said storing step;
- a designation step of designating an icon corresponding to the image input device and an icon corresponding to the image output device from among the icons displayed on the display unit;
- a function setting screen displaying step of displaying a setting screen for setting a combination function achievable by combining the image input device and the image output device respectively corresponding to the icons designated in said designation step such that the image data input by the image input device is output by the image output device, in accordance with the function information stored in said storing step; and
- a function executing step of causing the image input device and the image output device respectively corresponding to the icons designated in said designation step to perform a process of outputting, by the image output device, the image data input by the image input device, on the basis of the combination function set by using the screen displayed in said function setting screen displaying step.

14. A storage medium according to claim 13, wherein said function setting screen displaying step includes displaying a setting segment for an executable expansion function of each device on the setting screen, in accordance with the function information of the device stored in said storing step.

15. A storage medium according to claim 14, wherein the program further comprises an editing step for editing display contents on the setting segment for the executable expansion function of each device displayed in said function setting screen displaying step.

16. A storage medium according to claim 13, wherein a management server is provided which can store and manage an expansion configuration image resource of each device.

17. A storage medium according to claim 13, wherein the image input device includes a fax machine, a digital copying machine, a scanner, a digital camera, and a modem, and the image output device includes a printer, a fax machine, a digital copying machine, a digital camera, and a modem.

18. An apparatus according to claim 1, further comprising a determining unit configured to determined input/out setting suitable for a combination of the image input device and the image output device respectively corresponding to the icons designated by said designation unit,
- wherein said function setting screen displaying unit displays a setting screen to which the input/output setting determined by said determining unit has been set as default.

19. An apparatus according to claim 18, wherein the input/output setting is color or monochrome setting or resolution setting.

20. A method according to claim 8, further comprising a determining step of determining input/output setting suitable for a combination of the image input device and the image output device respectively corresponding to the icons designated in said designation step,
- wherein said function setting screen displaying step includes displaying a setting screen to which the input/output setting determined in said determining step has been set as default.

21. A method according to claim 20, wherein the input/output setting is color or monochrome setting or resolution setting.

22. A storage medium according to claim 13, wherein the program further comprises a determining step of determining input/output setting suitable for a combination of the image input device and the image output device respectively corresponding to the icons designated in said designation step,
- wherein said function setting screen displaying step includes displaying a setting screen to which the input/output setting determined in said determining step has been set as default.

23. A storage medium according to claim 22, wherein the input/output setting is color or monochrome setting or resolution setting.

* * * * *